United States Patent
Freeny, Jr.

(10) Patent No.: US 7,107,322 B1
(45) Date of Patent: *Sep. 12, 2006

(54) MASTER OPERATING SOFTWARE SYSTEM

(75) Inventor: Charles C. Freeny, Jr., Dallas, TX (US)

(73) Assignee: Automated Business Companies, Spring, TX (US)

( * ) Notice: Subject to any disclaimer, the term of this patent is extended or adjusted under 35 U.S.C. 154(b) by 514 days.

This patent is subject to a terminal disclaimer.

(21) Appl. No.: 09/920,669

(22) Filed: Aug. 2, 2001

Related U.S. Application Data

(60) Provisional application No. 60/186,874, filed on Mar. 3, 2000, provisional application No. 60/161,883, filed on Oct. 27, 1999, and provisional application No. 60/102,618, filed on Oct. 1, 1998.

(51) Int. Cl.
G06F 15/16 (2006.01)

(52) U.S. Cl. .................. 709/217; 709/204; 709/250; 719/310; 710/7; 725/110; 725/114

(58) Field of Classification Search ............ 719/310, 719/319; 709/204, 217, 250, 310–320; 710/1–14, 710/62–64; 725/46, 73, 110, 114
See application file for complete search history.

(56) References Cited

U.S. PATENT DOCUMENTS

| | | | |
|---|---|---|---|
| 5,696,901 A | | 12/1997 | Konrad |
| 5,771,354 A | | 6/1998 | Crawford |
| 5,805,806 A | * | 9/1998 | McArthur .................. 709/250 |
| 5,812,930 A | | 9/1998 | Zavrel |
| 5,832,223 A | * | 11/1998 | Hara et al. ................. 725/114 |
| 5,835,717 A | * | 11/1998 | Karlton et al. ............ 725/46 |
| 5,850,265 A | * | 12/1998 | Suh ........................... 725/110 |
| 5,850,340 A | | 12/1998 | York |

(Continued)

FOREIGN PATENT DOCUMENTS

| WO | WO 9728623 | 8/1997 |
|---|---|---|
| WO | WO 97/28623 | 8/1997 |

OTHER PUBLICATIONS

Good–Bye, Gui Hello, Nui; XP–002142711; BYTE, Jul. 1997 (9 pgs).
Part I Cheaper Computing: XP–002142712; BYTE, Apr. 1997 (10 pgs).
IBM Technical Disclosure Bulletin; May 30, 1988, No. 12, Armonk, NY, USA; vol. 30, No. 12, May 1988 (4 pgs).

(Continued)

Primary Examiner—William Thomson
(74) Attorney, Agent, or Firm—Dunlap, Codding & Rogers, P.C.

(57) ABSTRACT

A Master Operating Software System stored and/or run on a remote portion of a Split Personal Computer System, or a Multiple Computer System, such that remote users can operate such Master Operating Software System. In one preferred embodiment, the split personal computer system selectively processes video portions, input/output portions, computational portions and storage portions of personal computer tasks, and comprises a remote portion adapted to selectively perform the computational portions and the storage portions of the personal computer tasks, wherein the remote portion has the master operating software system stored thereon, and a local portion adapted to selectively perform the video portions and the input/output portions of the personal computer tasks, wherein the local portion includes a display unit located remotely from the remote portion, an accessory unit in communication with the display unit, an input unit in communication with the accessory unit to input data signals into the accessory unit, and a communication means for interfacing the accessory unit with the remote portion of the split personal computer system for permitting data signals received by the accessory unit from the input unit to be transmittable from the accessory unit to the remote portion of the split personal computer system.

4 Claims, 61 Drawing Sheets

U.S. PATENT DOCUMENTS

| | | | |
|---|---|---|---|
| 5,852,437 A | 12/1998 | Wugofski et al. | |
| 5,852,713 A | 12/1998 | Shannon | |
| 5,857,142 A * | 1/1999 | Lin et al. | 725/73 |
| 5,889,845 A | 3/1999 | Staples et al. | |
| 5,940,074 A | 8/1999 | Britt, Jr. et al. | |
| 5,940,387 A | 8/1999 | Humpleman | |
| 5,961,586 A | 10/1999 | Pedersen | |
| 5,974,444 A | 10/1999 | Konrad | |
| 5,982,363 A | 11/1999 | Naiff | |
| 6,049,831 A | 4/2000 | Gardell et al. | |
| 6,166,734 A | 12/2000 | Nahi et al. | |
| 6,167,441 A | 12/2000 | Himmel | |
| 6,181,326 B1 | 1/2001 | Takahashi | |
| 6,233,608 B1 | 5/2001 | Laursen et al. | |
| 6,243,743 B1 | 6/2001 | Freeny | |
| 6,259,443 B1 | 7/2001 | Williams, Jr. | |
| 6,311,197 B1 | 10/2001 | Mighdoll et al. | |
| 6,351,771 B1 | 2/2002 | Craddock et al. | |
| 6,359,892 B1 | 3/2002 | Szlam | |
| 6,360,253 B1 | 3/2002 | Freeny | |
| 6,463,459 B1 | 10/2002 | Orr et al. | |

OTHER PUBLICATIONS

700 IBM Technical Disclosure Bulletin; May 30, 1988, No. 12, Armonk, NY, USA; Remote Security Anchoring of Remote User Identification (3 pgs).
"Banyan's Intranet Connect Software", Intranet exchange, Jun. 8, 2004, 3 pages.
"Giving Mobile Users Acces to Intranets", CMP net, Jul. 21, 1997, 2 pages.
"Reachout Complete Remote Access" User's Guide, ReachOut Software Programs, Stac, Inc. 1991–95, pp. 1–41.
"CoSession for Windows", Remote and Host Software, User's Guide, Triton Technologies, Inc., Revised Dec. 30, 1993.
"The Norton PcAnywhere for Windows", Symantec, Version 2, Remote Computing and Communications.
"NetOp Remote Control for Linux, Product Review, Aug. 11, 2003", www/linuxworld.com/story/33892.htm.
"NetOp gives Linux control of remote Windows desktops, Mar. 25, 2003, author: roblimo",.
"X" in Linux, May 18, 1998, Geoffrey Bennett,.
"The wonders of X", Dec. 14, 2001, Ashton Mills,.
"Linux June 98", May 18, 1998, Goeffrey Bennett,.
"Linux on a laptop", Jun. 16, 1998, Geoffrey Bennett,.
"Linux December 97", Nov. 21, 1997, Geoffrey Bennett,.
"Windows onto linux"Dec. 19, 2001, Ashton Mills,.
"Seven Penguin power plays", Jan. 21, 2003, APC staff,.
"What is XFree86 ®Home to the X Window System", www.xfree86.org.
"The Current XFree86 ®Release, Xfree 86 Release 4.4.0",.
"Documentation for XFree86[tm]version 4.4.0, The XFree86 Project, Inc., Feb. 29, 2004",.
"Downloading the XFree86 4.4.0 binaries",.
README for XFree86[tm]4.4.0., The Xfree 86 Project, Inc.,.
"WinaXe: Linux Hand In Hand with Windows "Linux for You, Mar 2003 edition.
University of Durham, Information Technology Service, InfoSheet 101, Version 1.0, "Setting up a remote X Window", 101XWindows.doc: Jan. 1999.
"Installing XFree86 4.4.0 using the Xinstall.sh script ", www.xfree86.org/4.4.0/ Install3.html.
"X–SecurePro Secure X–Server for Windows free download by Labtam Inc.:S...stem, TCP/IP, FTP, LPR, LPD, telnet client server, NFS, Now with unique".
Virtual Network Computing, Tristan Richardson, Quentin Stafford–Fraser, Kenneth R. Wood and Andy Hopper, IEEE Internet Computin, vol. 2, No. 1, Jan./Feb. 1998.
"Sharing computers on a Linux ( or heterogeneous) network, Part 1",.
"Remote Control for Everybody: VNC Crosses Networks and Platforms".
"Sharing computers on a Linux (or heterogeneous) network, Part 2",.
*Using and Porting shX*. Digital Equipment Corporation, CEC Karlsruhe, Germany, Nov. 1990.
'*The X engine library; a C++library for constructing X pseudoservers*'. Proceedings of the 7th annual X Technical Conference, Jan. 1993. O'Reilly & Associates, 1993.
'*The good, the bad and the ugly of window sharing in X*.' Unpublished paper presented at the fourth annual X Technical Conference, January 1990, John F. Patterson.
'Shared X: X in a Distributed Group Work Environment.' Unpublished paper presented at the second annual X Technical Conference, Jan. 1988, Phil Gust.
'*Experiences with X in a Wireless Environment*', Christopher Kent Kantarjiev, et al., pp. 1–16.
'*XTV: A Framework for Sharing X Window Clients in Remote Synchronous Collaboration*' Proceedings of IEEE TriComm 91: Communications for Distributed Applications & Systems, Chapel Hill, North Carolina, Apr. 1991.
'*A Survey of X Protocol Multiplexors*', Swiss Federal Institute of Technology, Computer Engineering and Networks Laboratory (TIK), ETH–Zentrum, ETZ, CH–8092 Zurich, Switzerland, John Eric Baldeschwieler, et al., pp. 16–24.
Defendant's Opposition to Plaintiff's Motion to Dismiss Defendants' Amended Unenforceability Affirmative Defense and Counterclaim of Citrix Systems, Inc.
Plaintiff's Motion to Dismiss Defendant's Amended Unenforceability Affirmative Defense and Counterclaim.
Automated Business Companies v. Citrix Systems, Inc., and Citrix Online, LLC, Answer and Amended Counterclaims of Citrix Online, LLC. Civil Action No. H–05–0682, U.S. District Court for the Southern District of Texas Houston Division, dated Jun. 6, 2005.
"Global Teleporting with Java: Toward Ubiquitous Personalized Computing", IEEE, Feb. 1997, pp. 53–59.
Automated Business Companies v. Citrix Systems, Inc., and Citrix Online, LLC, Answer of Citrix Systems, Inc. And Citrix Online, LLC. Civil Action No. H–05–0682, U.S. District Court for the Southern District of Texas Houston Division.
Personal Interactive Computing Objects, Roy Want and Andy Hopper, Olivetti Research Ltd, 24a Trumpington Street, Cambridge CB2 1QA, England; Undated.
Piconet Embedded Mobile Networking, Frazer Bennett, David Clarke, Joseph B. Evans, Andy Hopper, Alan Jones, and David Leask; Undate, pp. 1–23.
Remoting Peripherals Using Memory–Mapped Networks, S.J. Hodges, S.L. Pope, D.E. Roberts, G.E. Mapp and A. Hopper, Undated, pp. 1–3.
SPIRIT: A Resource Database for Mobile Users, Noha Adly, Pete Steggles and Andy Harter; Computer Laboratory, Cambridge University, Cambridge CB2 3QG, UK; Undated, pp. 1–10.

Design and Use of High–Speed Networks in Multimedia Applications, Andy Hopper, ORL–91–2; Published in Proceeding of 3$^{rd}$ IFIP Conference on High Speed Networking Berlin, Mar. 91., pp. 1–14.

Teleporting –Making Applications Mobile, Frazer Bennett, Tristan Richardson, Andy Harter, Olivetti Research Laboratory, Undated.

Supporting User Mobility, Martin G. Brown, Olivetti Research Ltd. 24a Trumpington St., Cambridge, CB1 1QA, UK; undated.

Teleporting, Mobile X Sessions, Tristan Richardson; Undated, pp. 1–8.

The Cambridge Fast Ring Networking System, Andrew Hopper and Roger M. Needham, ORL–88–1, Copyright ™ 1990 Olivetti Research Limited; vol. 37, No. 10, Oct. 1988.

The Implementatopm of a Distributed Framework to support 'Follow Me' Applications, Pete Steggles, Paul Webster and Andy Harter, The Olivetti and Oracle Research Laboratory, Undated.

A Framework to Integrate Synchronous and Asynchrounous Collaboration, S.F. Li–Computer Laboratory, University of Cambridge and A. Hopper–Department of Engineering, undated.

Pandora: An Experiment in Distributed Multimedia, Tony King, ORL 92–5, To be published in the Proceedings of Eurographics '92, Sep. 1992.

Pandora–an experimental system for multimedia applications, Andy Hopper, ORL–90–1, Published in 'Operating Systems Review' Jan. 12, 1990; pp. 1–16.

A Distributed Location System for the Active Office, Andy Harter of Olivetti Research Limited and Andy Hopper of the University of Cambridge, UK; Nov. 1993.

Network Cards for the Pandora Multimedia System, DJ Clarke, Olivetti Research Limited and GJ Stark, Advanced Telecommunication Module Ltd., ORL Technical Report 94–5, pp. 1–14.

Mobile Computing with Python, James "Wez" Weatherall & David Scott, Laboratory for Communication Engineering, Cambridge, England, {inw22,djs55}@eng,cam.ac.uk; undated.

Teleporting in an X Window System Environment, Tristan Richardson, Frazer Bennett, Glenford Mapp, and Andy Hopper, Nov. 1993, pp. 1–14.

Digital Video on Computer Workstations, Andy Hopper, ORL 92–6, To be published in the Proceeding of Eurographics', Sep. 1992, pp. 1–14.

* cited by examiner

|  | AP #1 | AP #2 | AP #3 | ****** | AP #n |
|---|---|---|---|---|---|
| MUI #1 | IA11 | IA12 | IA13 | ****** | IA1n |
| MUI #2 | IA21 | IA22 | IA23 | ****** | IA2n |
| MUI #3 | IA31 | IA32 | IA33 | ****** | IA3n |
| MUI #4 | IA41 | IA42 | IA43 | ****** | IA4n |
| MUI #5 | IA51 | IA52 | IA53 | ****** | IA5n |
| MUI #6 | IA61 | IA62 | IA63 | ****** | IA6n |
| MUI #7 | IA71 | IA72 | IA73 | ****** | IA7n |
| * * | * * | * * | * * | ****** | * * |
| MUI #v | IAv1 | IAv2 | IAv3 | ****** | IAvn |

Fig. 20

|        | AP #1 | AP #2 | AP #3 | ****** | AP #n |
|--------|-------|-------|-------|--------|-------|
| MUI #1 | CE11  | CE12  | DC    | ****** | CE1n  |
| MUI #2 | DC    | N/A   | CE23  | ****** | CE2n  |
| MUI #3 | CE31  | DC    | N/A   | ****** | N/A   |
| MUI #4 | DC    | CE42  | CE43  | ****** | N/A   |
| MUI #5 | N/A   | CE52  | N/A   | ****** | DC    |
| MUI #6 | CE61  | DC    | CE63  | ****** | N/A   |
| MUI #7 | N/A   | CE72  | DC    | ****** | N/A   |
| * *    | * *   | * *   | * *   | ****** | * *   |
| MUI #v | DC    | CEv2  | N/A   | ****** | N/A   |

Fig. 21

|       | AP #1 | AP #2 | AP #3 | ... | AP #n |
|-------|-------|-------|-------|-----|-------|
| MUI #1 | CBE11 | CBE12 | DC    | ****** | CBE1n |
| MUI #2 | DC    | N/A   | CBE23 | ****** | CBE2n |
| MUI #3 | CBE31 | DC    | N/A   | ****** | N/A   |
| MUI #4 | DC    | CBE42 | CBE43 | ****** | N/A   |
| MUI #5 | N/A   | CBE52 | N/A   | ****** | DC    |
| MUI #6 | CBE61 | DC    | CBE63 | ****** | N/A   |
| MUI #7 | N/A   | CBE72 | DC    | ****** | N/A   |
| *** | * * | * * | * * | ******* | * * |
| MUI #v | DC    | CBEv2 | N/A   | ****** | N/A   |

Fig. 22

|        | AP #1 | AP #2 | AP #3 | ****** | AP #n |
|--------|-------|-------|-------|--------|-------|
| MUI #1 | SE11  | SE12  | DC    | ****** | SE1n  |
| MUI #2 | DC    | N/A   | SE23  | ****** | SE2n  |
| MUI #3 | SE31  | DC    | N/A   | ****** | N/A   |
| MUI #4 | DC    | SE42  | SE43  | ****** | N/A   |
| MUI #5 | N/A   | SE52  | N/A   | ****** | DC    |
| MUI #6 | SE61  | DC    | SE63  | ****** | N/A   |
| MUI #7 | N/A   | SE72  | DC    | ****** | N/A   |
| * *    | * *   | * *   | * *   | ****** | * *   |
| MUI #v | DC    | SEv2  | N/A   | ****** | N/A   |

Fig. 22A

| User Requirements / Applications | Generic User Requirements #1 Operations (GUR) | Generic User Requirements #2 Accounting (GUR) | Generic User Requirements #3 HR (GUR) | Generic User Requirements #4 G&A (GUR) | Generic User Requirements #5 Special (GUR) |
|---|---|---|---|---|---|
| AP#1 Sales | MUI with (r) CE | MUI with (r) CE | MUI with (r) CE | MUI with (r) CE | MUI with (r) CE |
| AP#2 Payroll | MUI with (r) CE | MUI with (r) CE | MUI with (r) CE | MUI with (r) CE | MUI with (r) CE |
| AP#3 Purchasing | MUI with (r) CE | MUI with (r) CE | MUI with (r) CE | MUI with (r) CE | MUI with (r) CE |
| AP#4 Facilities | MUI with (r) CE | MUI with (r) CE | MUI with (r) CE | MUI with (r) CE | MUI with (r) CE |
| AP#5 Suppliers | MUI with (r) CE | MUI with (r) CE | MUI with (r) CE | MUI with (r) CE | MUI with (r) CE |
| AP#6 Reports | MUI with (r) CE | MUI with (r) CE | MUI with (r) CE | MUI with (r) CE | MUI with (r) CE |
| AP#7 Forms | MUI with (r) CE | MUI with (r) CE | MUI with (r) CE | MUI with (r) CE | MUI with (r) CE |
| AP#8 Customers | MUI with (r) CE | MUI with (r) CE | MUI with (r) CE | MUI with (r) CE | MUI with (r) CE |
| AP#9 Payments | MUI with (r) CE | MUI with (r) CE | MUI with (r) CE | MUI with (r) CE | MUI with (r) CE |
| AP#10 Tax | MUI with (r) CE | MUI with (r) CE | MUI with (r) CE | MUI with (r) CE | MUI with (r) CE |
| AP#11 Maintenance | MUI with (r) CE | MUI with (r) CE | MUI with (r) CE | MUI with (r) CE | MUI with (r) CE |
| AP#12 Regulations | MUI with (r) CE | MUI with (r) CE | MUI with (r) CE | MUI with (r) CE | MUI with (r) CE |
| AP#13 Training | MUI with (r) CE | MUI with (r) CE | MUI with (r) CE | MUI with (r) CE | MUI with (r) CE |
| AP#14 Security | MUI with (r) CE | MUI with (r) CE | MUI with (r) CE | MUI with (r) CE | MUI with (r) CE |
| AP#15 Legal | MUI with (r) CE | MUI with (r) CE | MUI with (r) CE | MUI with (r) CE | MUI with (r) CE |
| AP#16 Cash | MUI with (r) CE | MUI with (r) CE | MUI with (r) CE | MUI with (r) CE | MUI with (r) CE |
| AP#17 Office | MUI with (r) CE | MUI with (r) CE | MUI with (r) CE | MUI with (r) CE | MUI with (r) CE |
| AP#18 Receivables | MUI with (r) CE | MUI with (r) CE | MUI with (r) CE | MUI with (r) CE | MUI with (r) CE |
| AP#19 Insurance | MUI with (r) CE | MUI with (r) CE | MUI with (r) CE | MUI with (r) CE | MUI with (r) CE |
| AP#20 Special AP | MUI with (r) CE | MUI with (r) CE | MUI with (r) CE | MUI with (r) CE | MUI with (r) CE |

Fig. 23

| User Requirements | Generic User Requirements #1 | Generic User Requirements #2 | Generic User Requirements #3 | Generic User Requirements #4 | Generic User Requirements #5 |
|---|---|---|---|---|---|
| Applications | Operations (GUR) | Accounting (GUR) | HR (GUR) | G&A (GUR) | Special (GUR) |
| AP#1 Sales | MUI with (t) TE | MUI with (t) TE | MUI with (t) TE | MUI with (t) TE | MUI with (t) TE |
| AP#2 Payroll | MUI with (t) TE | MUI with (t) TE | MUI with (t) TE | MUI with (t) TE | MUI with (t) TE |
| AP#3 Purchasing | MUI with (t) TE | MUI with (t) TE | MUI with (t) TE | MUI with (t) TE | MUI with (t) TE |
| AP#4 Facilities | MUI with (t) TE | MUI with (t) TE | MUI with (t) TE | MUI with (t) TE | MUI with (t) TE |
| AP#5 Suppliers | MUI with (t) TE | MUI with (t) TE | MUI with (t) TE | MUI with (t) TE | MUI with (t) TE |
| AP#6 Reports | MUI with (t) TE | MUI with (t) TE | MUI with (t) TE | MUI with (t) TE | MUI with (t) TE |
| AP#7 Forms | MUI with (t) TE | MUI with (t) TE | MUI with (t) TE | MUI with (t) TE | MUI with (t) TE |
| AP#8 Customers | MUI with (t) TE | MUI with (t) TE | MUI with (t) TE | MUI with (t) TE | MUI with (t) TE |
| AP#9 Payments | MUI with (t) TE | MUI with (t) TE | MUI with (t) TE | MUI with (t) TE | MUI with (t) TE |
| AP#10 Tax | MUI with (t) TE | MUI with (t) TE | MUI with (t) TE | MUI with (t) TE | MUI with (t) TE |
| AP#11 Maintenance | MUI with (t) TE | MUI with (t) TE | MUI with (t) TE | MUI with (t) TE | MUI with (t) TE |
| AP#12 Regulations | MUI with (t) TE | MUI with (t) TE | MUI with (t) TE | MUI with (t) TE | MUI with (t) TE |
| AP#13 Training | MUI with (t) TE | MUI with (t) TE | MUI with (t) TE | MUI with (t) TE | MUI with (t) TE |
| AP#14 Security | MUI with (t) TE | MUI with (t) TE | MUI with (t) TE | MUI with (t) TE | MUI with (t) TE |
| AP#15 Legal | MUI with (t) TE | MUI with (t) TE | MUI with (t) TE | MUI with (t) TE | MUI with (t) TE |
| AP#16 Cash | MUI with (t) TE | MUI with (t) TE | MUI with (t) TE | MUI with (t) TE | MUI with (t) TE |
| AP#17 Office | MUI with (t) TE | MUI with (t) TE | MUI with (t) TE | MUI with (t) TE | MUI with (t) TE |
| AP#18 Receivables | MUI with (t) TE | MUI with (t) TE | MUI with (t) TE | MUI with (t) TE | MUI with (t) TE |
| AP#19 Insurance | MUI with (t) TE | MUI with (t) TE | MUI with (t) TE | MUI with (t) TE | MUI with (t) TE |
| AP#20 Special AP | MUI with (t) TE | MUI with (t) TE | MUI with (t) TE | MUI with (t) TE | MUI with (t) TE |

Fig. 24

|  | (10) Entertainment MOSS: Each MOSS Manages (20) APPs |  |  |  |  |
|---|---|---|---|---|---|
|  | (20) Event MOSS: Each MOSS Manages (20) APPs |  |  |  |  |
|  | (100) Commercial Service MOSS: Each MOSS Manages (20) APPs |  |  |  |  |
|  | (50) Public Service MOSS: Each MOSS Manages (20) APPs |  |  |  |  |
|  | (25) Educational Service MOSS: Each MOSS Manages (20) APPs |  |  |  |  |
|  | (75) Facility Management MOSS: Each MOSS Manages (20) APPs |  |  |  |  |
|  | (20) Facility Development MOSS: Each MOSS Manages (20) APPs |  |  |  |  |
|  | (68) Transportation Services (TS) MOSS: Each MOSS Manages (20) APPs |  |  |  |  |
| 19 Applications to generate 536 user Master Programs |  |  |  |  |  |
| TS Operations APP | Airline (5) | Trucking (15) | Railroad (8) | Ship (5) | Automobile (20) | Public (15) |
| TS Sales APP | Airline (5) | Trucking (15) | Railroad (8) | Ship (5) | Automobile (20) | Public (15) |
| TS HR APP | Airline (5) | Trucking (15) | Railroad (8) | Ship (5) | Automobile (20) | Public (15) |
| TS Accounting APP | Airline (5) | Trucking (15) | Railroad (8) | Ship (5) | Automobile (20) | Public (15) |
| TS Facilities APP | Airline (5) | Trucking (15) | Railroad (8) | Ship (5) | Automobile (20) | Public (15) |
| TS PR APP | Airline (5) | Trucking (15) | Railroad (8) | Ship (5) | Automobile (20) | Public (15) |
| TS Collection APP | Airline (5) | Trucking (15) | Railroad (8) | Ship (5) | Automobile (20) | Public (15) |
| TS Training APP | Airline (5) | Trucking (15) | Railroad (8) | Ship (5) | Automobile (20) | Public (15) |
| TS Security APP | Airline (5) | Trucking (15) | Railroad (8) | Ship (5) | Automobile (20) | Public (15) |

Fig. 25A

| | | | | | |
|---|---|---|---|---|---|
| TS Maintenance APP | Airline (5) | Trucking (15) | Railroad (8) | Ship (5) | Automobile (20) | Public (15) |
| TS Regulations APP | Airline (5) | Trucking (15) | Railroad (8) | Ship (5) | Automobile (20) | Public (15) |
| TS Reporting APP | Airline (5) | Trucking (15) | Railroad (8) | Ship (5) | Automobile (20) | Public (15) |
| TS Customers APP | Airline (5) | Trucking (15) | Railroad (8) | Ship (5) | Automobile (20) | Public (15) |
| TS Suppliers APP | Airline (5) | Trucking (15) | Railroad (8) | Ship (5) | Automobile (20) | Public (15) |
| TS Purchasing APP | Airline (5) | Trucking (15) | Railroad (8) | Ship (5) | Automobile (20) | Public (15) |
| TS Payment APP | Airline (5) | Trucking (15) | Railroad (8) | Ship (5) | Automobile (20) | Public (15) |
| TS Insurance APP | Airline (5) | Trucking (15) | Railroad (8) | Ship (5) | Automobile (20) | Public (15) |
| TS Forms APP | Airline (5) | Trucking (15) | Railroad (8) | Ship (5) | Automobile (20) | Public (15) |
| TS Legal APP | Airline (5) | Trucking (15) | Railroad (8) | Ship (5) | Automobile (20) | Public (15) |
| TS Receivables APP | Airline (5) | Trucking (15) | Railroad (8) | Ship (5) | Automobile (20) | Public (15) |
| (45) Transportation Manufacturing (TM) MOSS: Each MOSS Manages (20) APPs | | | | | |
| TM Operations APP | Airline (10) | Trucking (5) | Railroad (5) | Ship (10) | Automobile (10) | Public (5) |
| TM Sales APP | Airline (10) | Trucking (5) | Railroad (5) | Ship (10) | Automobile (10) | Public (5) |
| TM HR APP | Airline (10) | Trucking (5) | Railroad (5) | Ship (10) | Automobile (10) | Public (5) |
| TM Accounting APP | Airline (10) | Trucking (5) | Railroad (5) | Ship (10) | Automobile (10) | Public (5) |
| TM Facilities APP | Airline (10) | Trucking (5) | Railroad (5) | Ship (10) | Automobile (10) | Public (5) |
| TM PR APP | Airline (10) | Trucking (5) | Railroad (5) | Ship (10) | Automobile (10) | Public (5) |

Fig. 25B

| TM Collection APP | Airline (10) | Trucking (5) | Railroad (5) | Ship (10) | Automobile (10) | Public (5) |
|---|---|---|---|---|---|---|
| TM Training APP | Airline (10) | Trucking (5) | Railroad (5) | Ship (10) | Automobile (10) | Public (5) |
| TM Security APP | Airline (10) | Trucking (5) | Railroad (5) | Ship (10) | Automobile (10) | Public (5) |
| TM Maintenance APP | Airline (10) | Trucking (5) | Railroad (5) | Ship (10) | Automobile (10) | Public (5) |
| TM Regulations APP | Airline (10) | Trucking (5) | Railroad (5) | Ship (10) | Automobile (10) | Public (5) |
| TM Reporting APP | Airline (10) | Trucking (5) | Railroad (5) | Ship (10) | Automobile (10) | Public (5) |
| TM Customers APP | Airline (10) | Trucking (5) | Railroad (5) | Ship (10) | Automobile (10) | Public (5) |
| TM Suppliers APP | Airline (10) | Trucking (5) | Railroad (5) | Ship (10) | Automobile (10) | Public (5) |
| TM Purchasing APP | Airline (10) | Trucking (5) | Railroad (5) | Ship (10) | Automobile (10) | Public (5) |
| TM Payment APP | Airline (10) | Trucking (5) | Railroad (5) | Ship (10) | Automobile (10) | Public (5) |
| TM Insurance APP | Airline (10) | Trucking (5) | Railroad (5) | Ship (10) | Automobile (10) | Public (5) |
| TM Forms APP | Airline (10) | Trucking (5) | Railroad (5) | Ship (10) | Automobile (10) | Public (5) |
| TM Legal APP | Airline (10) | Trucking (5) | Railroad (8) | Ship (10) | Automobile (20) | Public (5) |
| TM Receivables APP | Airline (5) | Trucking (15) | Railroad (8) | Ship (5) | Automobile (20) | Public (15) |

Fig. 25C

Fig. 29 The LETUS program logic flow for the three type screens

First Equivalence class level Selection Screen icon pattern and control symbols

Second Equivalence class level Selection screen icon pattern and control symbols Fig. 32  Third Equivalence class level Selection screen icon pattern and control symbols LETUS presentation screen pattern with control symbols LETUS data entry screen pattern with control symbols A LETUS connecting a Audio Device user to a computer system A LETUS connecting a Braille user to a computer system

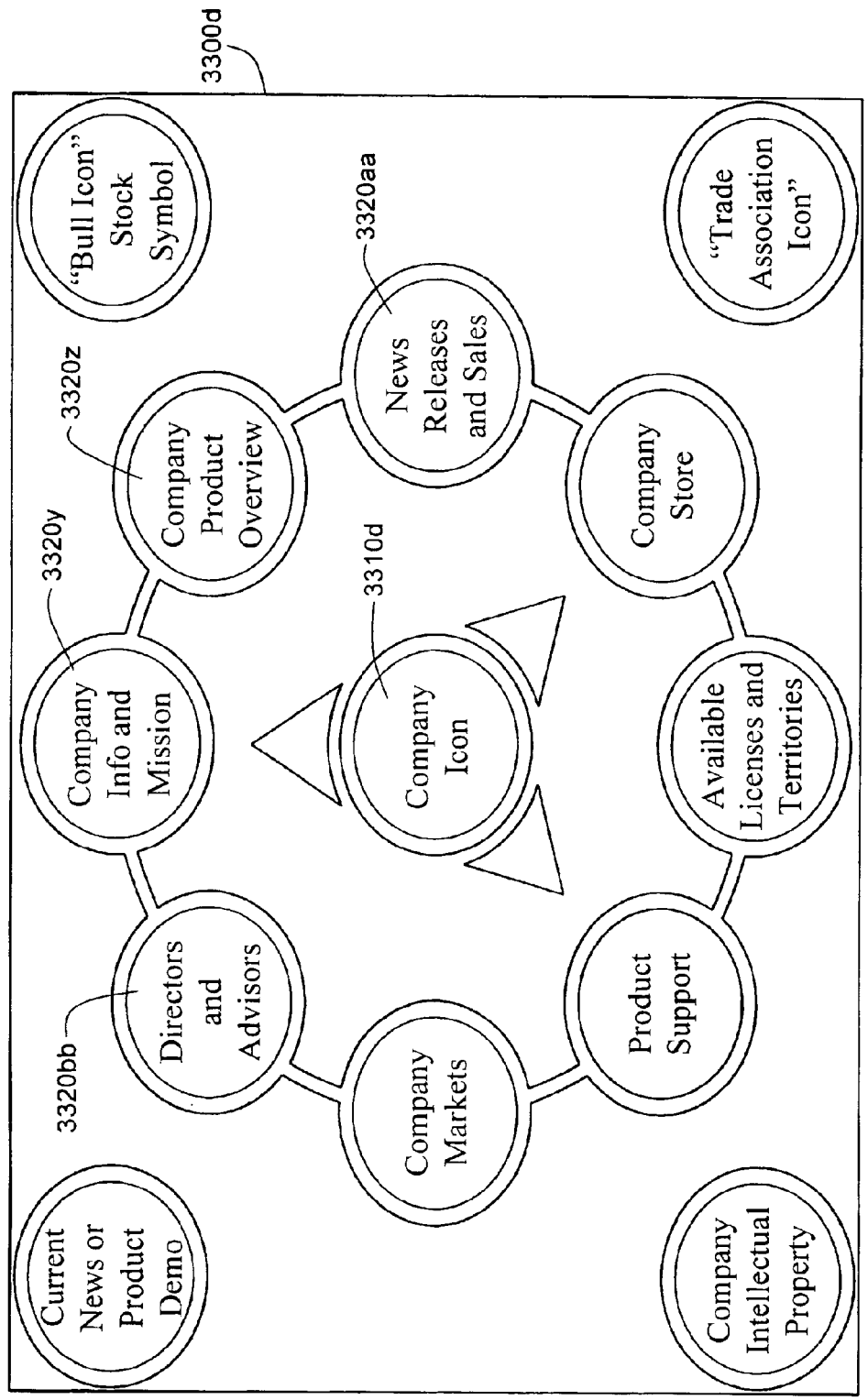
Fig. 37a LETUS Website Level 1 Information equivalence class control Icons LETUS Website Information Screen attached to level 1Company equivalence class control Icon LETUS Website Level 2 Management Information equivalence class control Icons LETUS Website Information Screen attached to level 2 CEO equivalence class control Icon LETUS Website Information Screen attached to level 1 Stock equivalence class control Icon LETUS Website Information Screen attached to level 1 news equivalence class control Icon LETUS Website Information Screen attached to level 1 Intellectual equivalence class control Icon LETUS Website Information Screen attached to level 1 Trade equivalence class control Icon LETUS Website Level 2 Product Information equivalence class control Icons LETUS Website Level 2 News Information equivalence class control Icons A Multiple Customer Computer Service System

| Computer Interface Unit Functions | Computer Service Center Unit | Multiple Service Center |
|---|---|---|
| • Download customers logon menu to the current CIU<br>• Download the customers last configuration compatible with the logon CIU used for the current log and notify the customer of any differences that they will encounter if the current CIU is different than the last CIU | • Controls the modems 5220<br>• Maintains logs and passwords of customers along with the billing and payment records | • Software to manage shared off line storage server elements<br>• Software to manage shared on line hard drive server elements<br>• Software to manage shared on line random memory server elements |
| • Insure that up link modem can handle System communication requirements (eg. 56K or better) prior to logon<br>• Insure that down link modem can handle system requirements prior to logon (eg. 128K or better) | • Can allow a customer to connect to a remote computer using predetermined connection software and share the modem server used for MSC connected customers | • Software to manage shared on line high speed modem server elements<br>• Software to manage shared on line CPU server elements<br>• Software to manage unique customer database and application elements<br>• Software to manage unique customer configuration elements |

System Major Software Functions

Fig. 46

MASTER OPERATING SOFTWARE SYSTEM

CROSS-REFERENCE TO RELATED APPLICATIONS

The present patent application is a continuation of U.S. Ser. No. 11/204,927, filed on Aug. 16, 2005; which is a continuation of U.S. Ser. No. 10/253,332, filed on Jan. 16, 2002, now abandoned; which is a continuation of U.S. Ser. No. 09/443,125, filed on Nov. 18, 1999, now U.S. Pat. No. 6,360,253; which is a continuation of U.S. Ser. No. 09/014,859, filed on Jan. 29, 1998, now U.S. Pat. No. 6,243,743.

STATEMENT REGARDING FEDERALLY SPONSORED RESEARCH AND DEVELOPMENT

Not Applicable.

SUMMARY OF THE INVENTION

In one preferred embodiment, a Master Operating Software System, as also described in conjunction with a Proximity Service Provider System, can be stored and/or run on a remote portion of a Split Personal Computer System, or a Multiple Computer System, such that remote users can operate such Master Operating Software System. A master user interface of the Master Operating Software System can include a Low Entropy Terminal User System. Thus, data entry outputs, information outputs, selection outputs and computer terminal contacts of such Low Entropy Terminal User System can be used for controlling such Master Operating Software System.

BRIEF DESCRIPTION OF THE SEVERAL VIEWS OF DRAWING

FIGS. 7–12, described briefly below, are block diagrams showing various examples of the Proximity Service Provider System (PSPS) depicted in FIG. 1 wherein each of FIGS. 7–12 shows in particular a different type of proximity service system.

Figure 7:
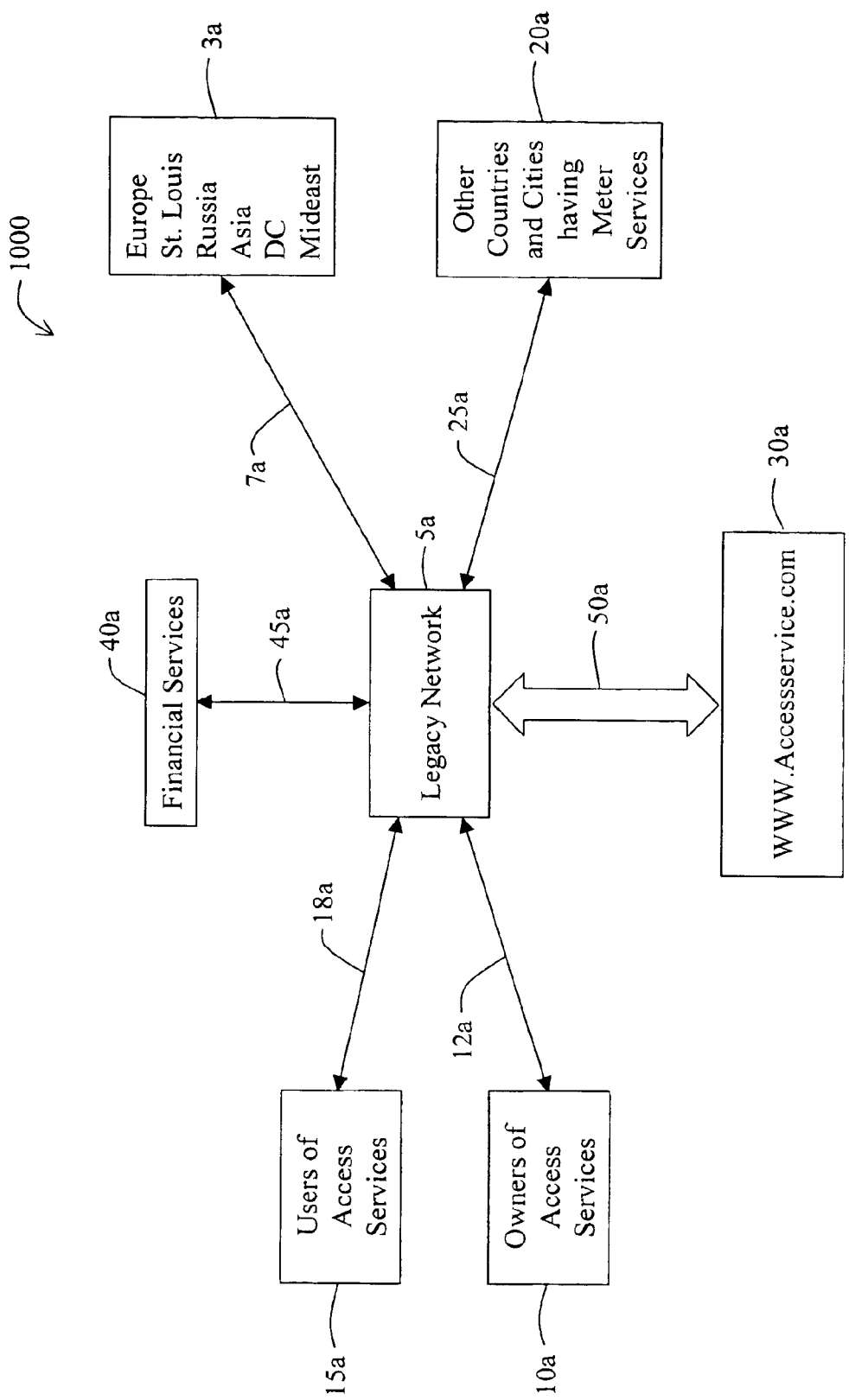

FIG. 7 is a block diagram showing a Proximity Access Service Provider System (PASPS) having customers, owners, operator locations, legacy financial and communication networks communicating in accordance with the present invention.

Figure 8:
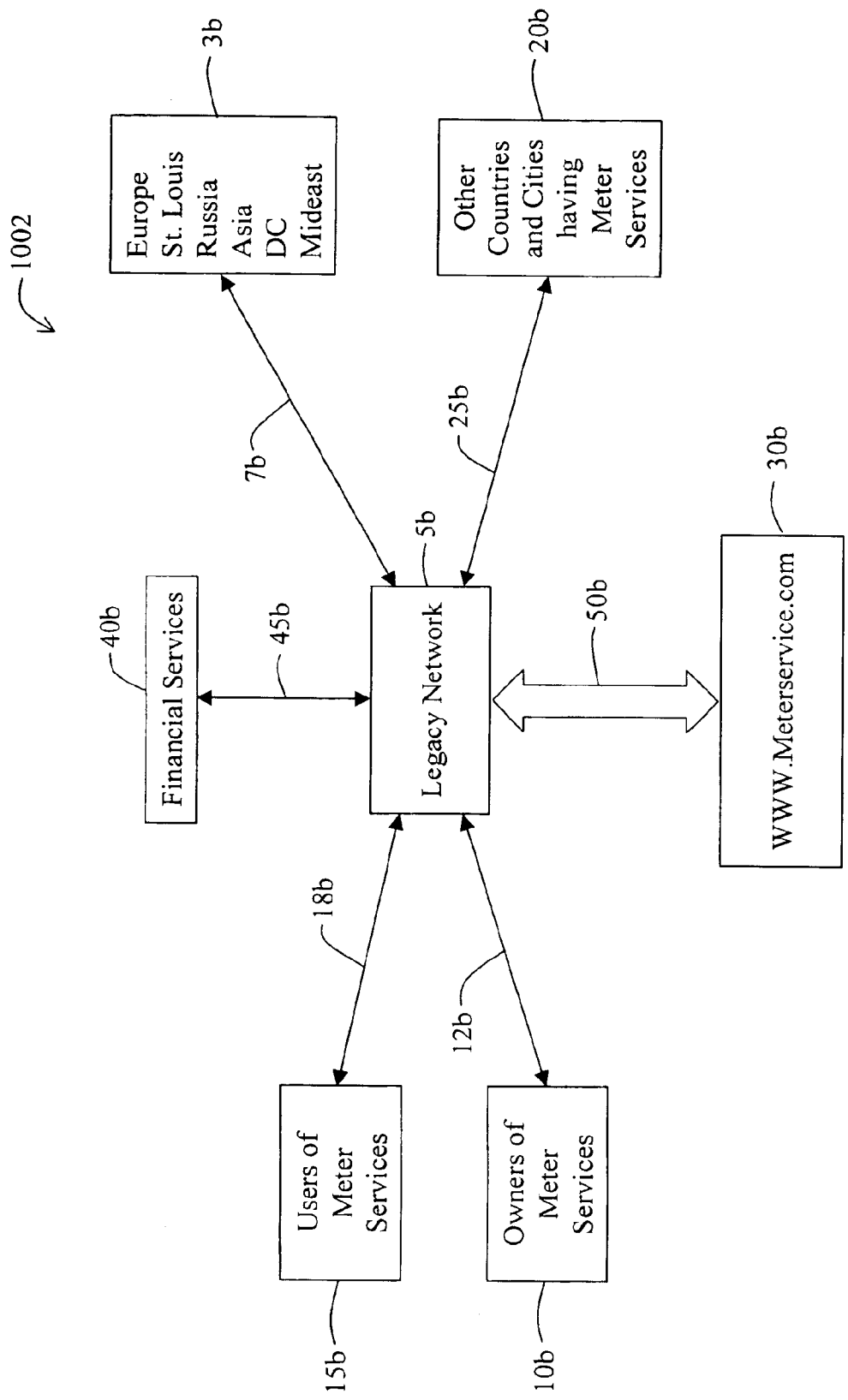

FIG. 8 is a block diagram showing a Proximity Meter Service Provider System (PMSPS) having customers, owners, operator locations, legacy financial and communication networks communicating in accordance with the present invention.

Figure 9:
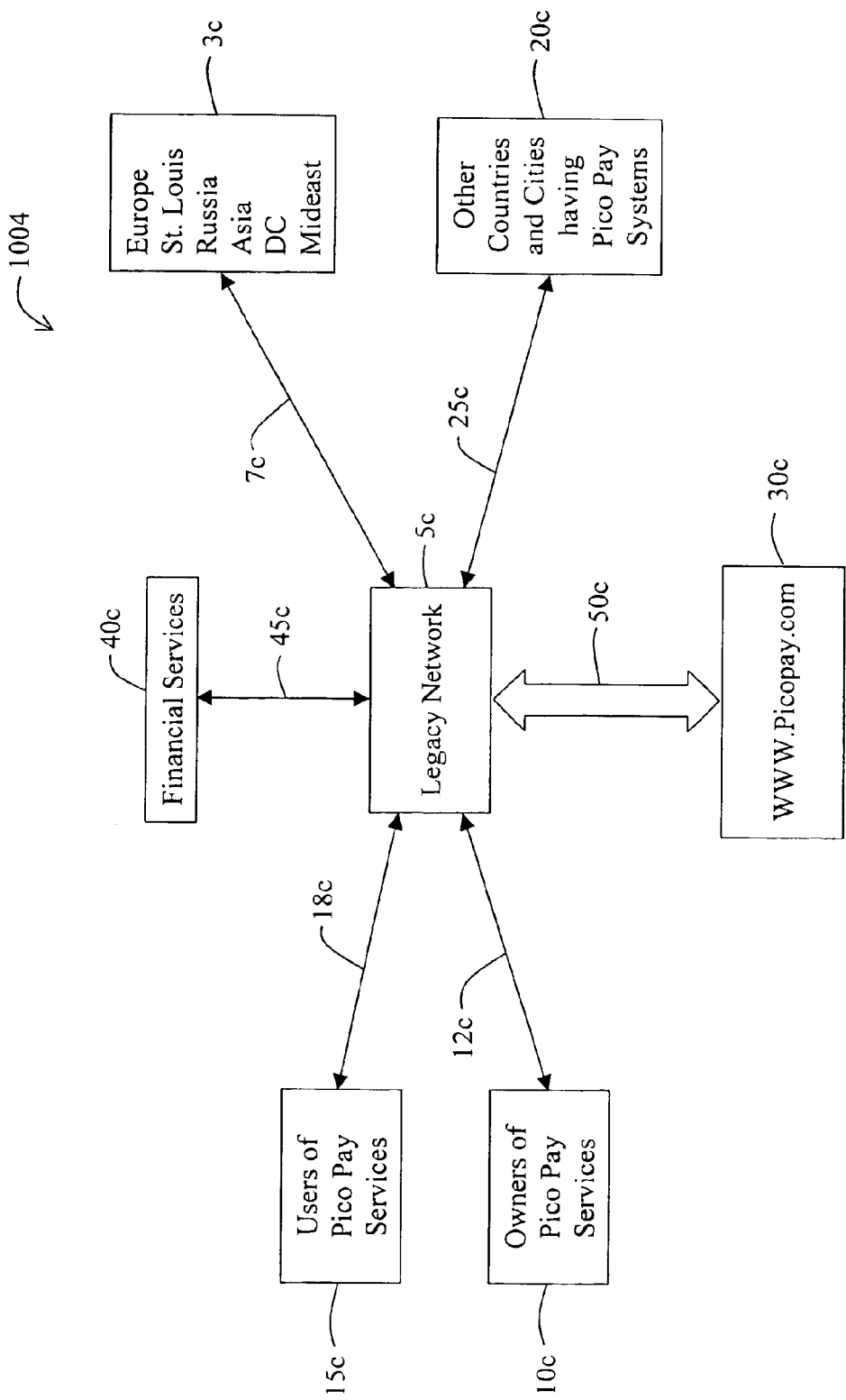

FIG. 9 is a block diagram showing a Proximity Pay Phone Service Provider System (PPSPS) having customers, owners, operator locations, legacy financial and communication networks communicating in accordance with the present invention.

Figure 10:
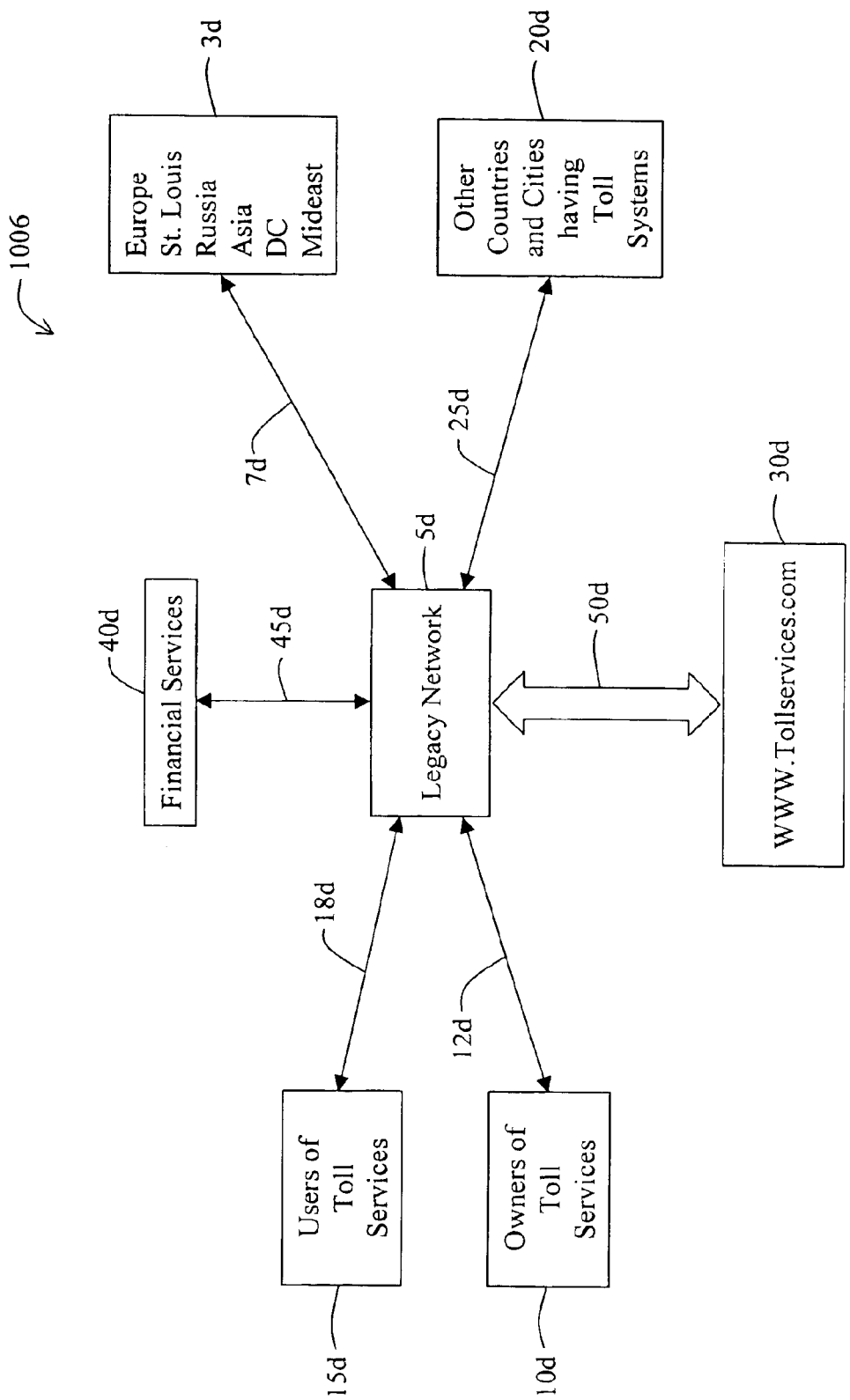

FIG. 10 shows a Proximity Toll Service Provider System (PTSPS) having customers, owners, operator locations, legacy financial and communication networks communicating in accordance with the present invention.

Figure 11:
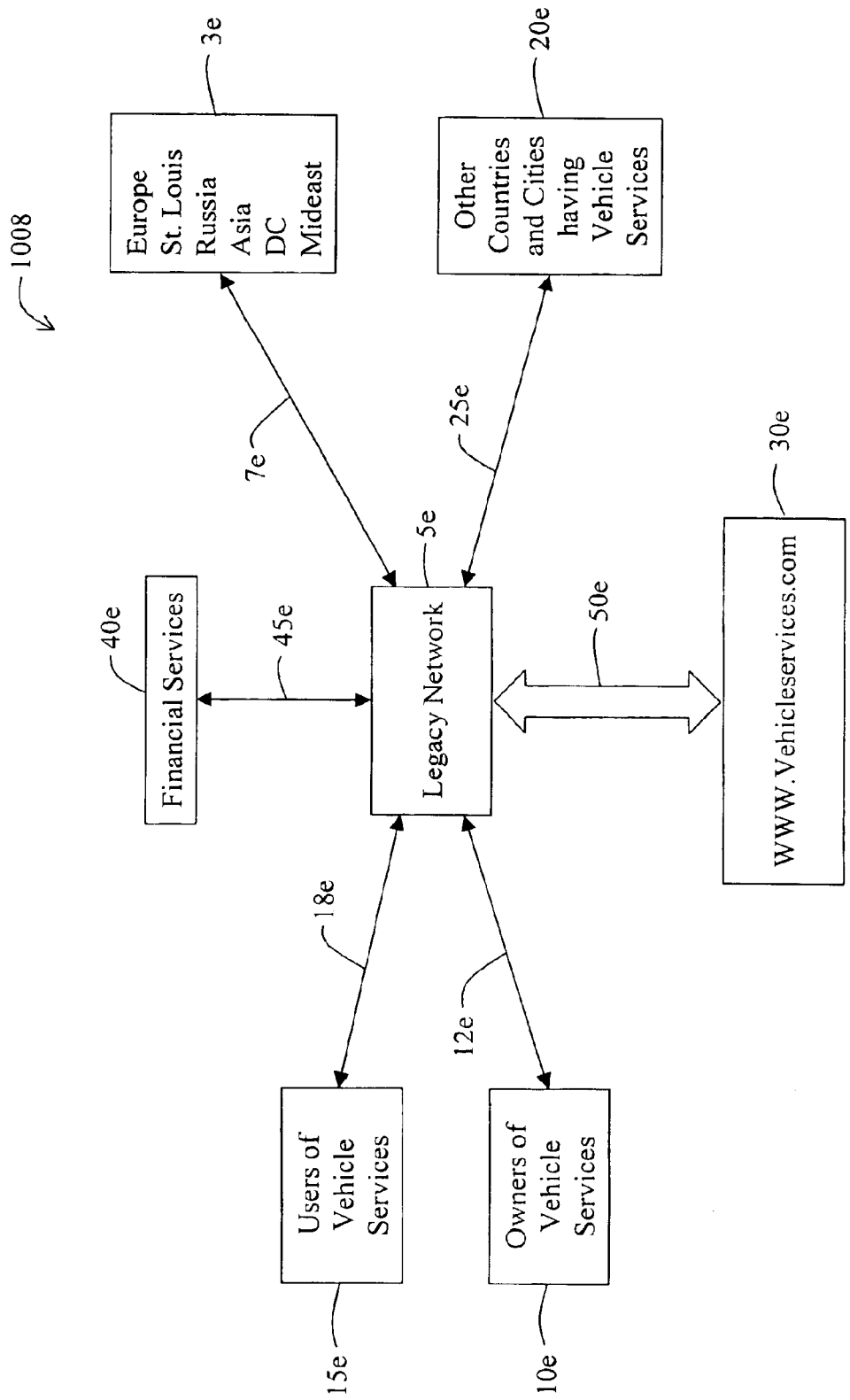

FIG. 11 is a block diagram showing a Proximity Vehicle Service Provider System (PVSPS) having customers, owners, operator locations, legacy financial and communication networks communicating in accordance with the present invention.

Figure 12:
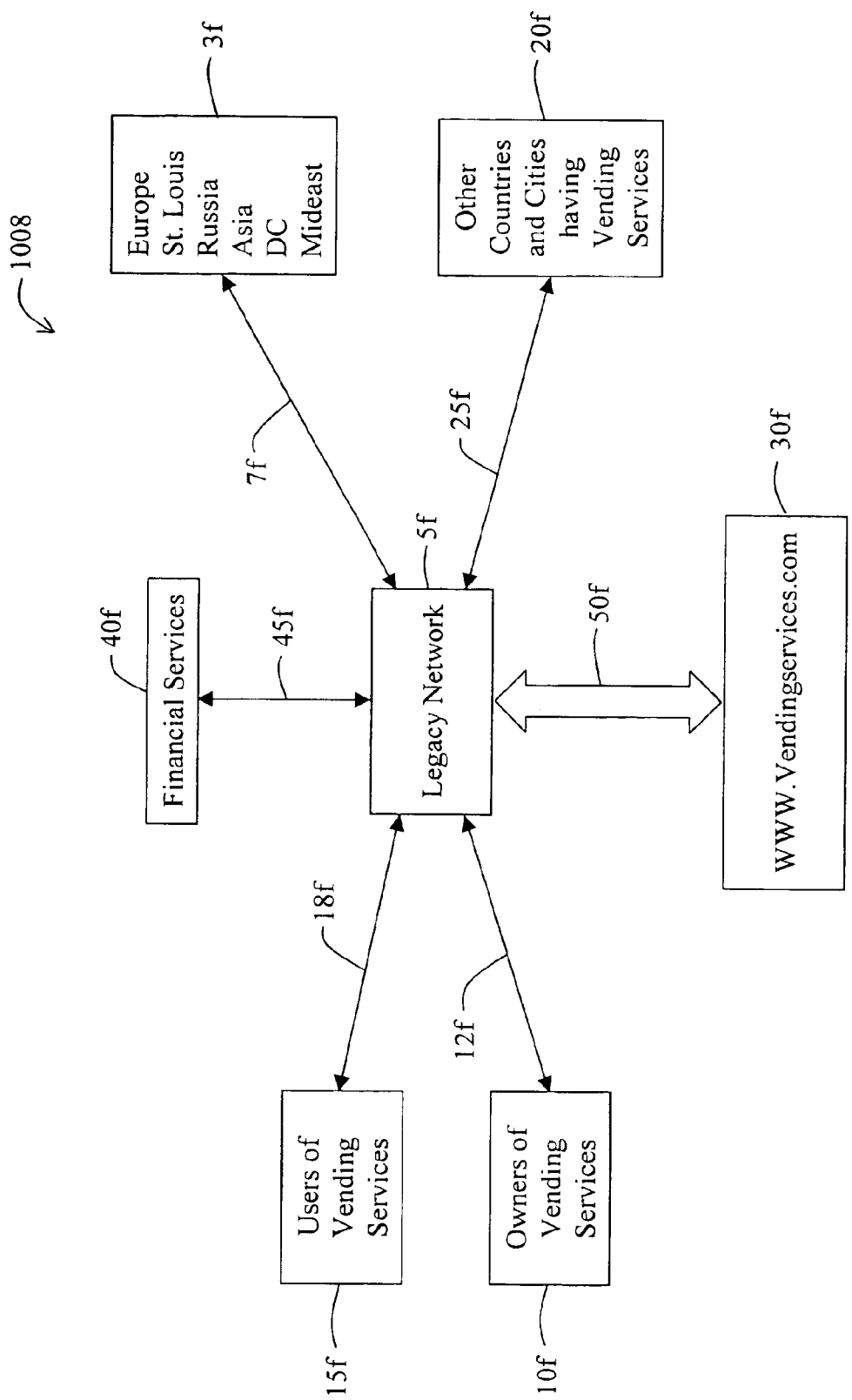

FIG. 12 is a block diagram showing a Proximity Vending Machine Service Provider System (PVMSPS) having customers, owners, operator locations, legacy financial and communication networks communicating in accordance with the present invention.

Figure 13:
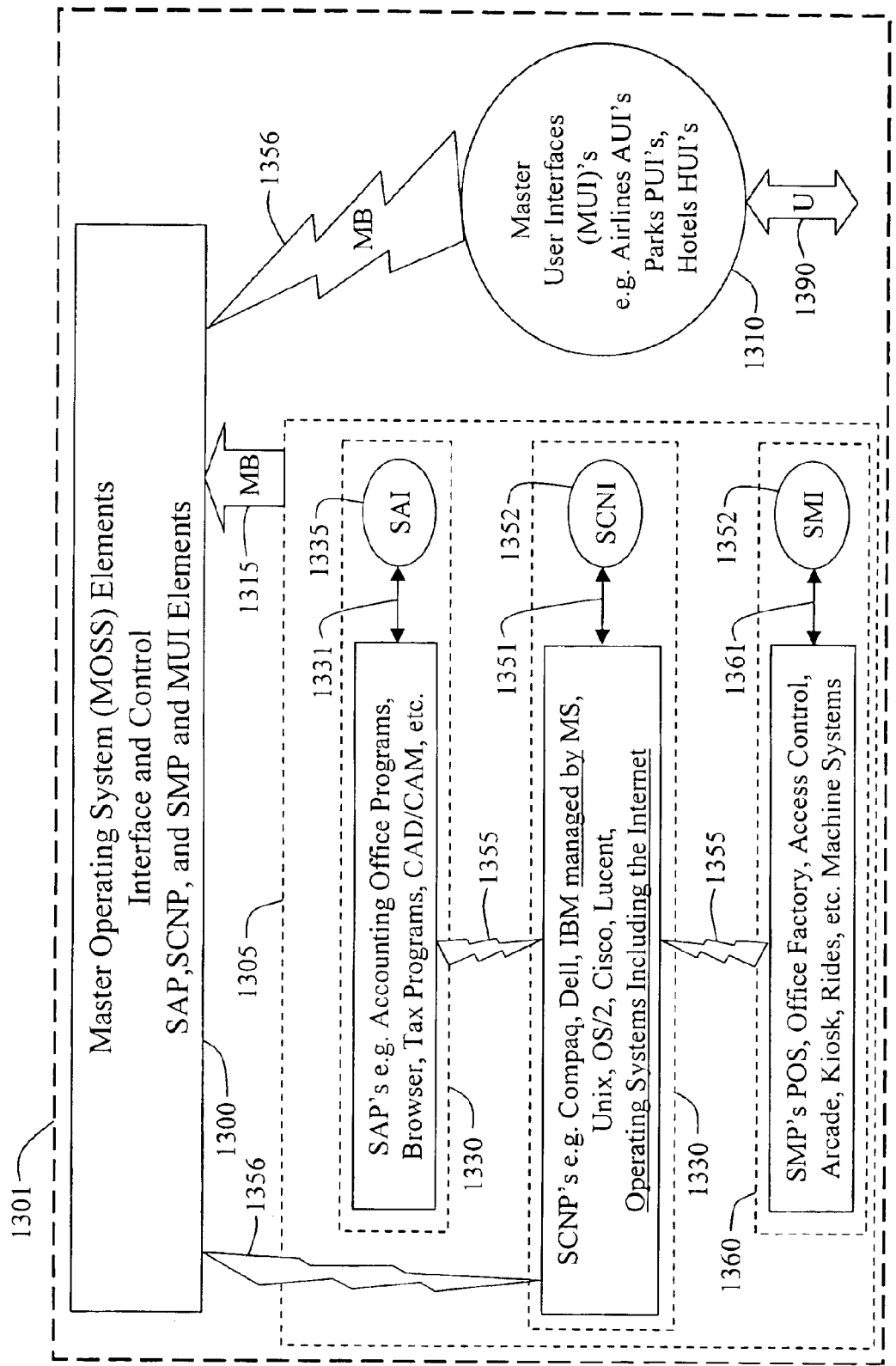

FIG. 13 is a block diagram showing the major user elements of a Master Operating Software Systems (MOSS).

Figure 14:
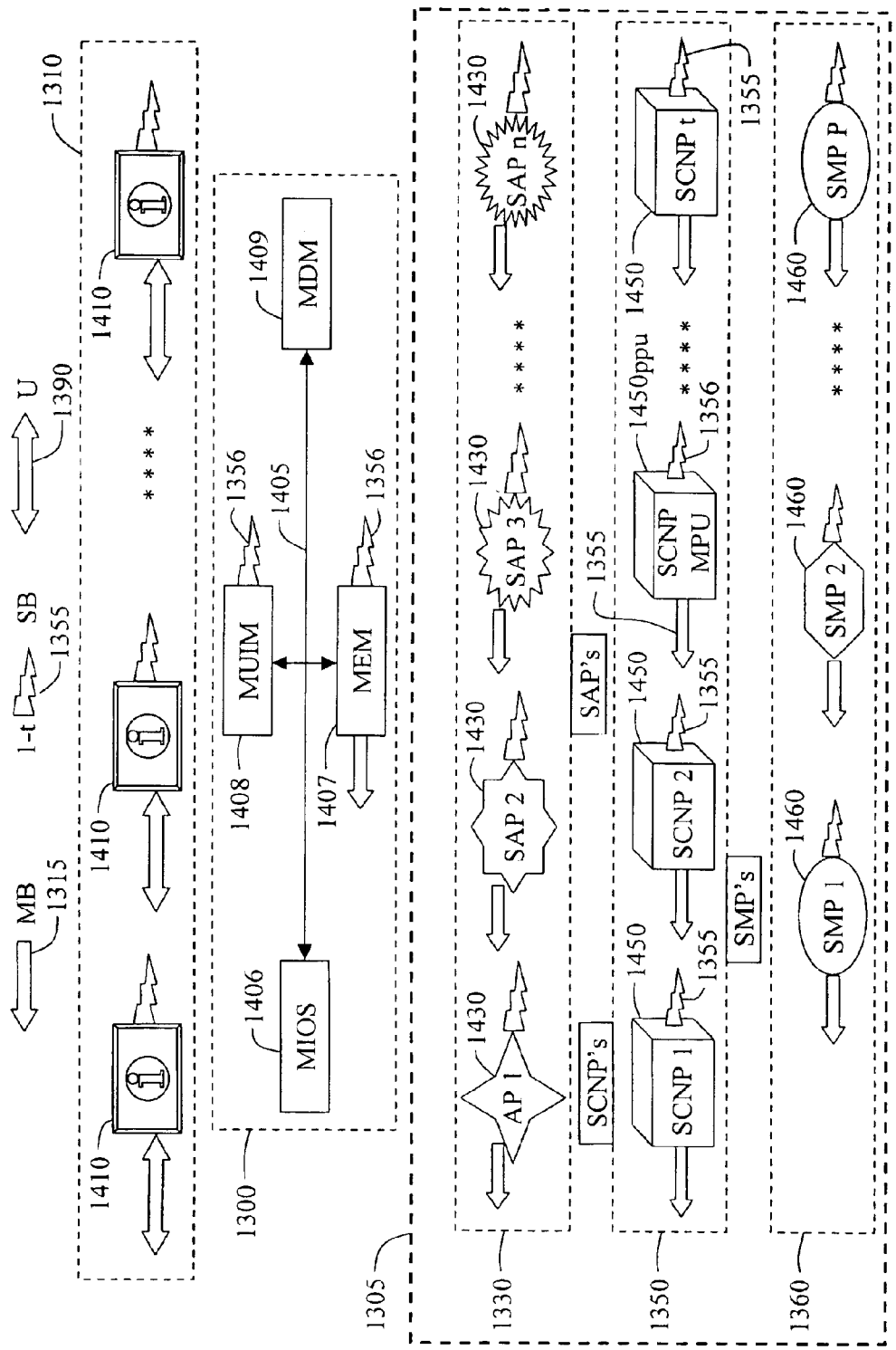

FIG. 14 is a block diagram showing a Generic User Elements (GUE) connected to a System Bus (SB) and a Master Bus (MB).

Figure 14A:
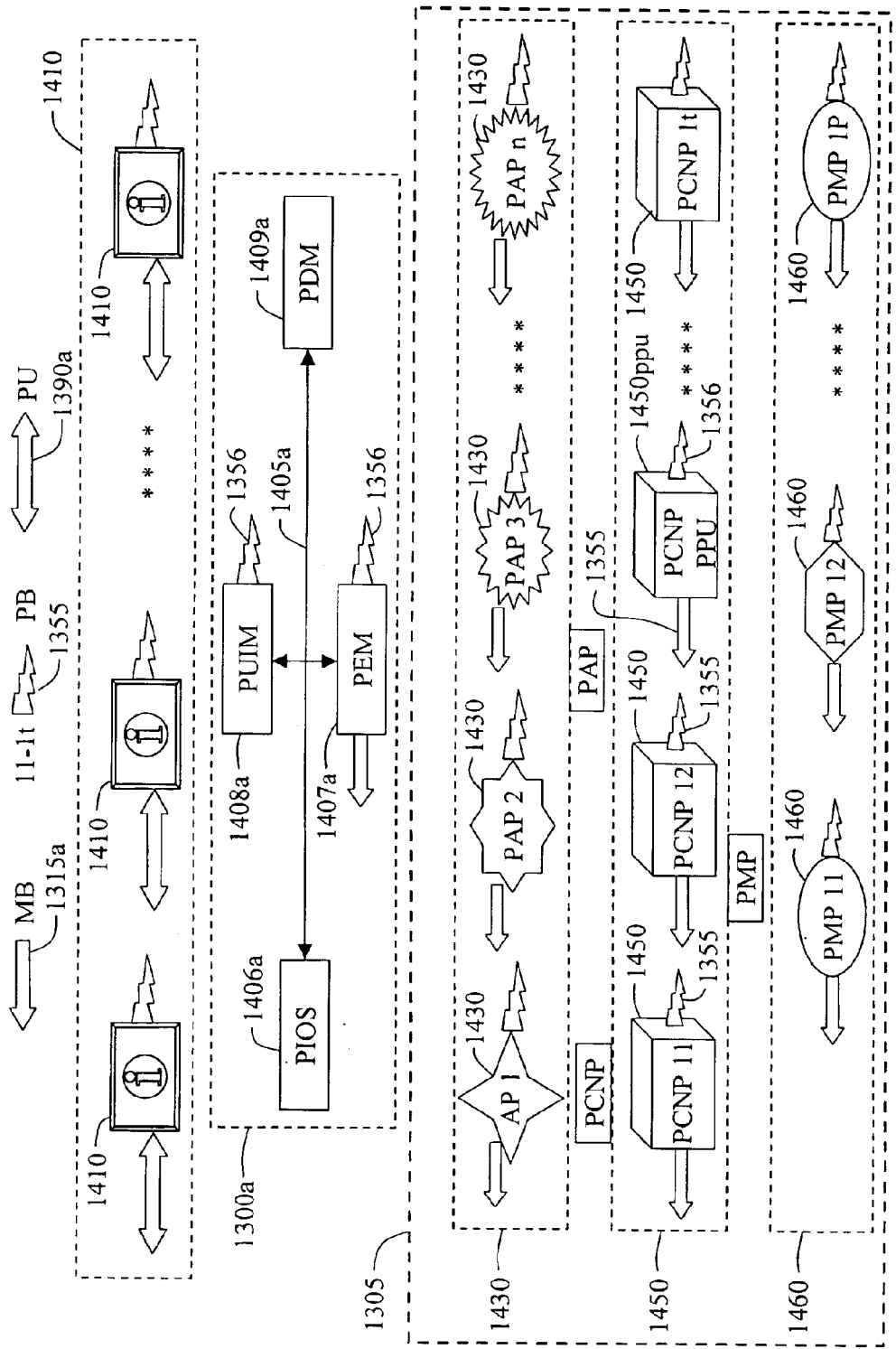

FIG. 14a is a block diagram showing the Master Operating Software System (MOSS) Generic User Elements for a single theme park.

Figure 14B:
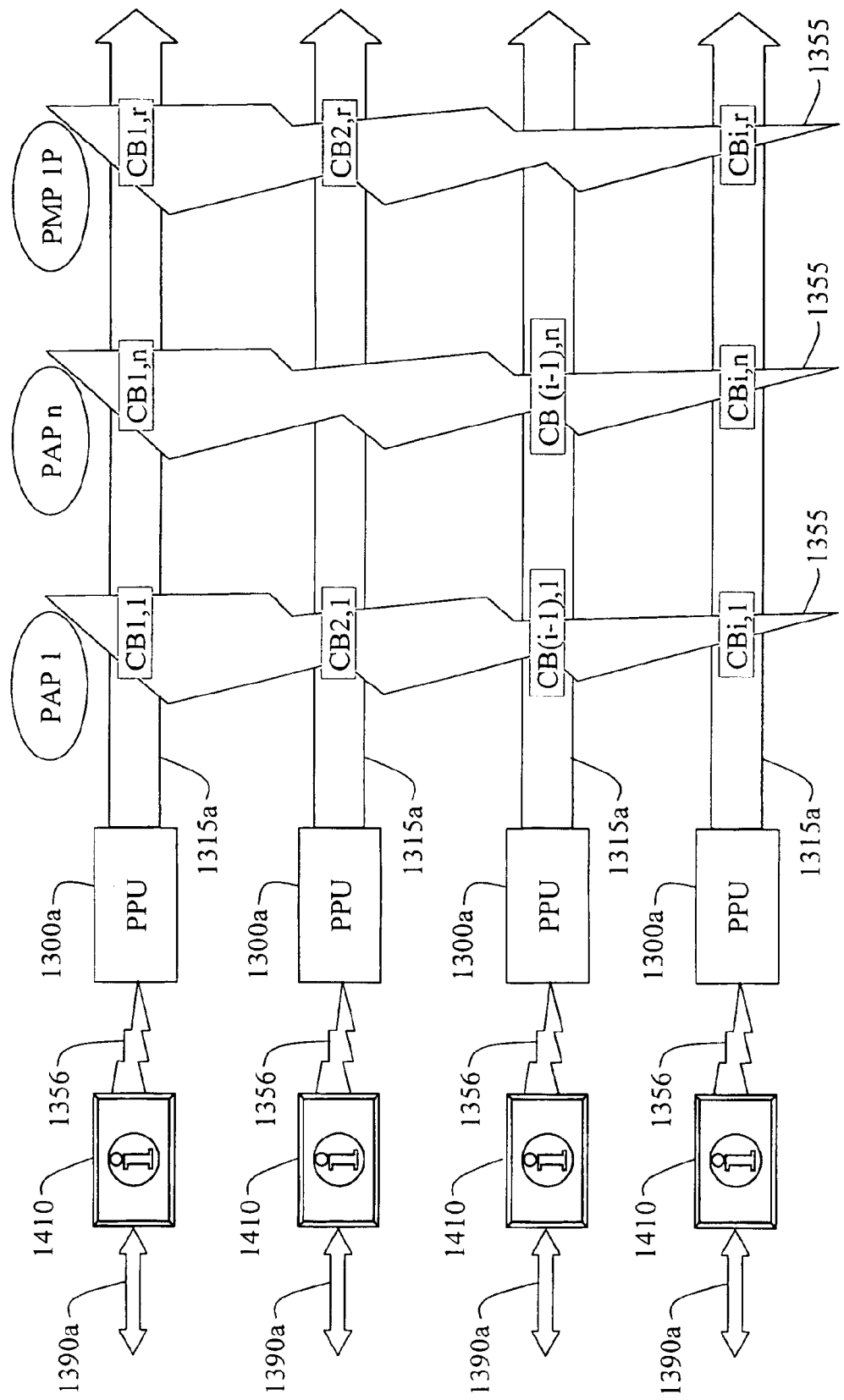

FIG. 14b is a block diagram showing the Master Bus (MB) and a Park Bus (PB) Converter Box (CB) design matrix.

Figure 15:
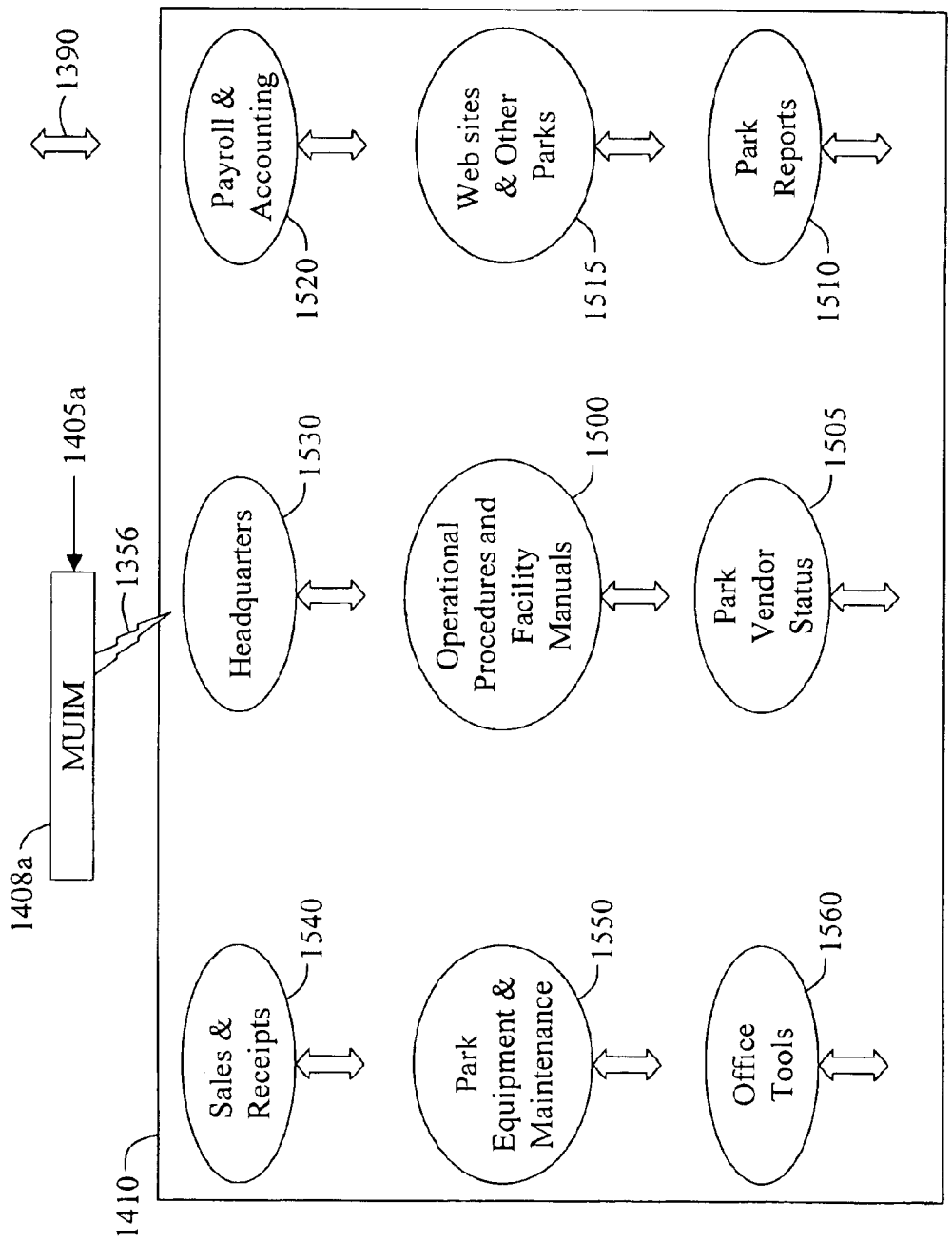

FIG. 15 is a block diagram showing an example of a Park User Interface (PUI) for generic theme park MOSS terminal controlled by a Master User Interface Manager (MUIM).

Figure 16:
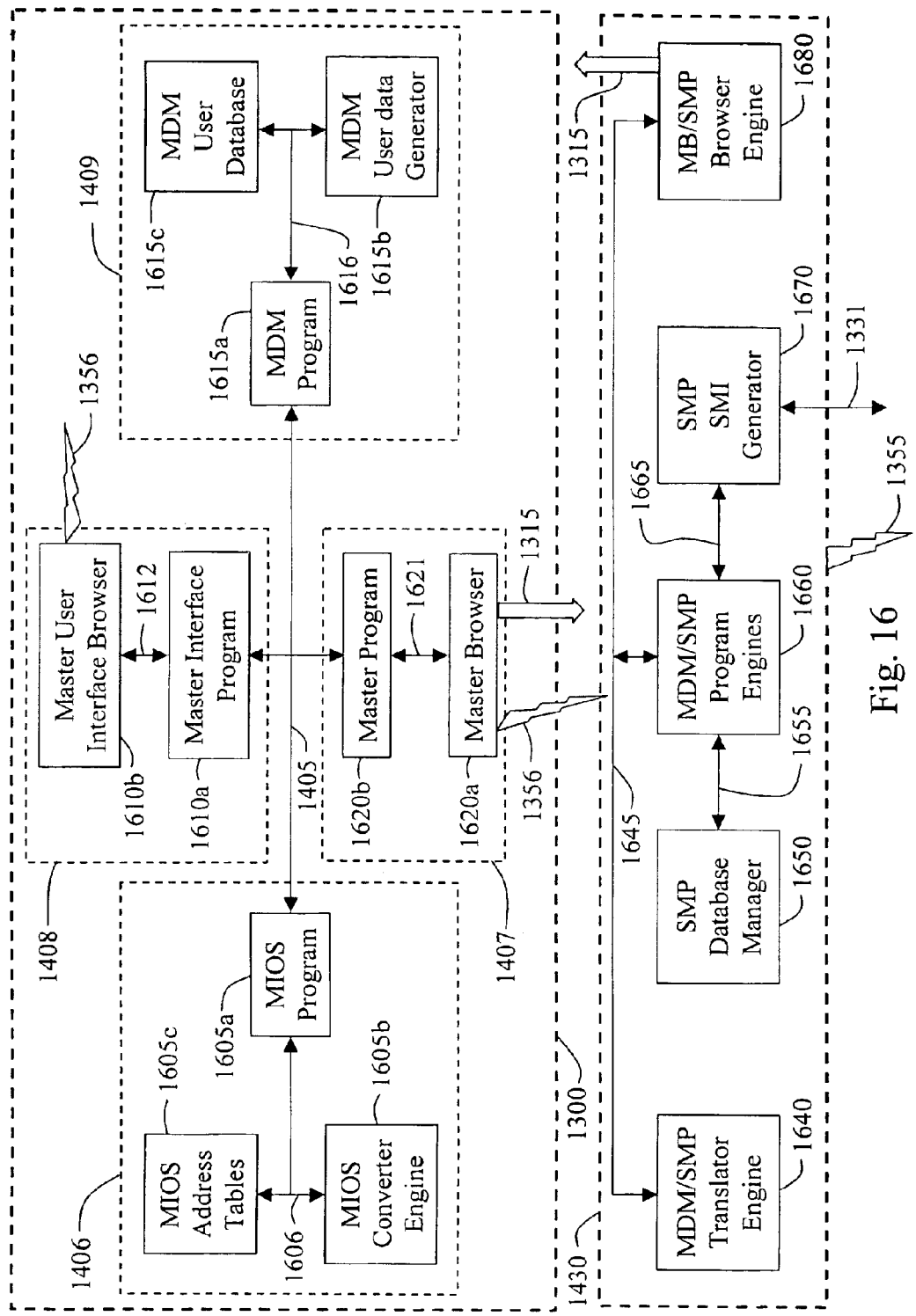

FIG. 16 is a block diagram showing the MOSS and a System Application Program (SAP) converter box interface diagram.

Figure 17:
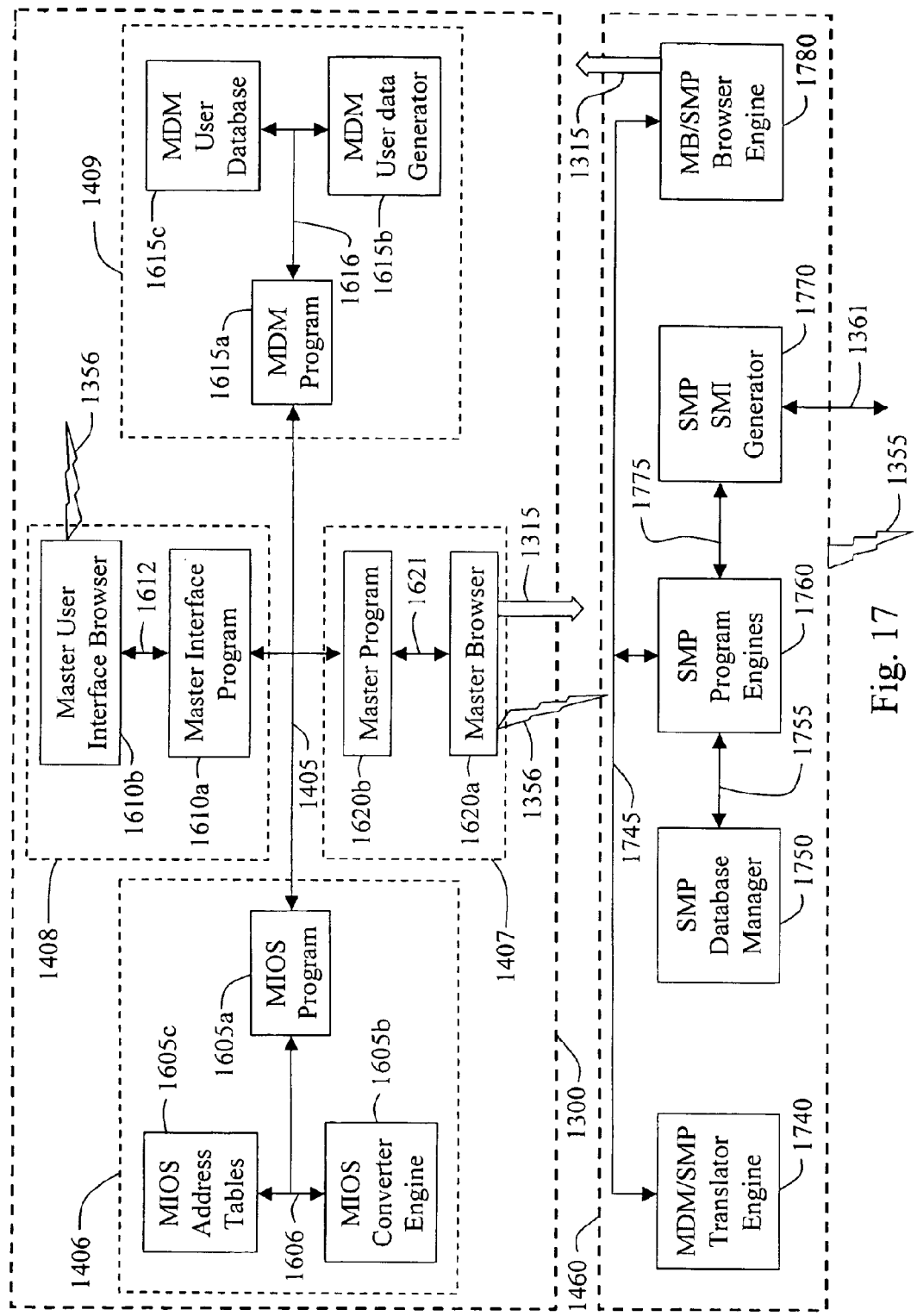

FIG. 17 is a block diagram showing the MOSS and a System Machine Program (SMP) converter box interface diagram.

Figure 18:
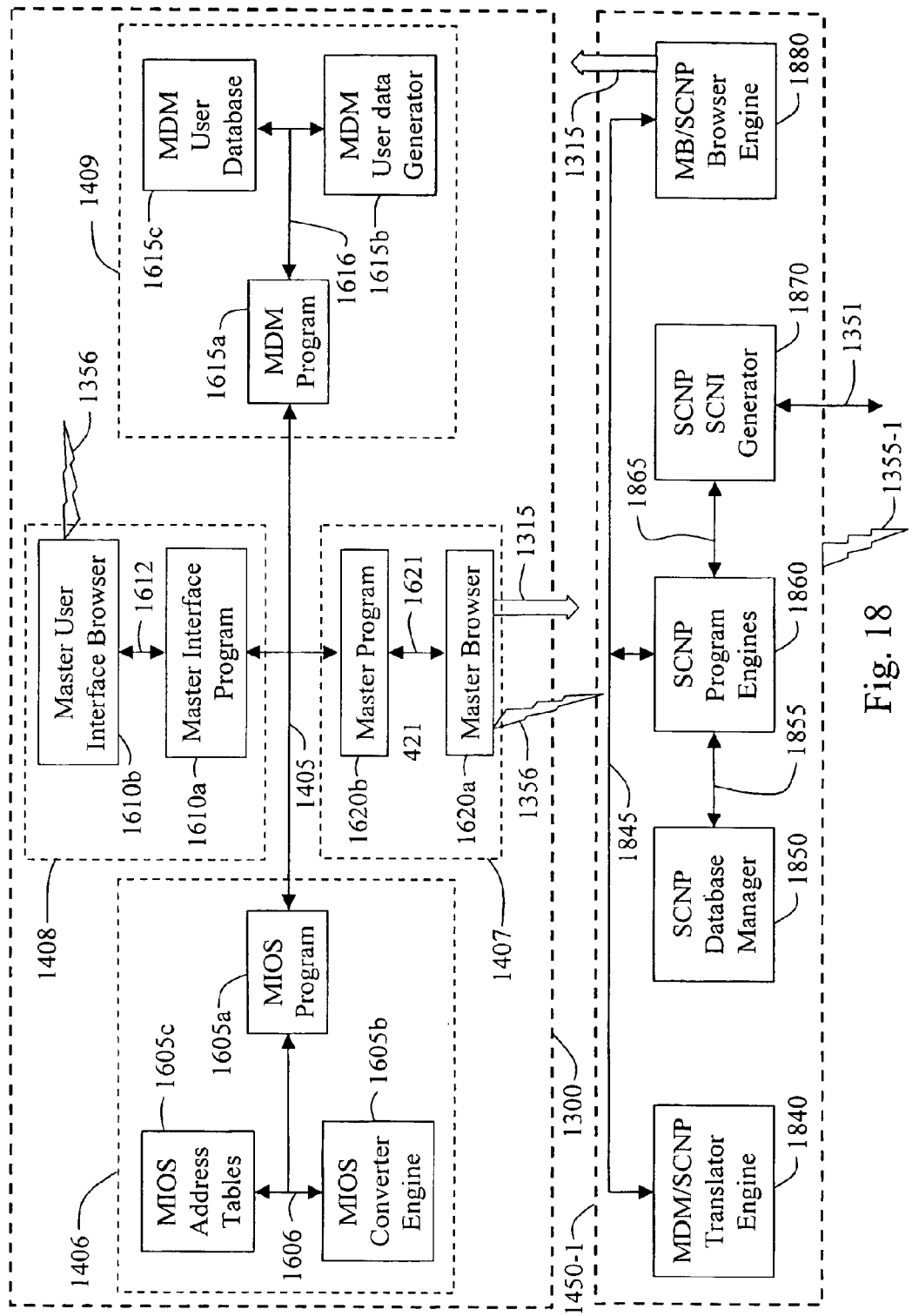

FIG. 18 is a block diagram showing the MOSS and a System Computer Network Programs (SCNP) converter box interface diagram.

Figure 19:
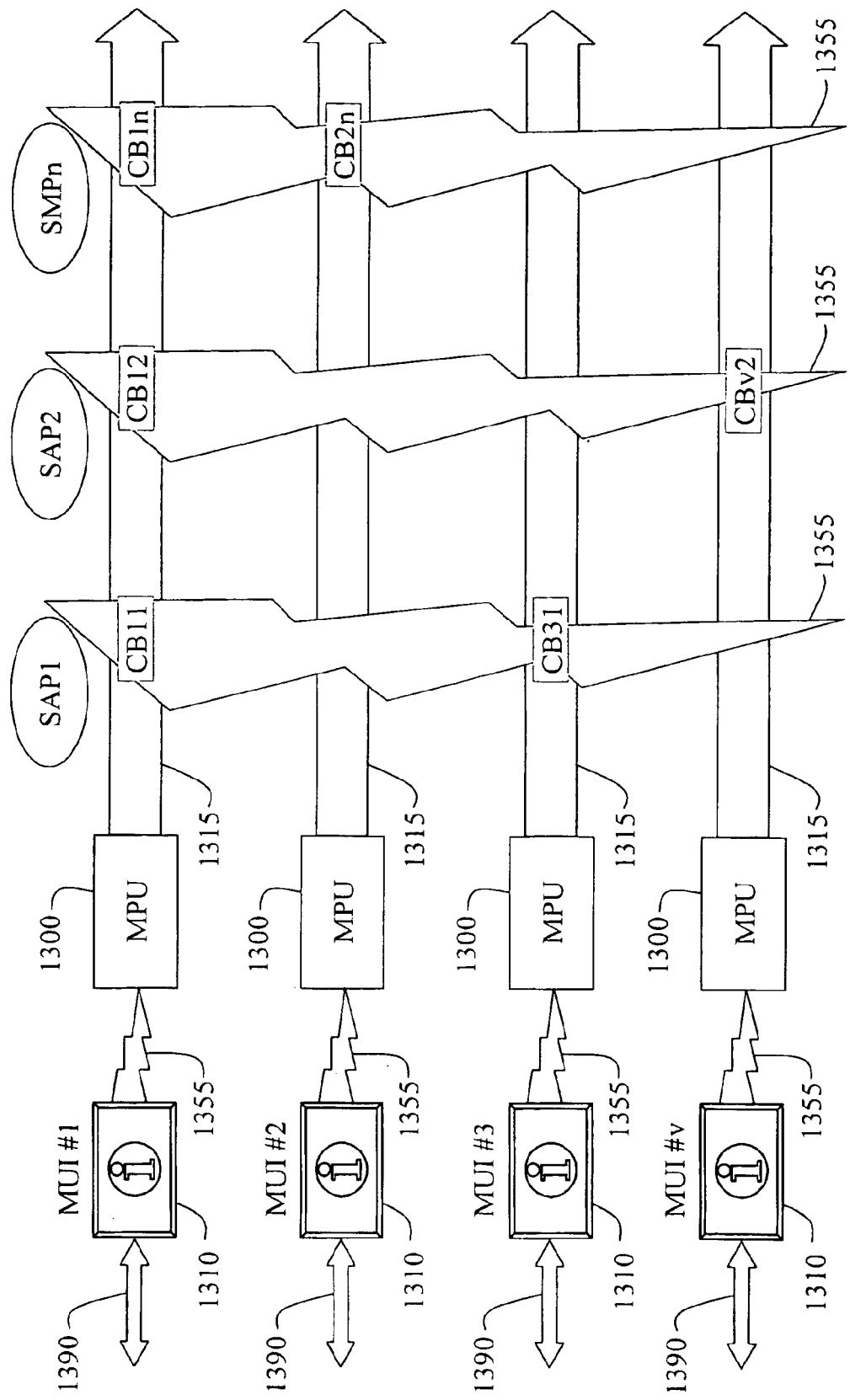

FIG. 19 is a block diagram showing the Master Bus and System Bus address system interconnection logic diagram.

FIG. 20 is a table showing a Master Input Output System (MIOS) address matrix for an N Application Program (AP) user SB with V user Master User Interface MUI types.

FIG. 21 is a table showing an example of a MIOS converter engine matrix for an N*V user system.

FIG. 22 is a table showing an example of a MIOS converter browser engine matrix for an N*V user system.

FIG. 22a is a table showing an example of a MIOS Search Engine (SE) matrix for an N*V user system.

FIG. 23 is a MIOS table for a 20 application user system having 5 type relations to generate 100 potential MUI each with (r) CE.

FIG. 24 is a MIOS table for a 20 application user system having 5 type relations to generate 100 potential MUI each with (t) TE.

FIG. 25 is a table for 536 generic master programs with user and sub user categories taken from the Standard Industrial Category (SIC) tables.

Figure 26:
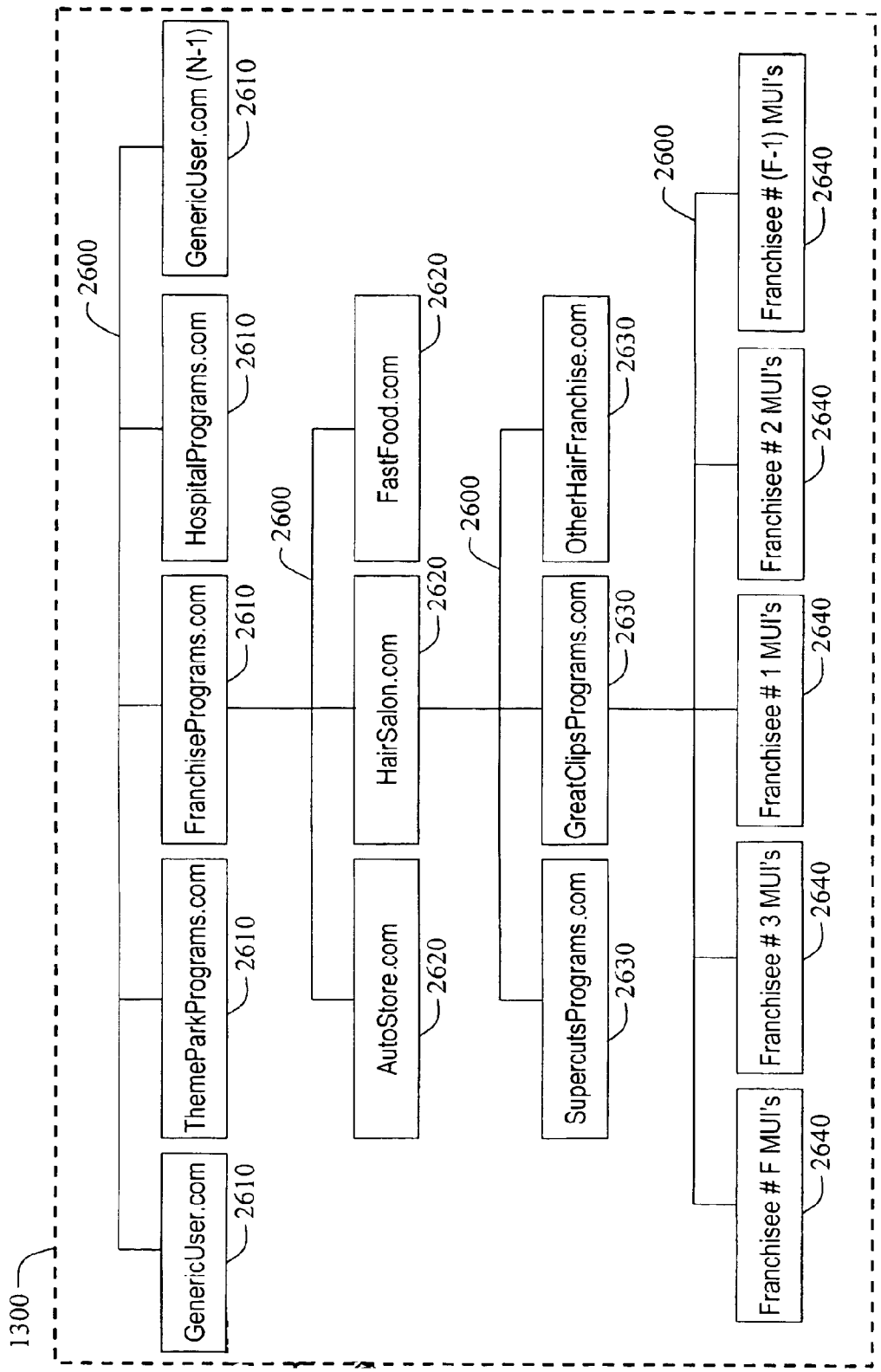

FIG. 26 is a block diagram showing specifically how a generic user renting MOSS master program from an Internet Service Provider (ISP), feeds a local MUI.

Figure 27:
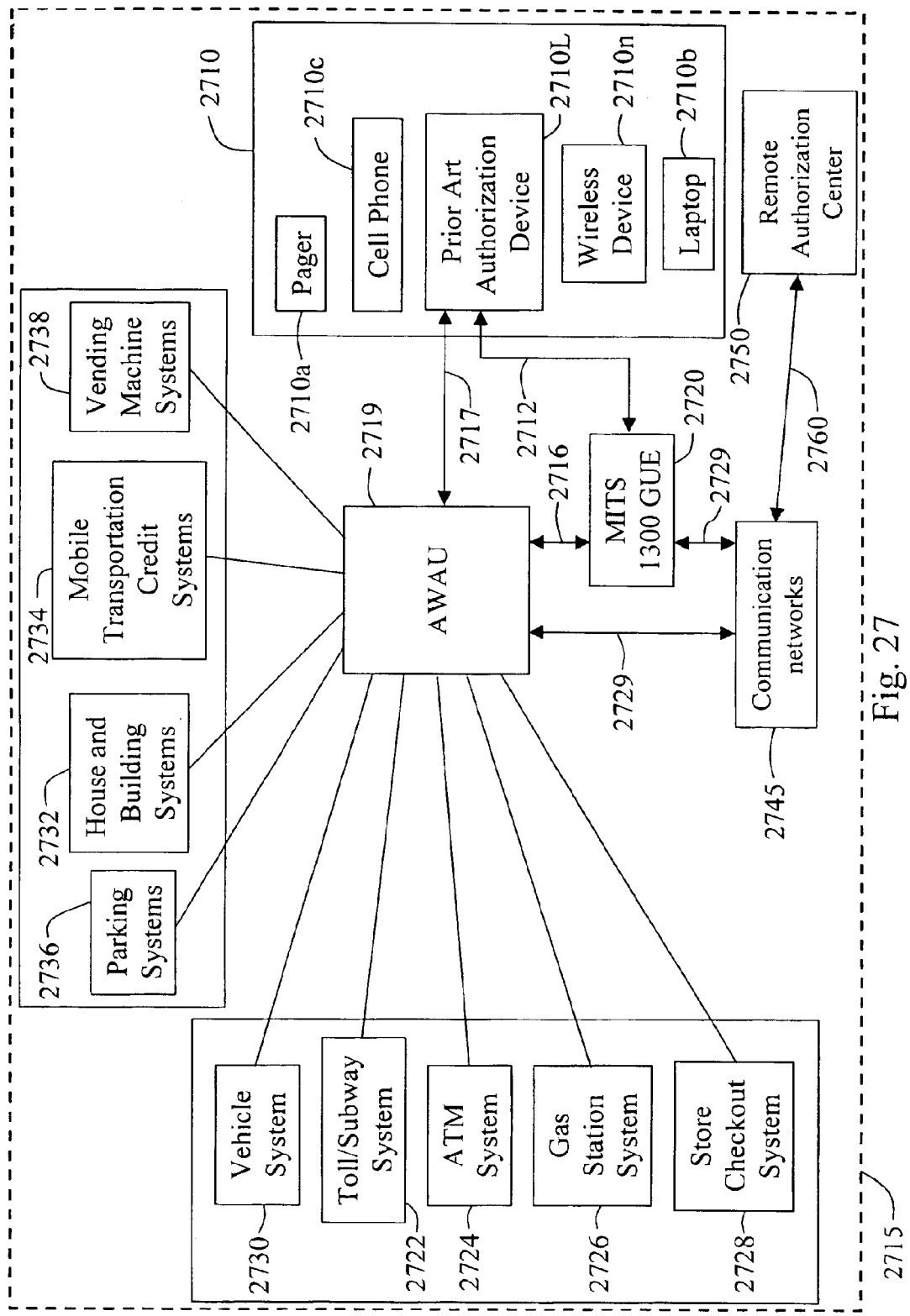

FIG. 27 is a block diagram showing a MOSS for automating portable computers and wireless communication devices.

Figure 28:
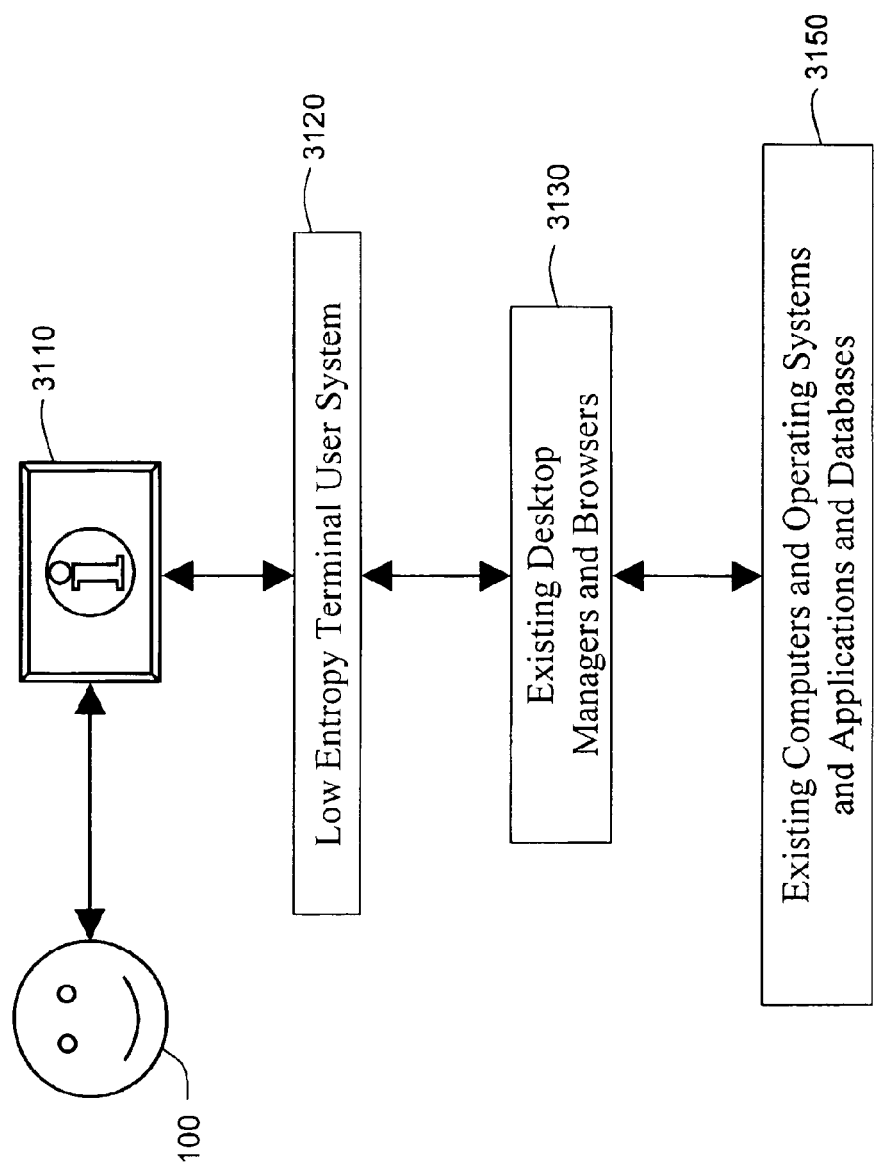

FIG. 28 is a diagram illustrating a low entropy terminal user system (LETUS) connecting a user to a computer system.

Figure 29:
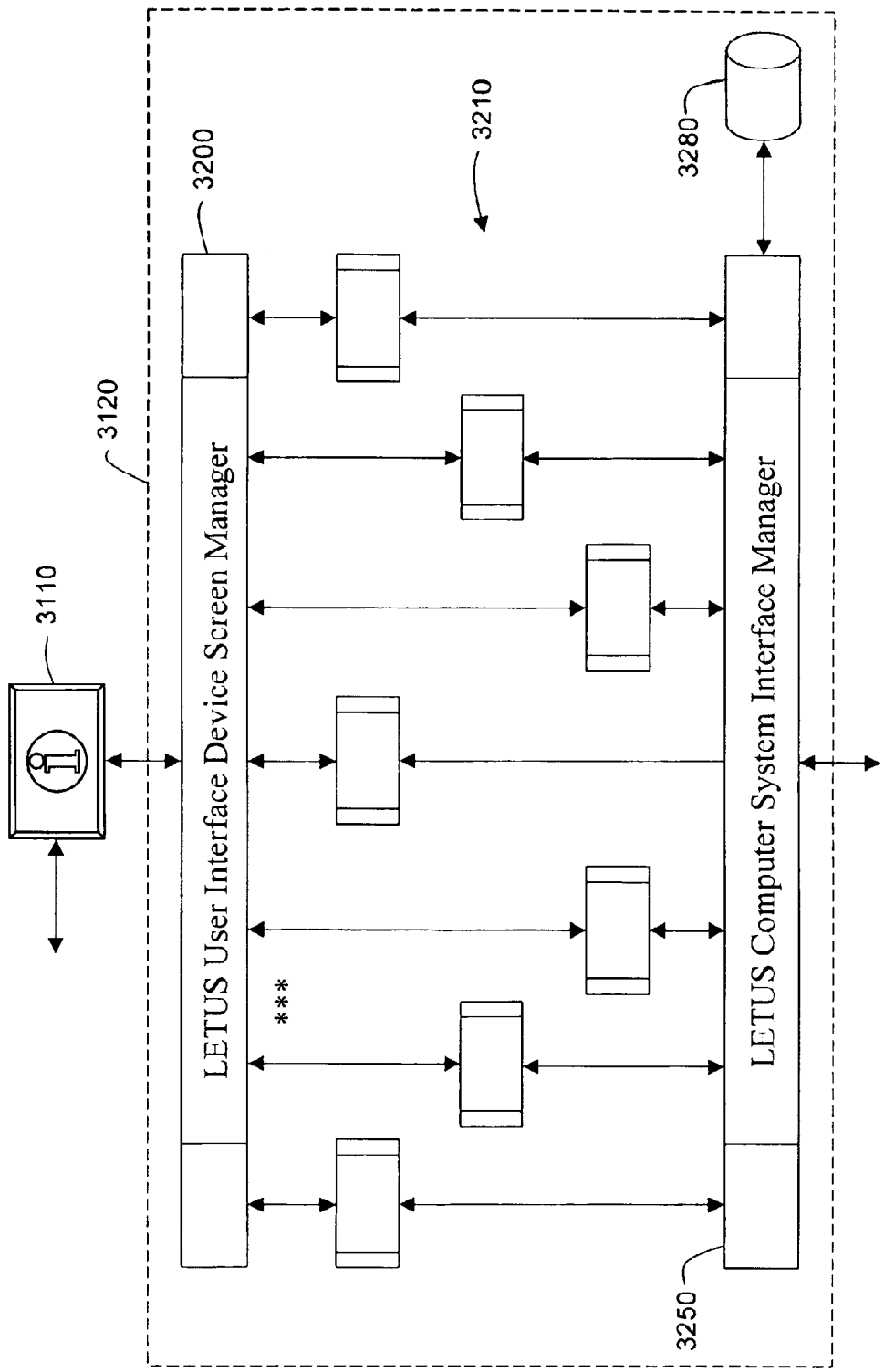

FIG. 29 is an illustration of the LETUS programs logic flow for each type screen.

Figure 30:
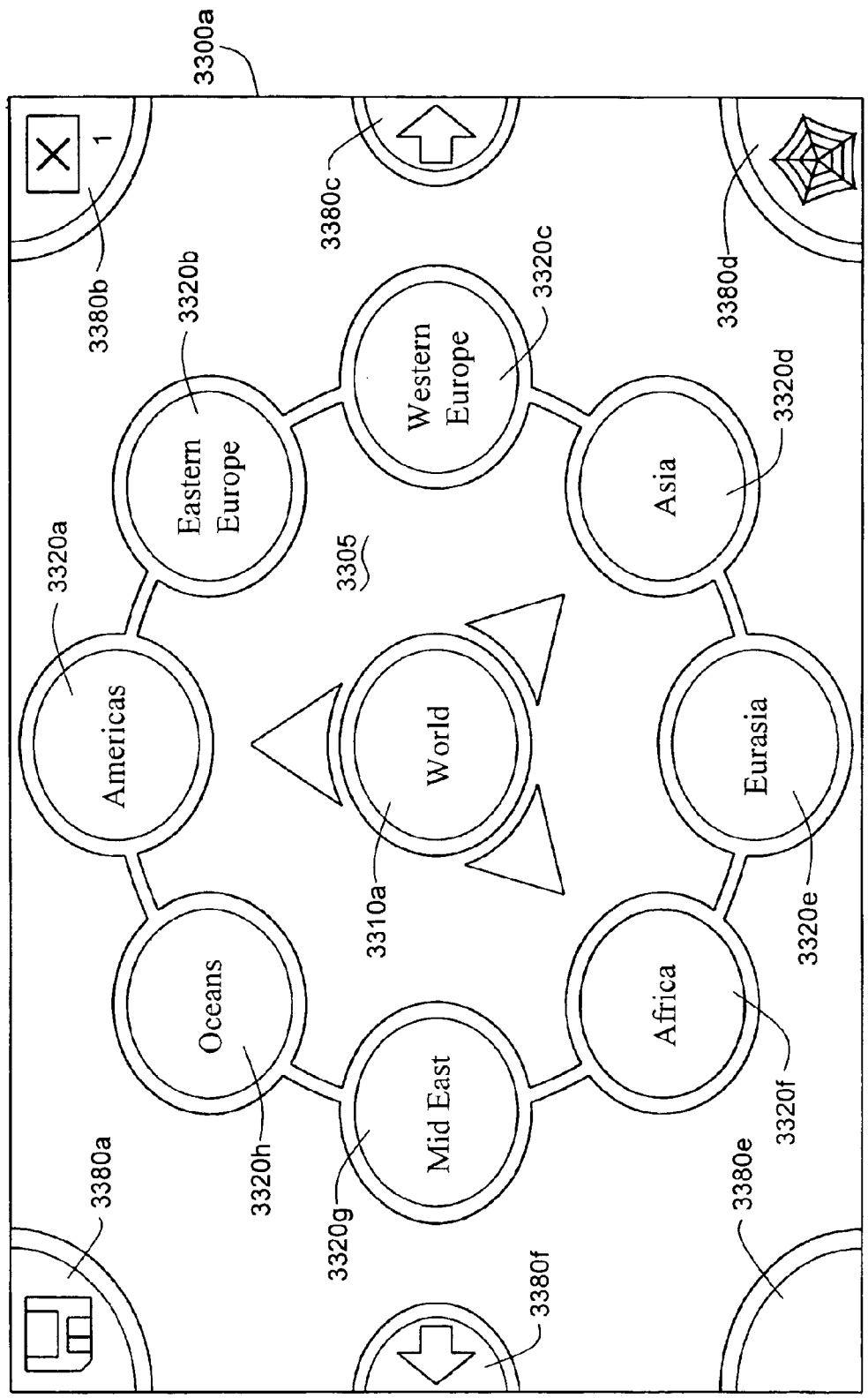

FIG. 30 shows a basic LETUS equivalence class level selection output.

Figure 31:
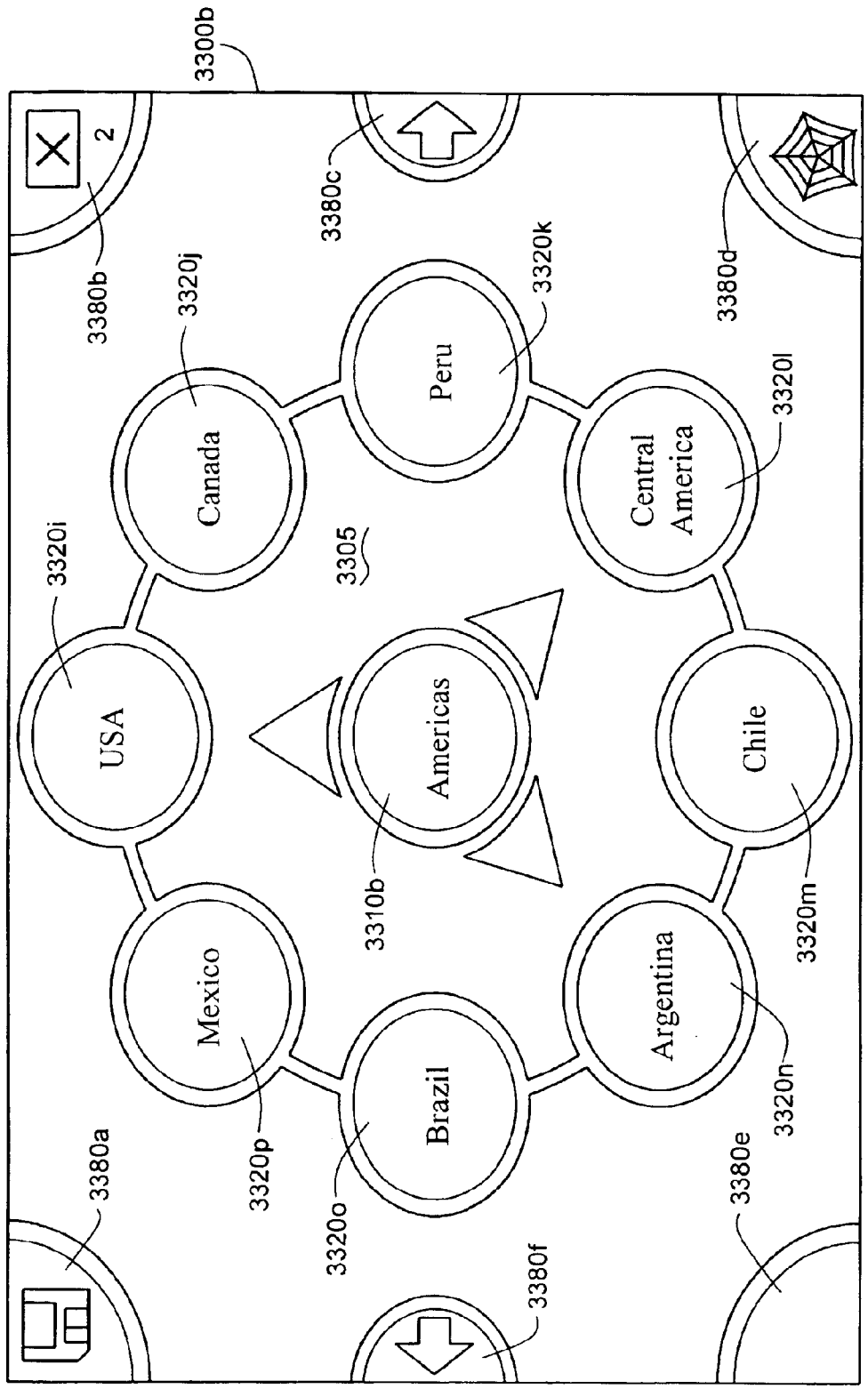

FIG. 31 shows a second equivalence class level selection output.

Figure 32:
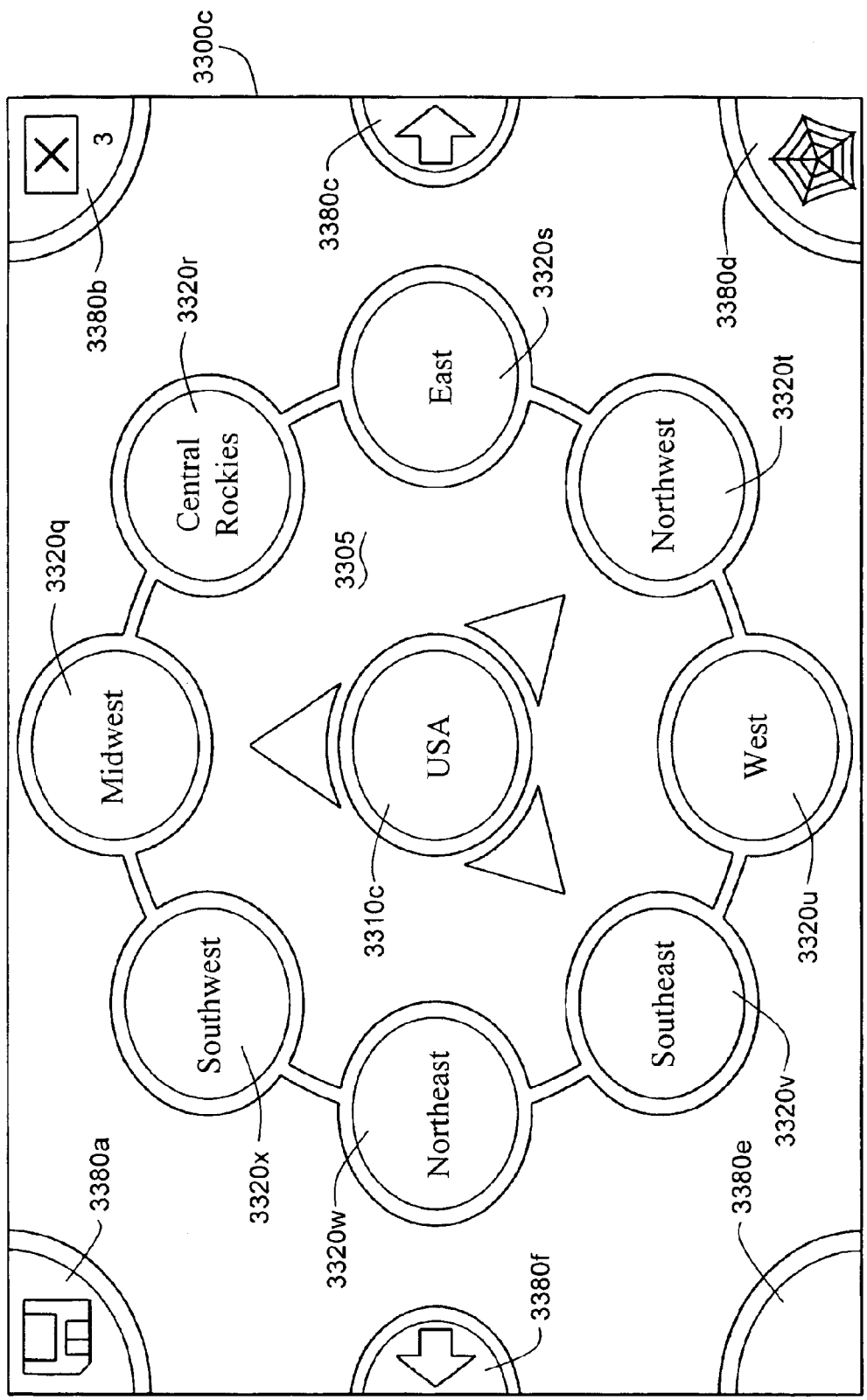

FIG. 32 shows a third equivalence class level selection output.

Figure 33:
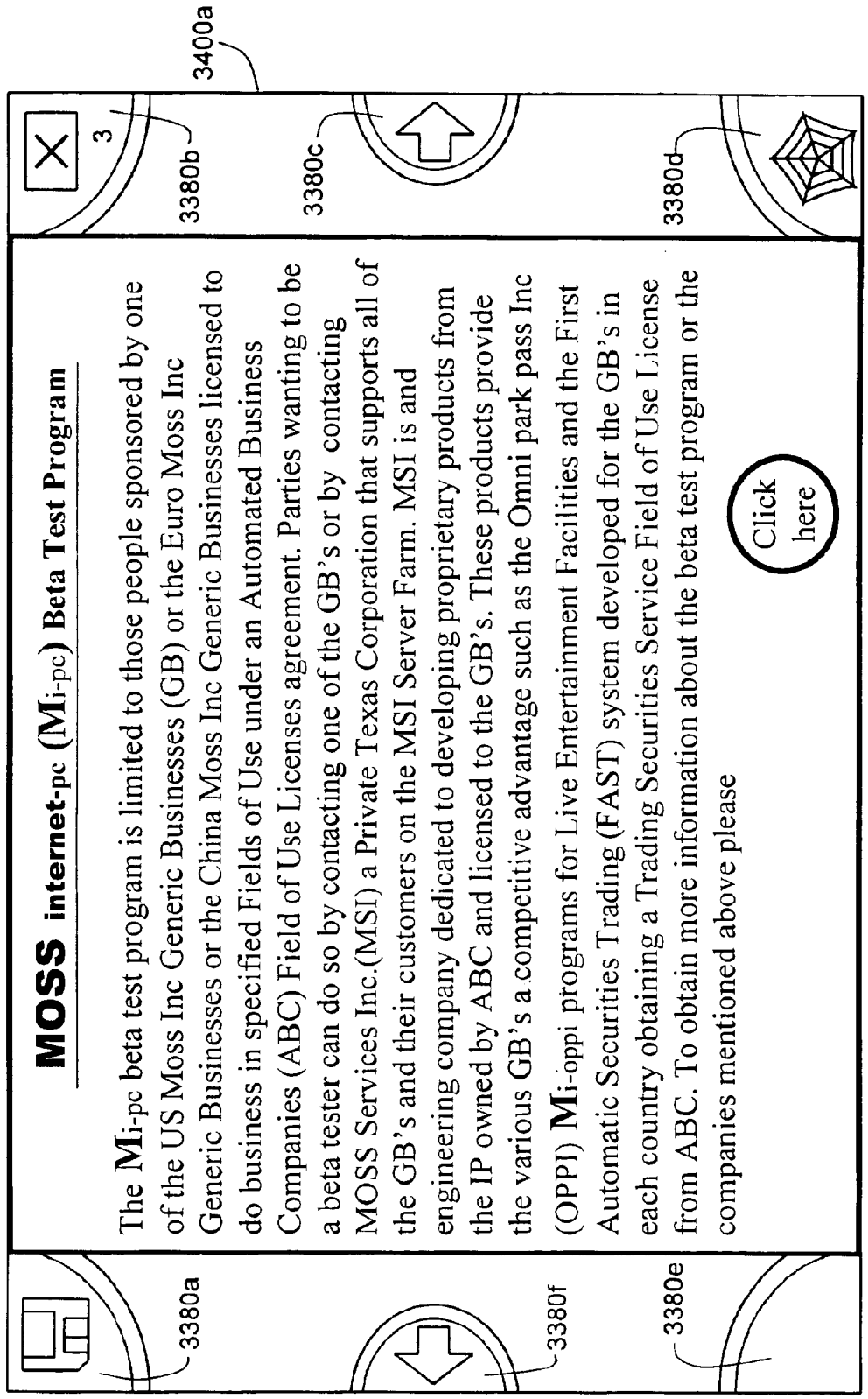

FIG. 33 shows an information output screen.

Figure 34:
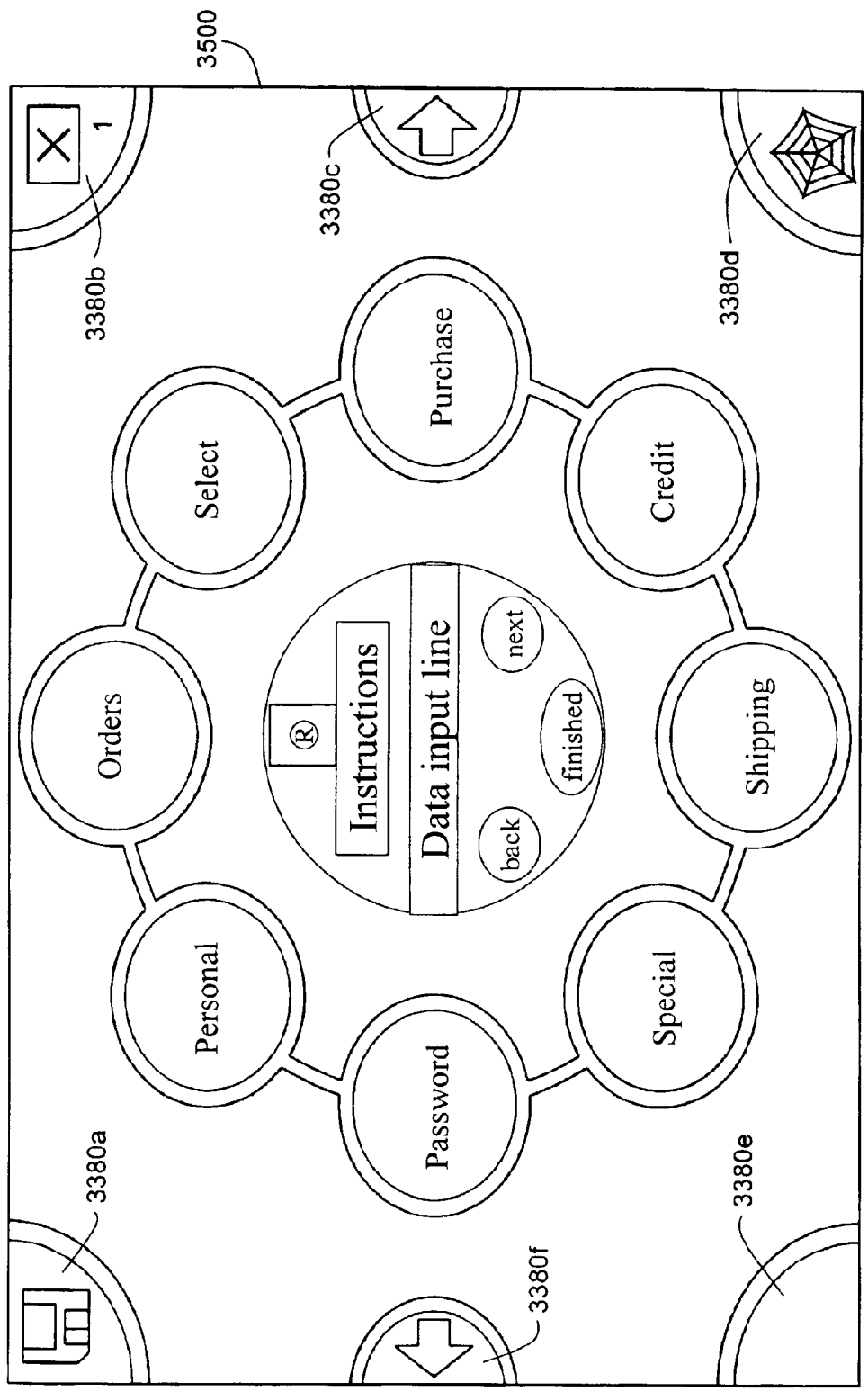

FIG. 34 shows a basic LETUS data entry output.

Figure 35:
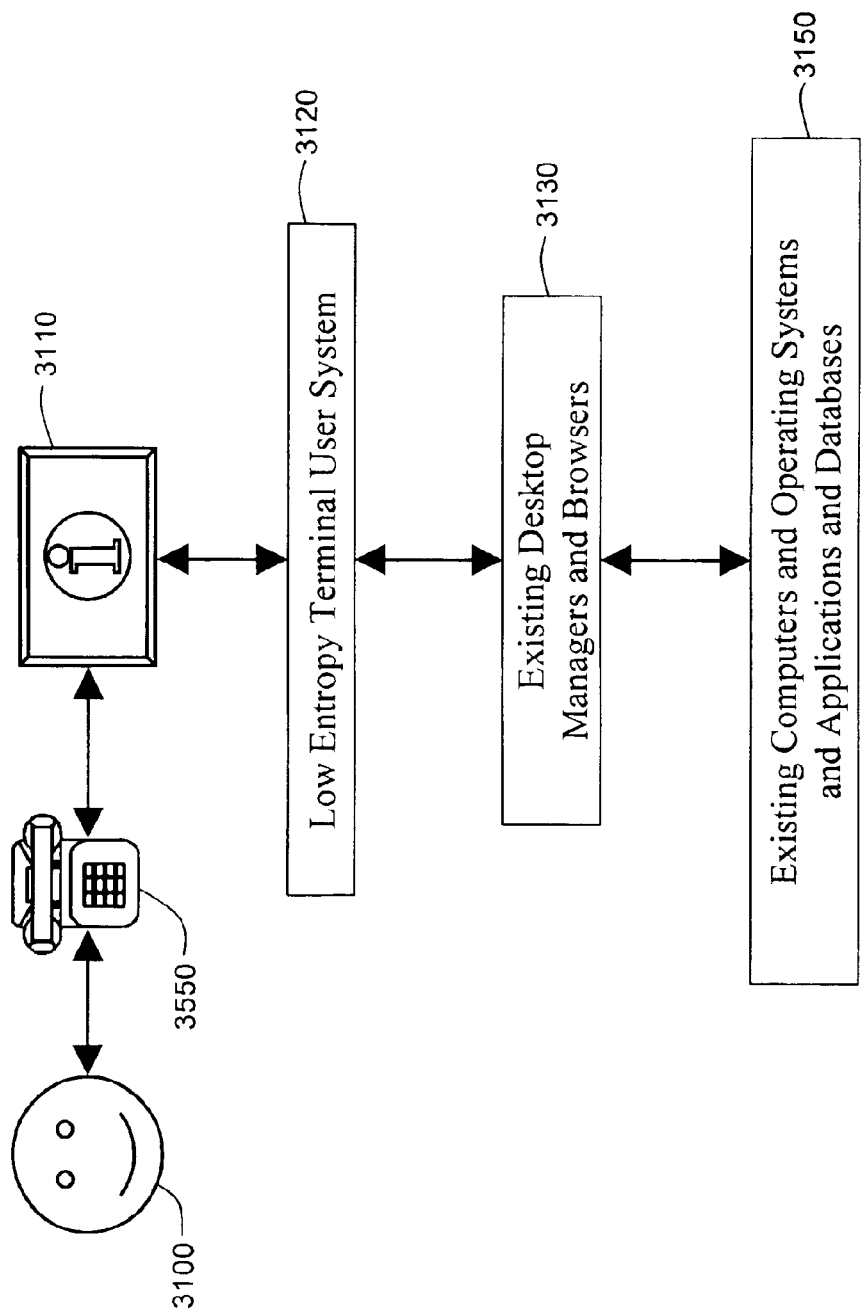

FIG. 35 is a diagram illustrating a LETUS connecting audio device users to a computer system.

Figure 36:
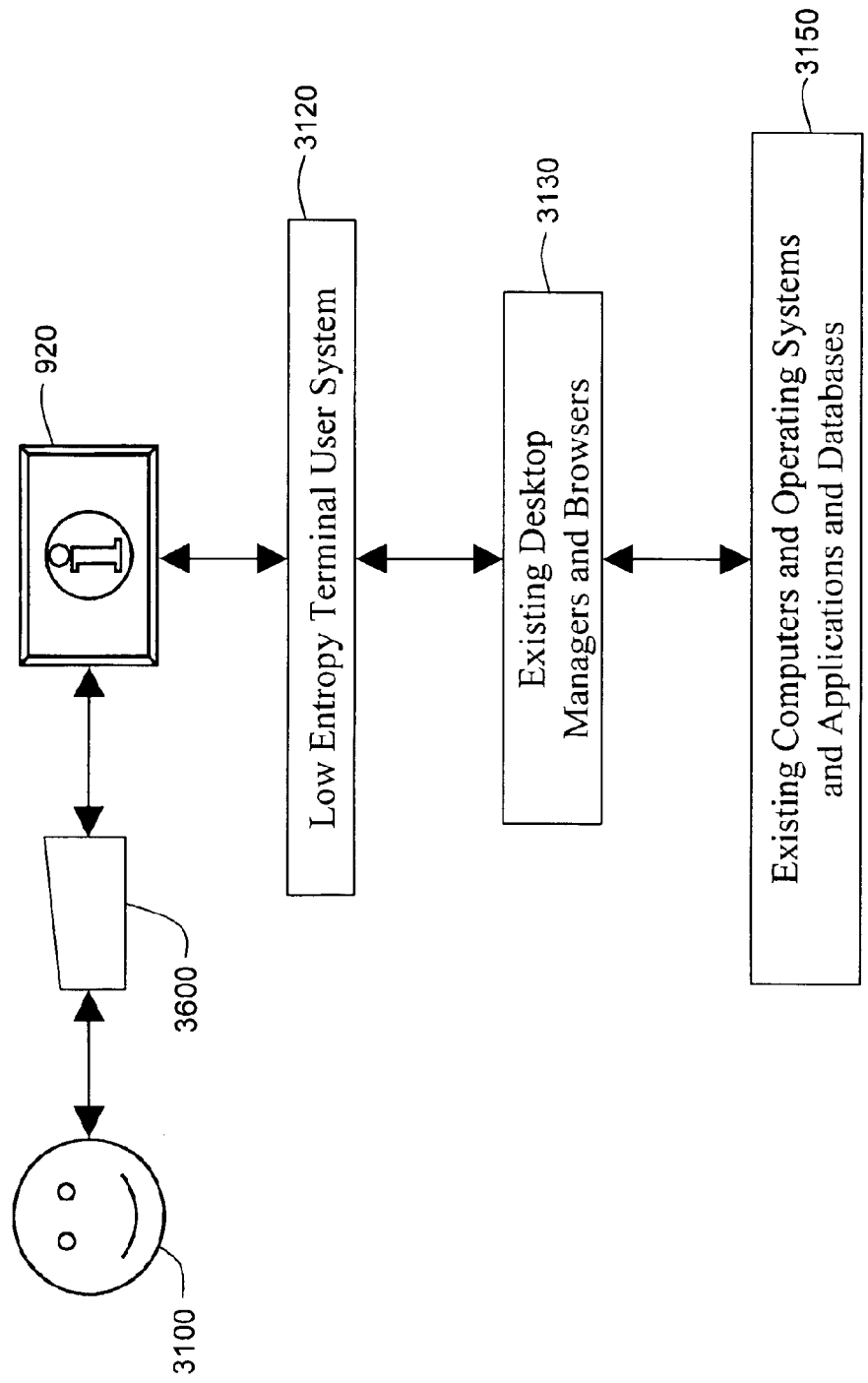
Figure 37B:
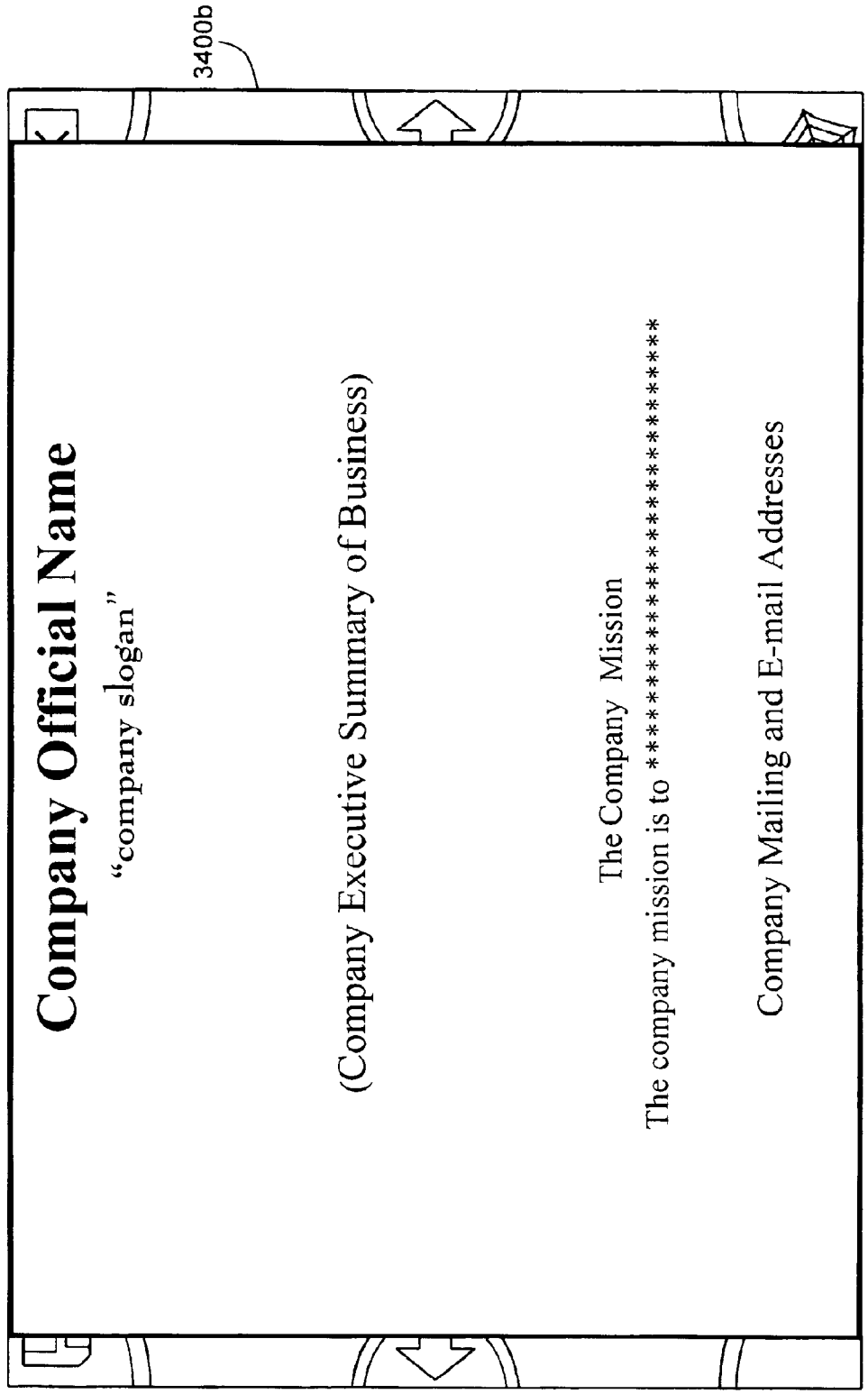
Figure 37C:
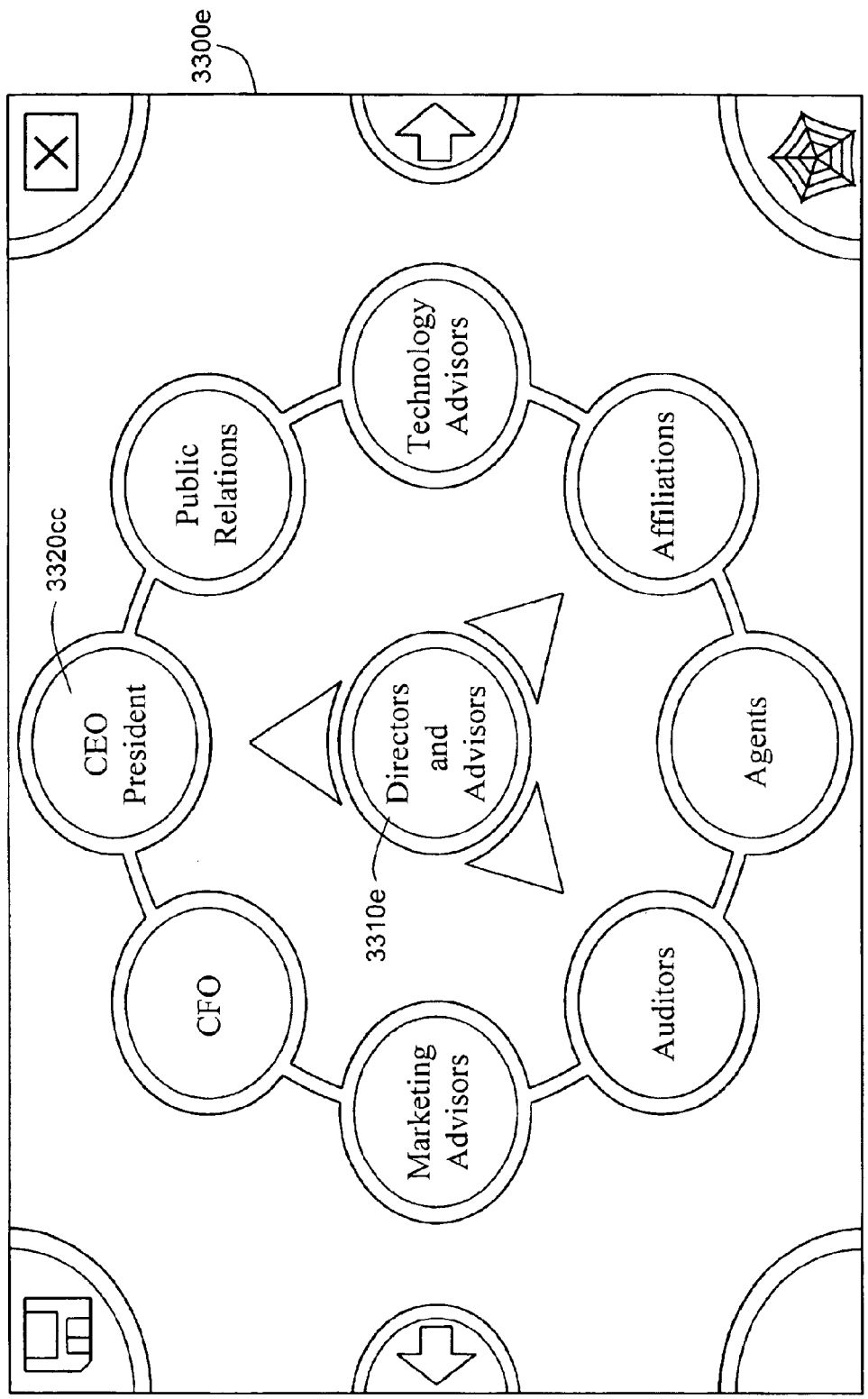
Figure 37D:
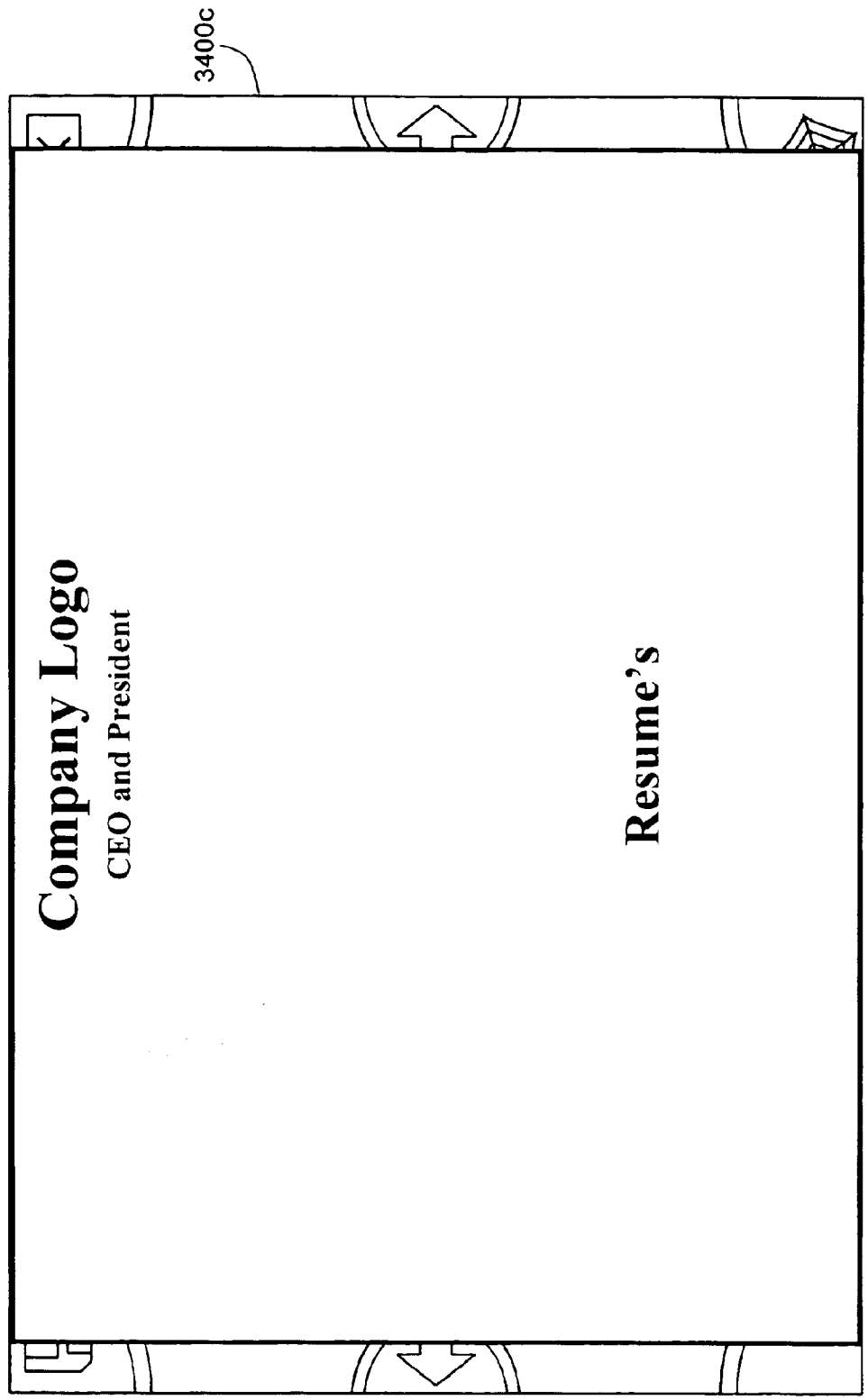
Figure 37E:
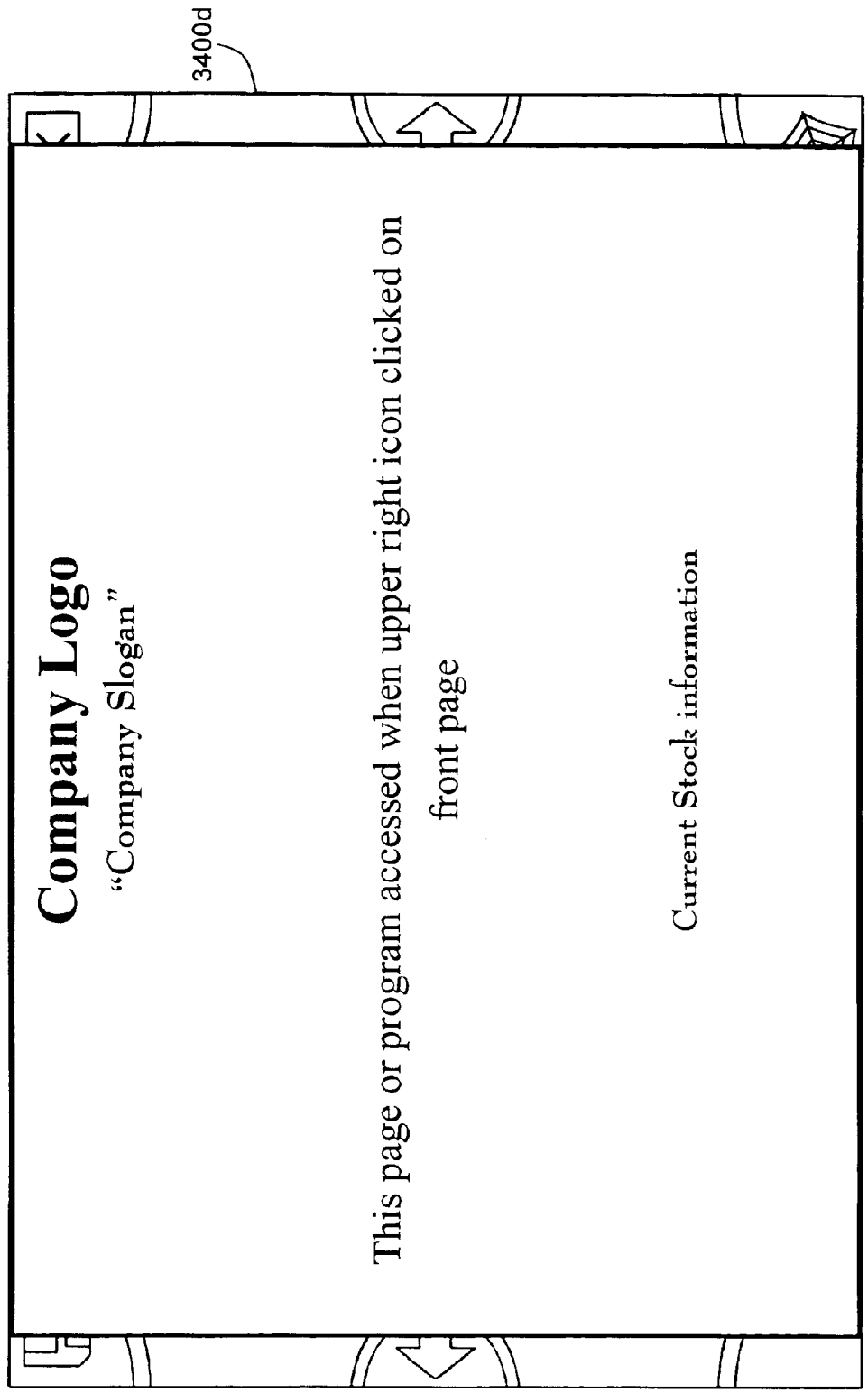
Figure 37F:
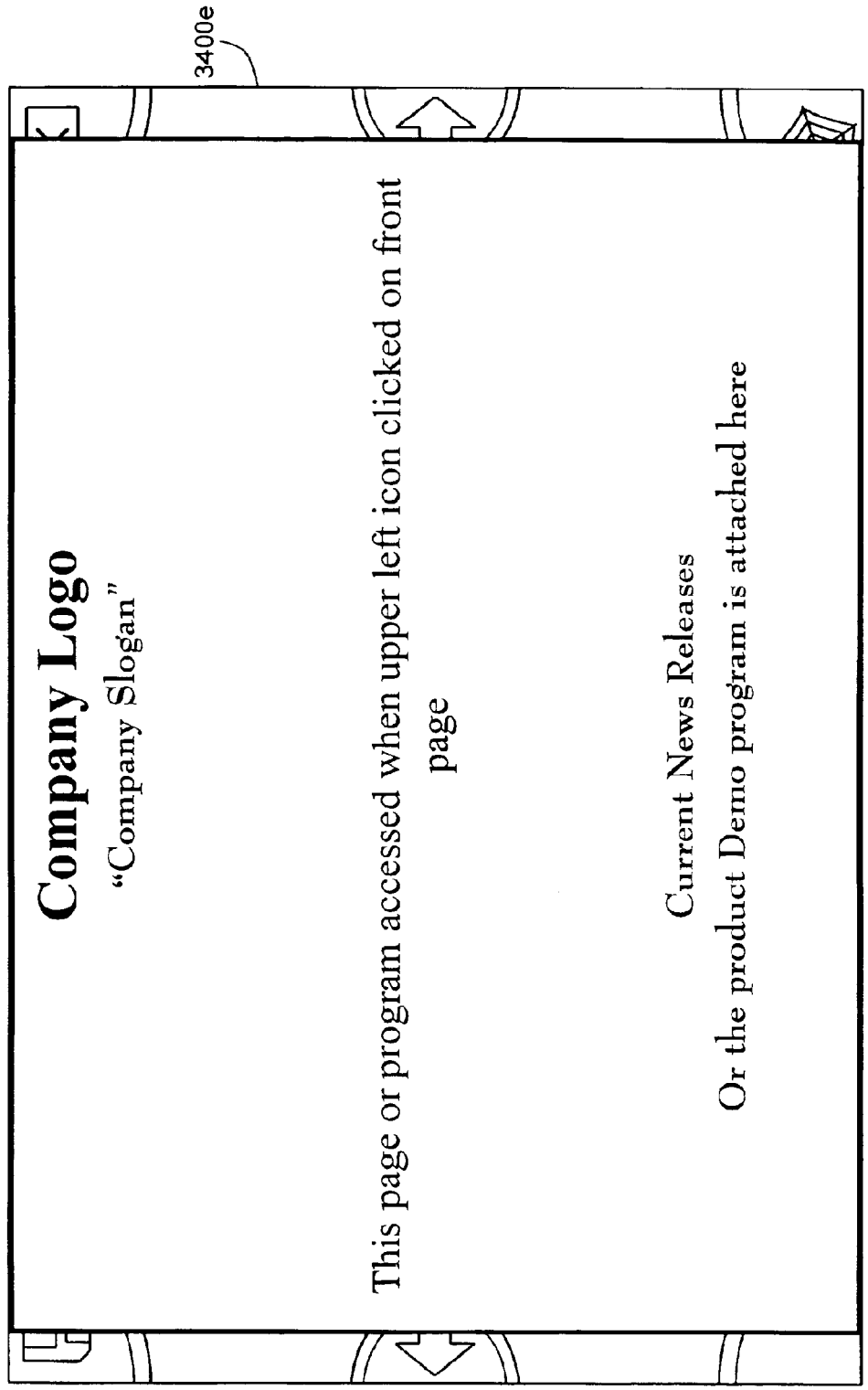
Figure 37G:
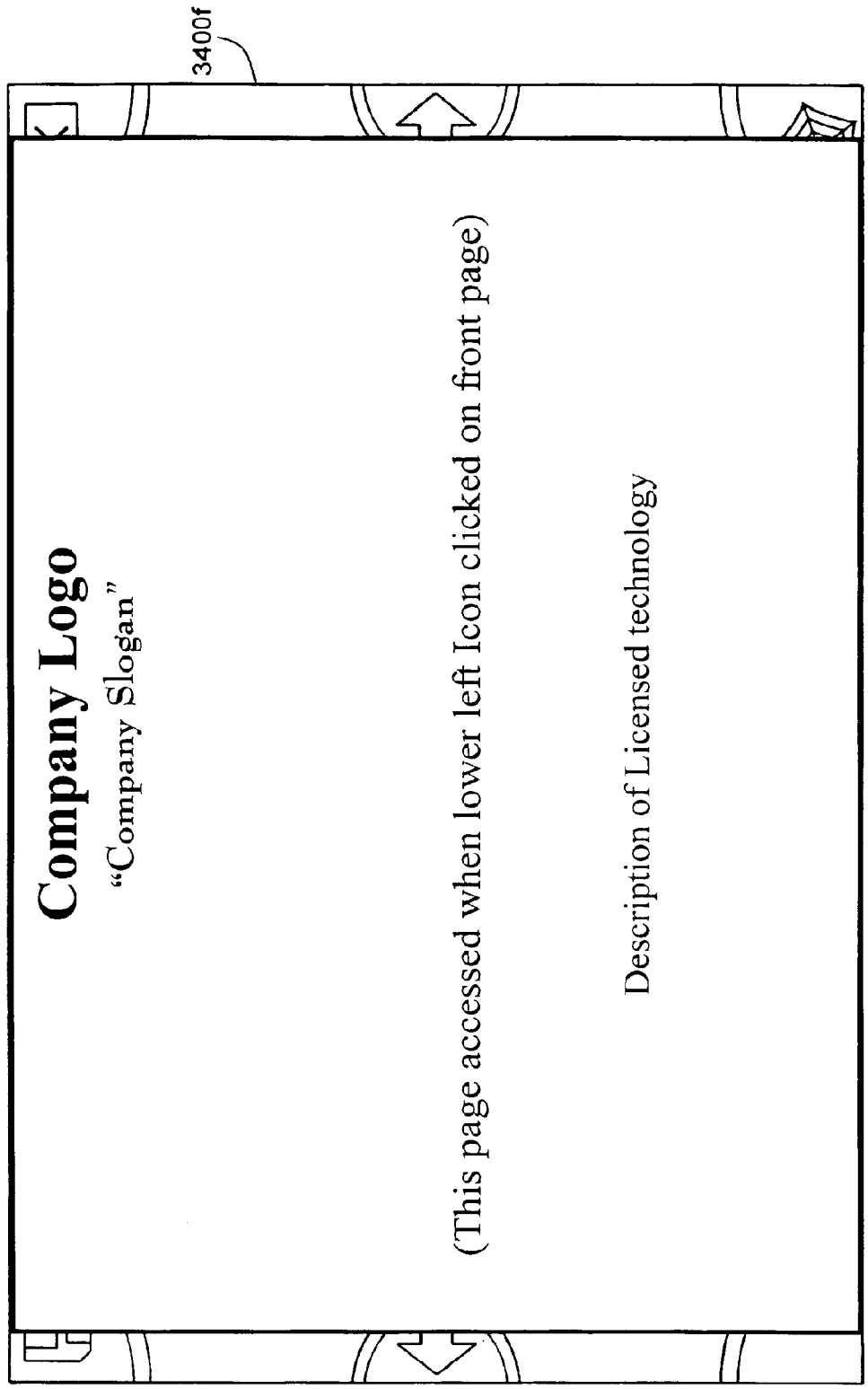
Figure 37H:
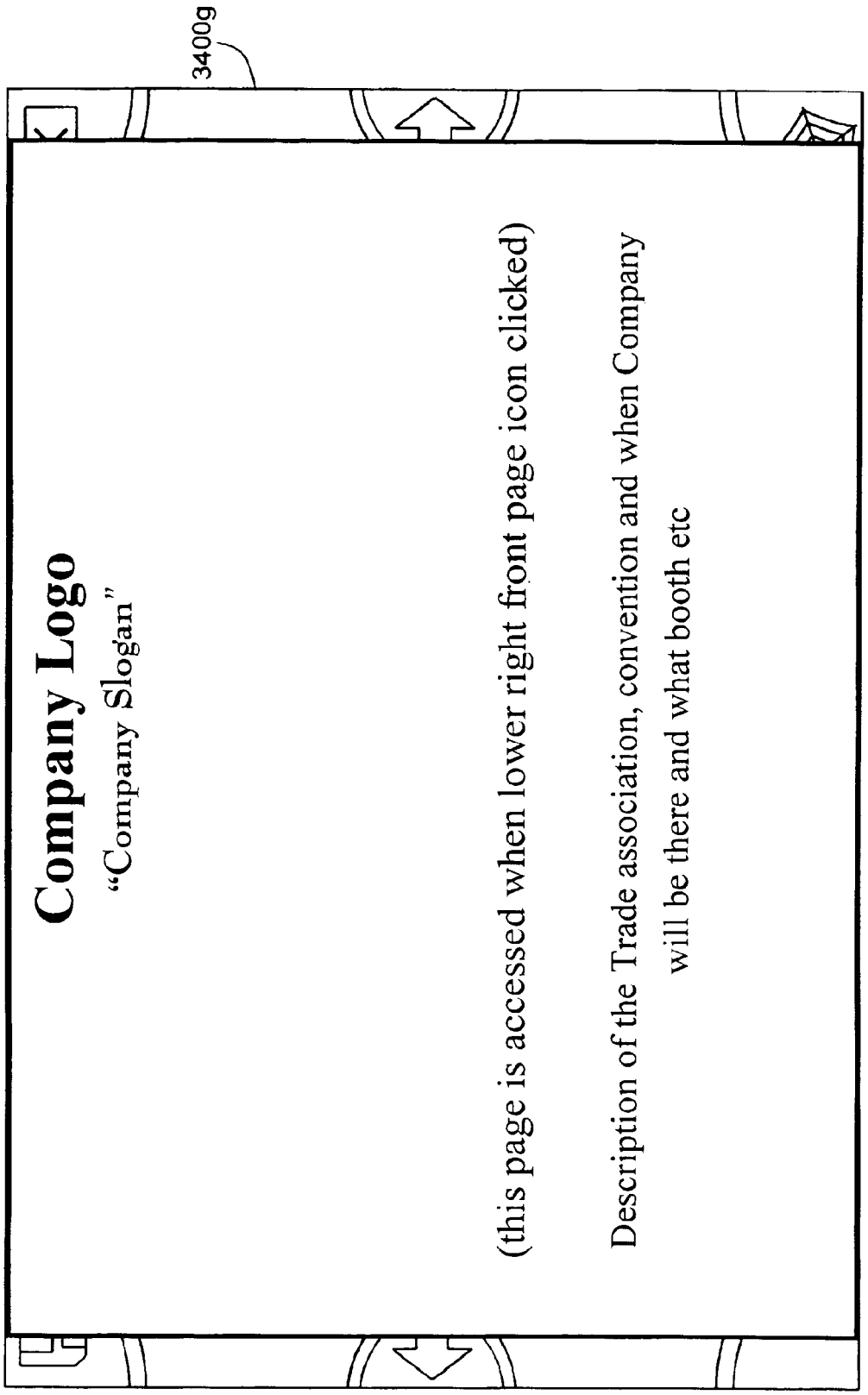
Figure 37I:
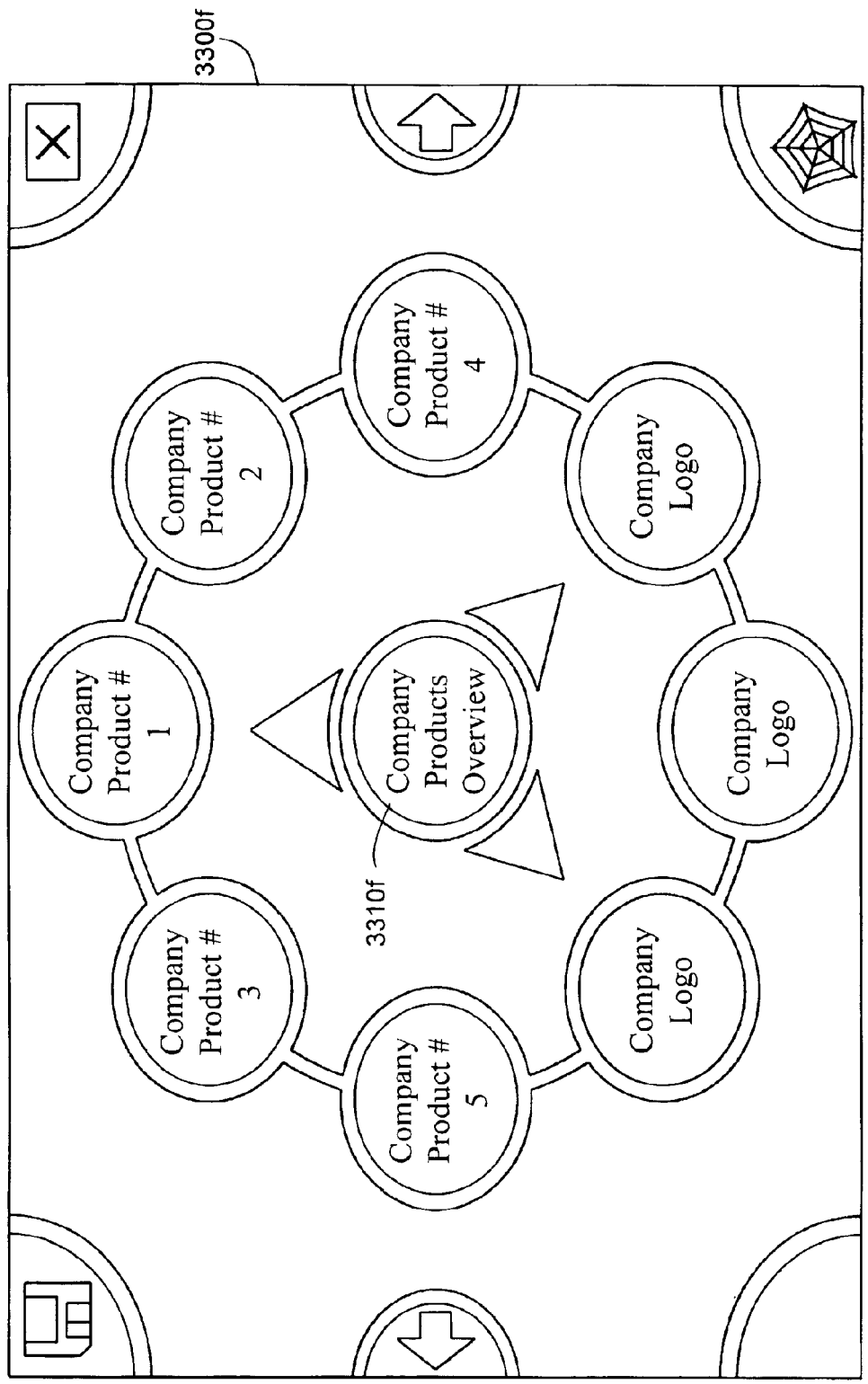
Figure 37J:
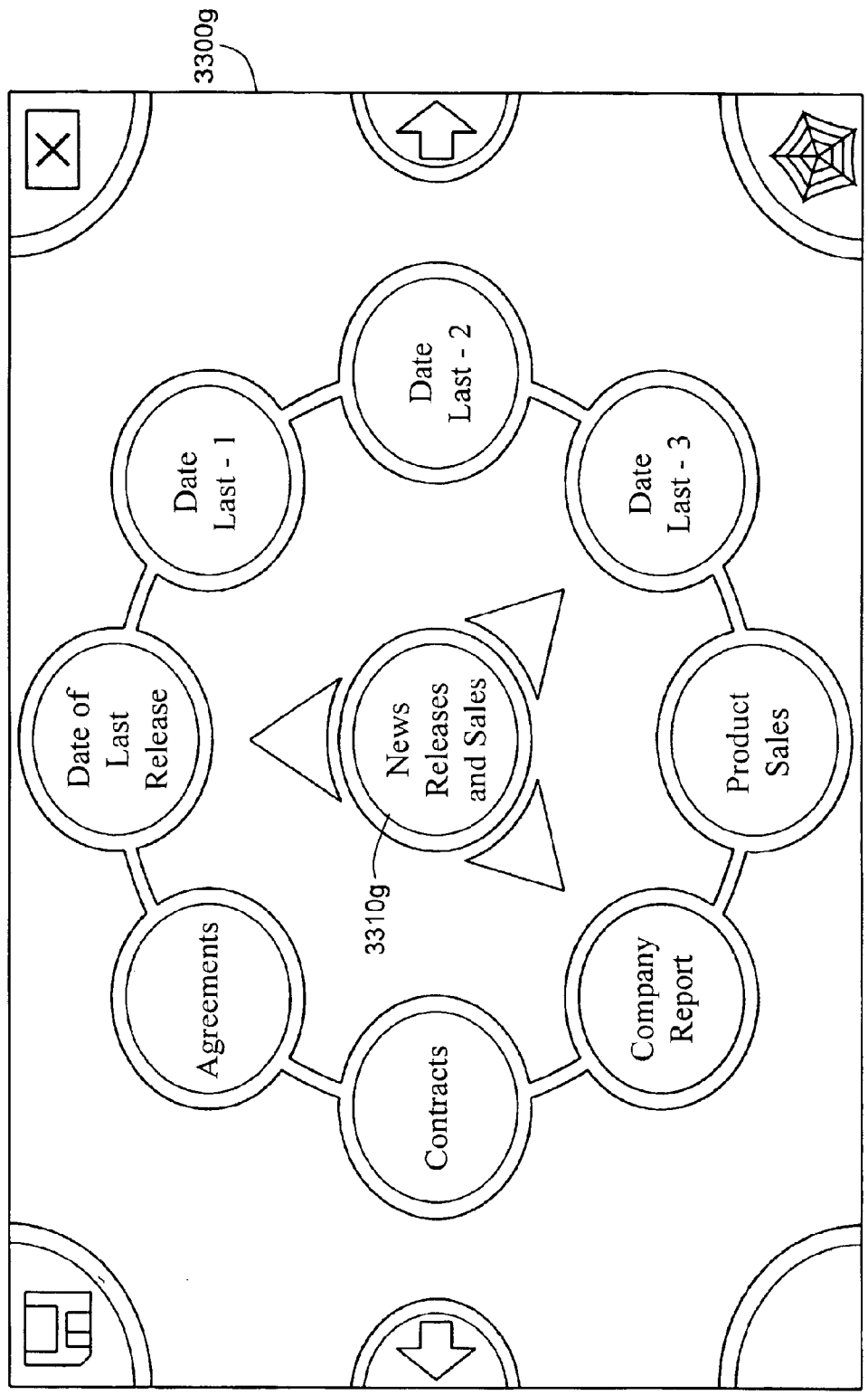

FIG. 36 is a diagram illustrating a LETUS connecting Braille users to a computer system.

FIGS. 37a through 37j show a set of typical LETUS website user interface outputs.

Figure 38:
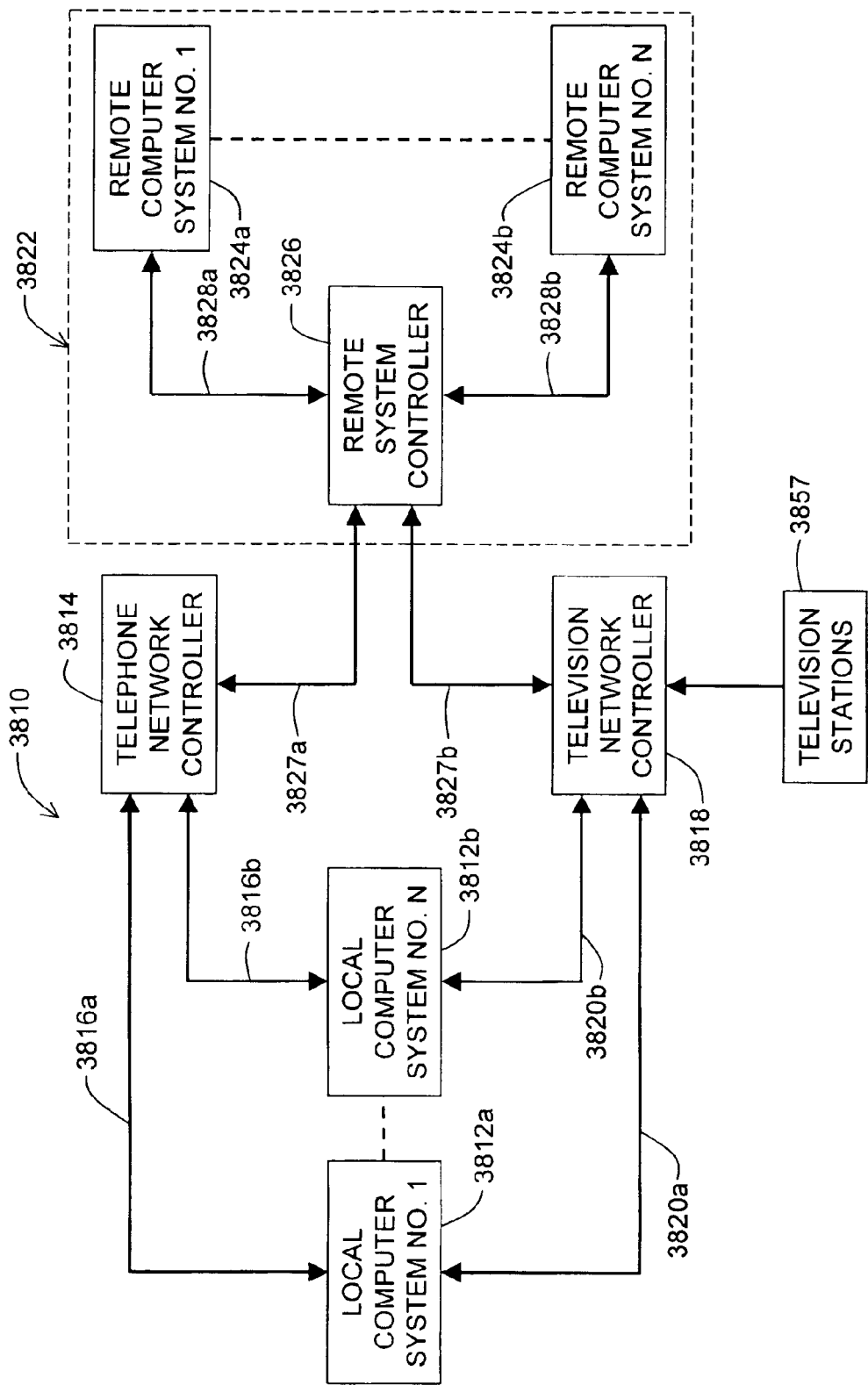

FIG. 38 is a schematic, diagrammatic view of a split personal computer system constructed in accordance with the present invention which includes a local portion of the split personal computer system communicating with a remote portion of the split personal computer system.

Figure 39:
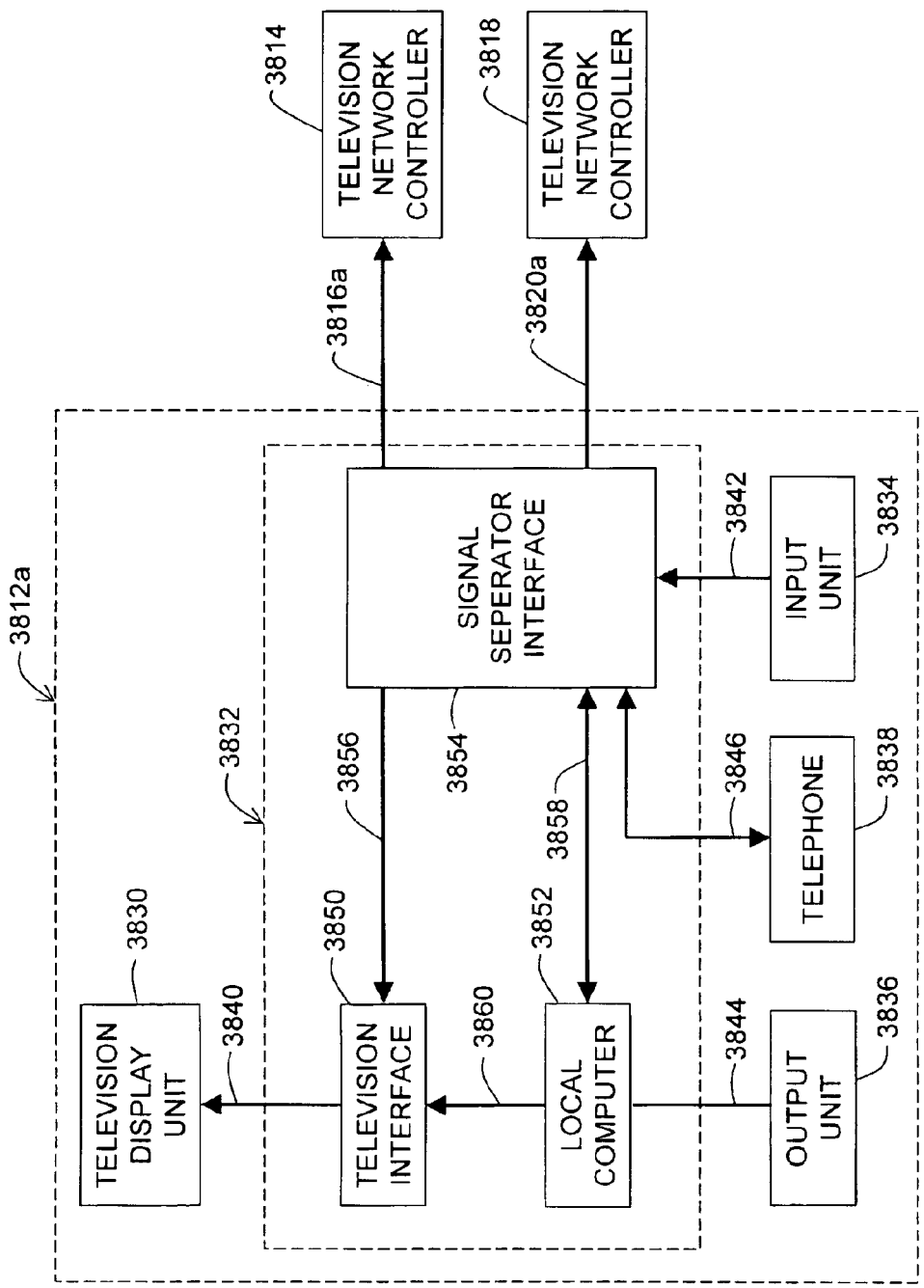

FIG. 39 is a schematic, diagrammatic view of one preferred embodiment of the local portion of the split personal computer system in which a television display unit is used as a monitor and a television accessory unit is provided to communicate with the remote portion of the split personal computer system and the television display unit.

Figure 40:
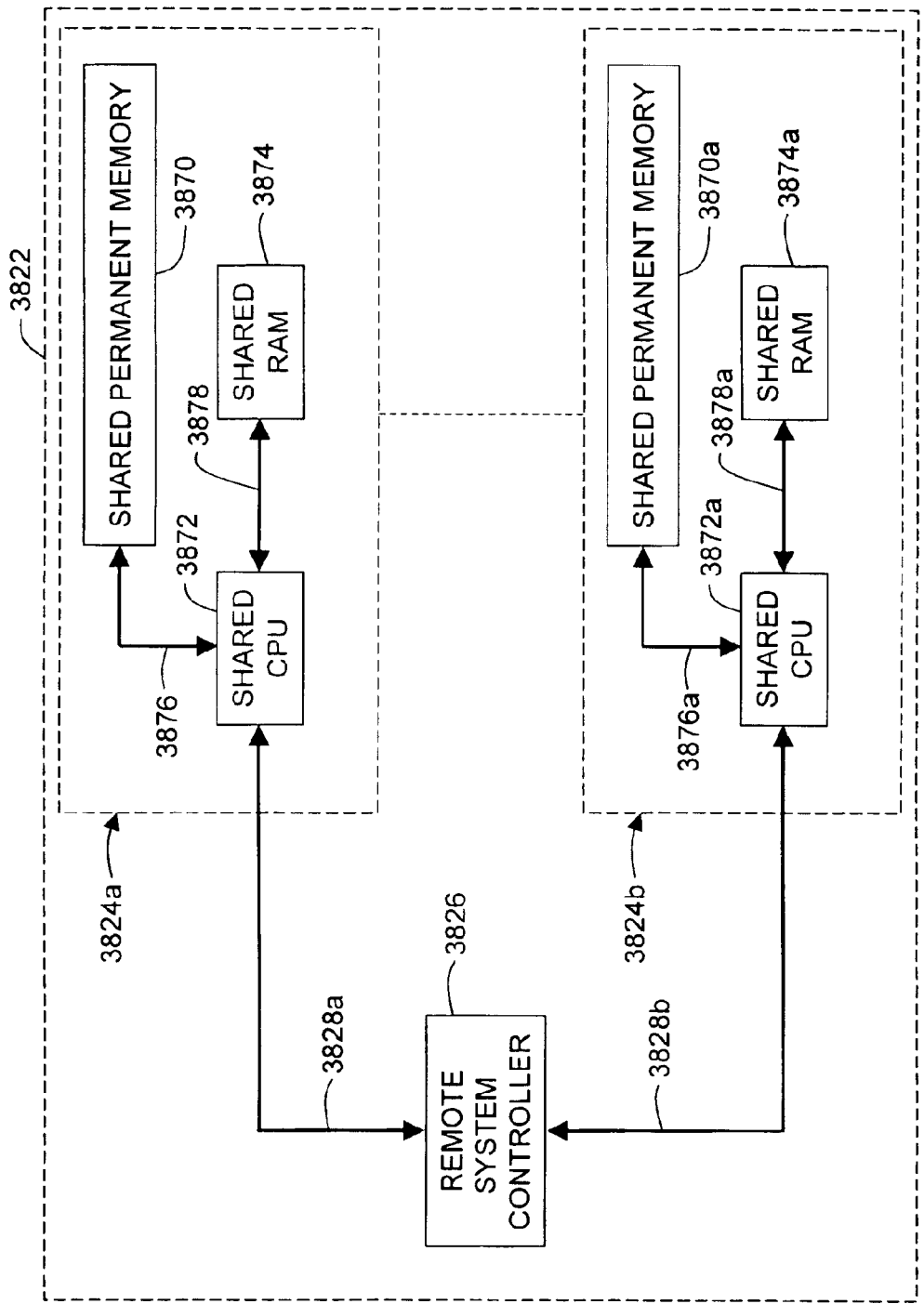

FIG. 40 is a schematic, diagrammatic view of the remote portion of the split personal computer system.

Figure 41:
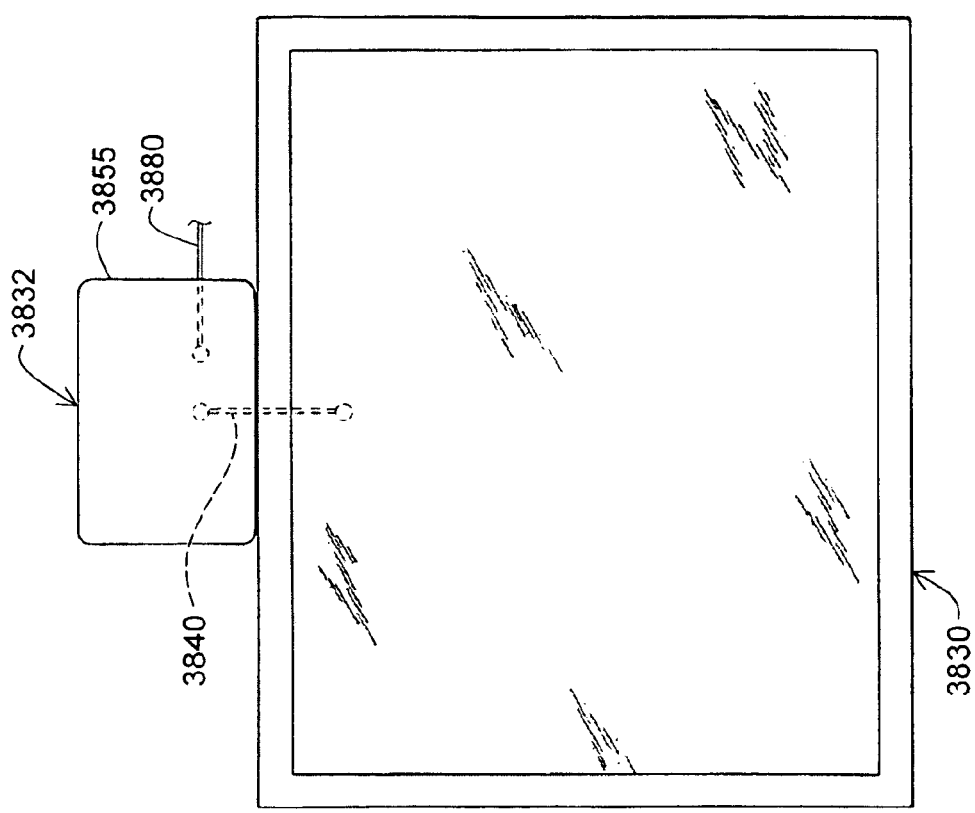

FIG. 41 is a front elevational view of the television accessory unit disposed on the television display unit.

Figure 42:
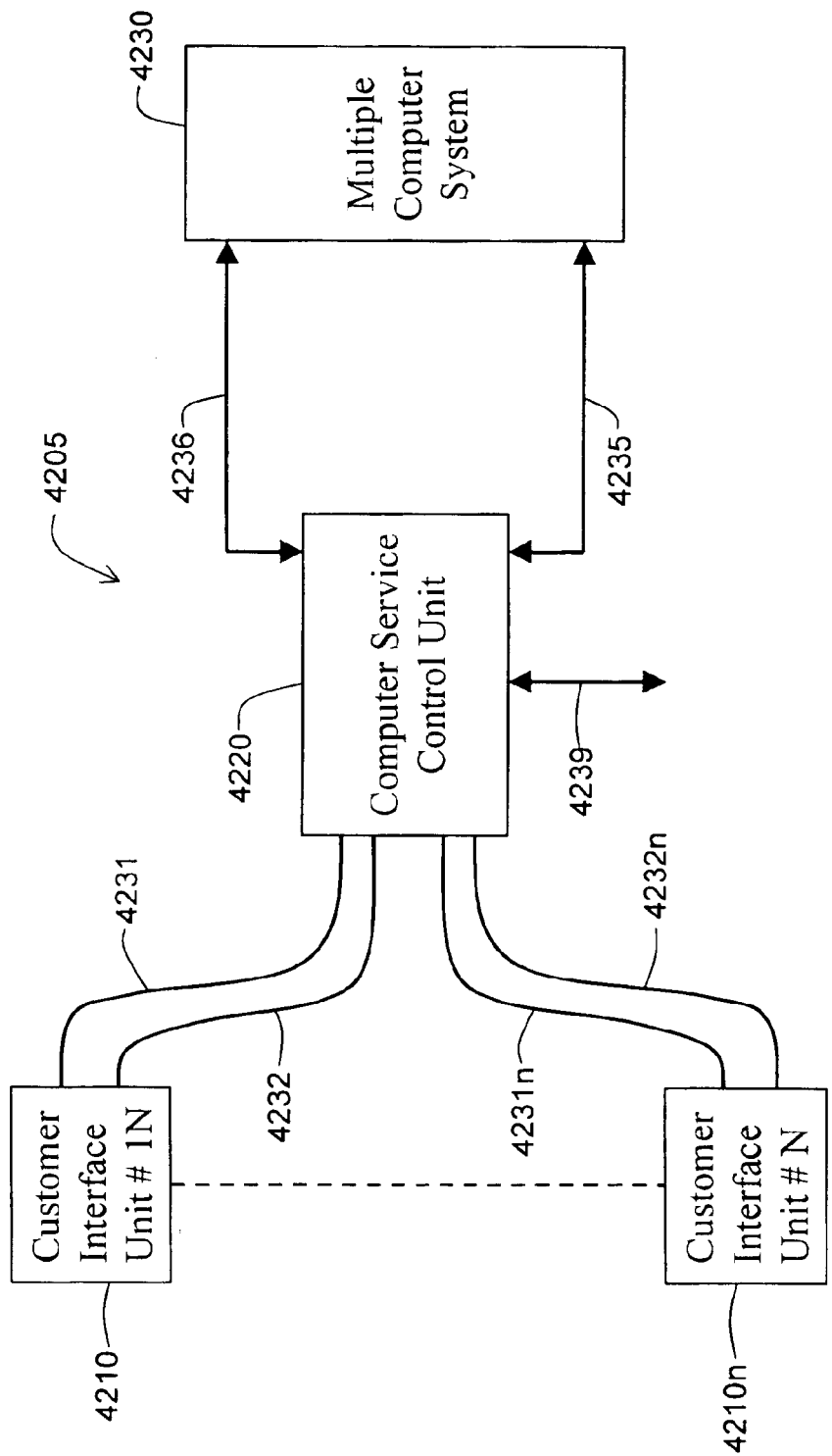

FIG. 42 is a diagrammatic view of the multi-customer computer service system of the present invention.

Figure 43:
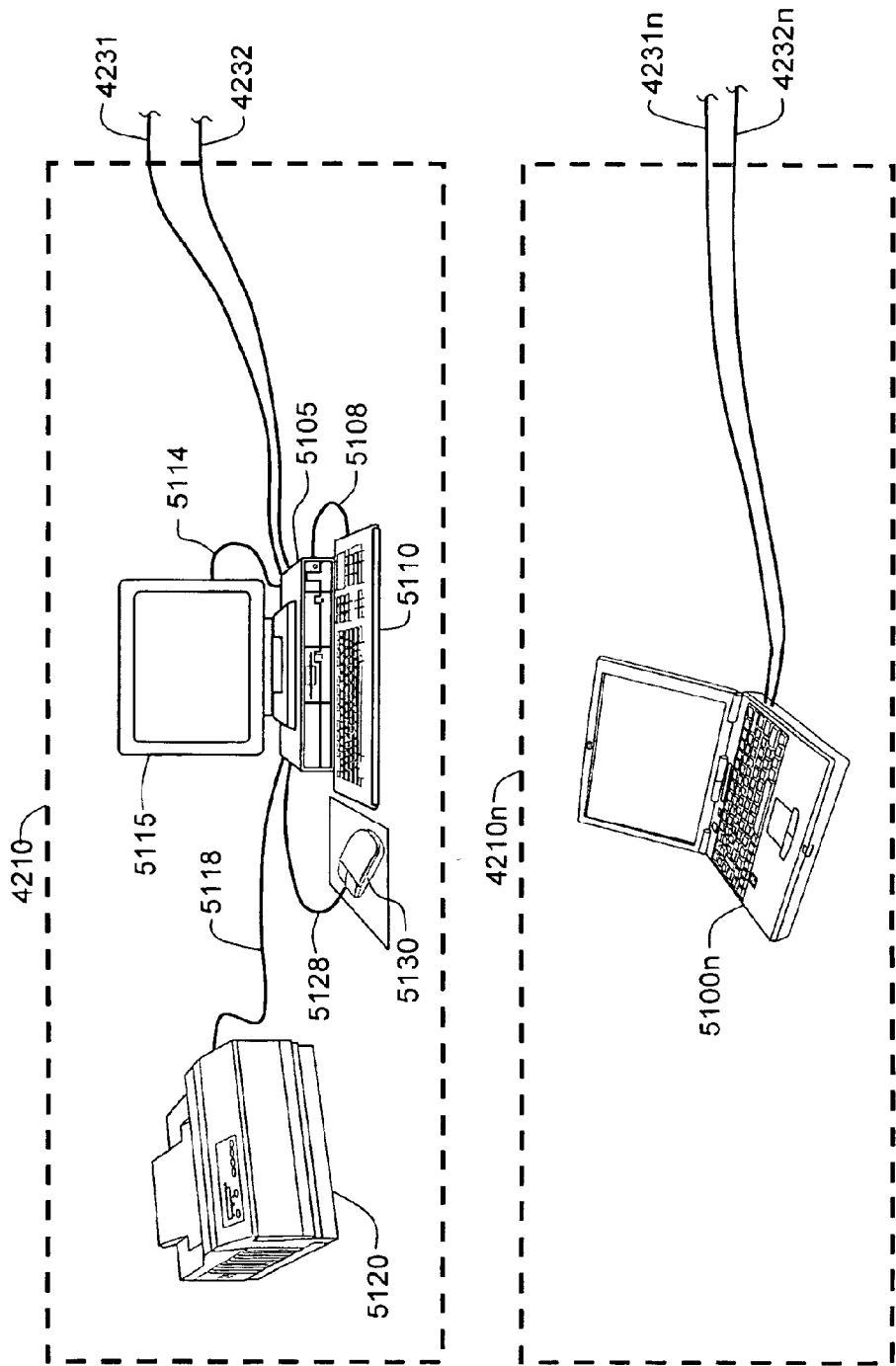

FIG. 43 is a view of two basic sub elements, which would typically be associated with the customer interface units shown in FIG. 42.

Figure 44:
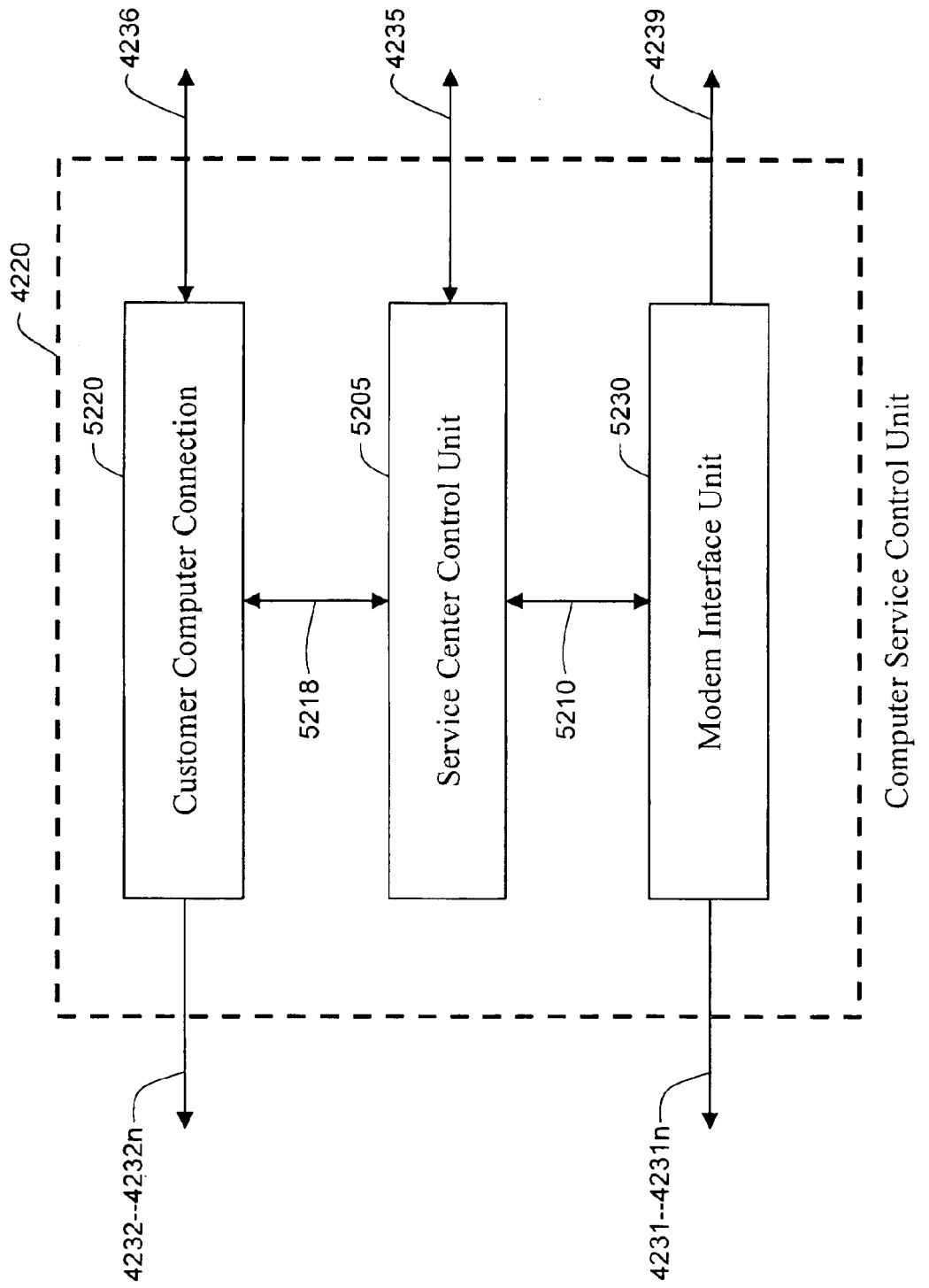

FIG. 44 is a view of the Computer Service Control Unit, shown in FIG. 42.

Figure 45:
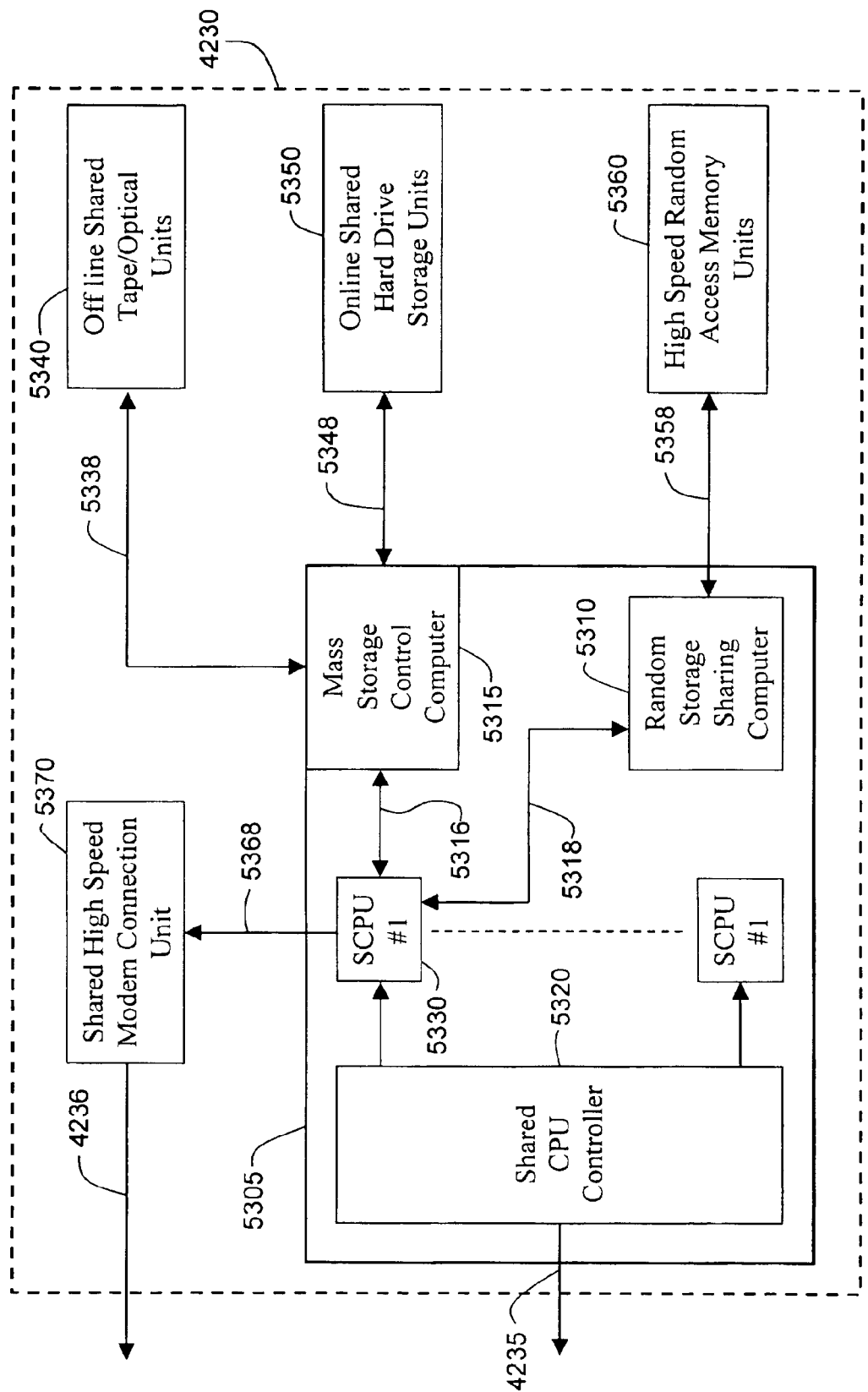

FIG. 45 is a view of the Computer Service Provider multiple computer sub system shown in FIG. 42.

FIG. 46 is a function diagram for software required of the system in FIG. 42.

Figure 47:
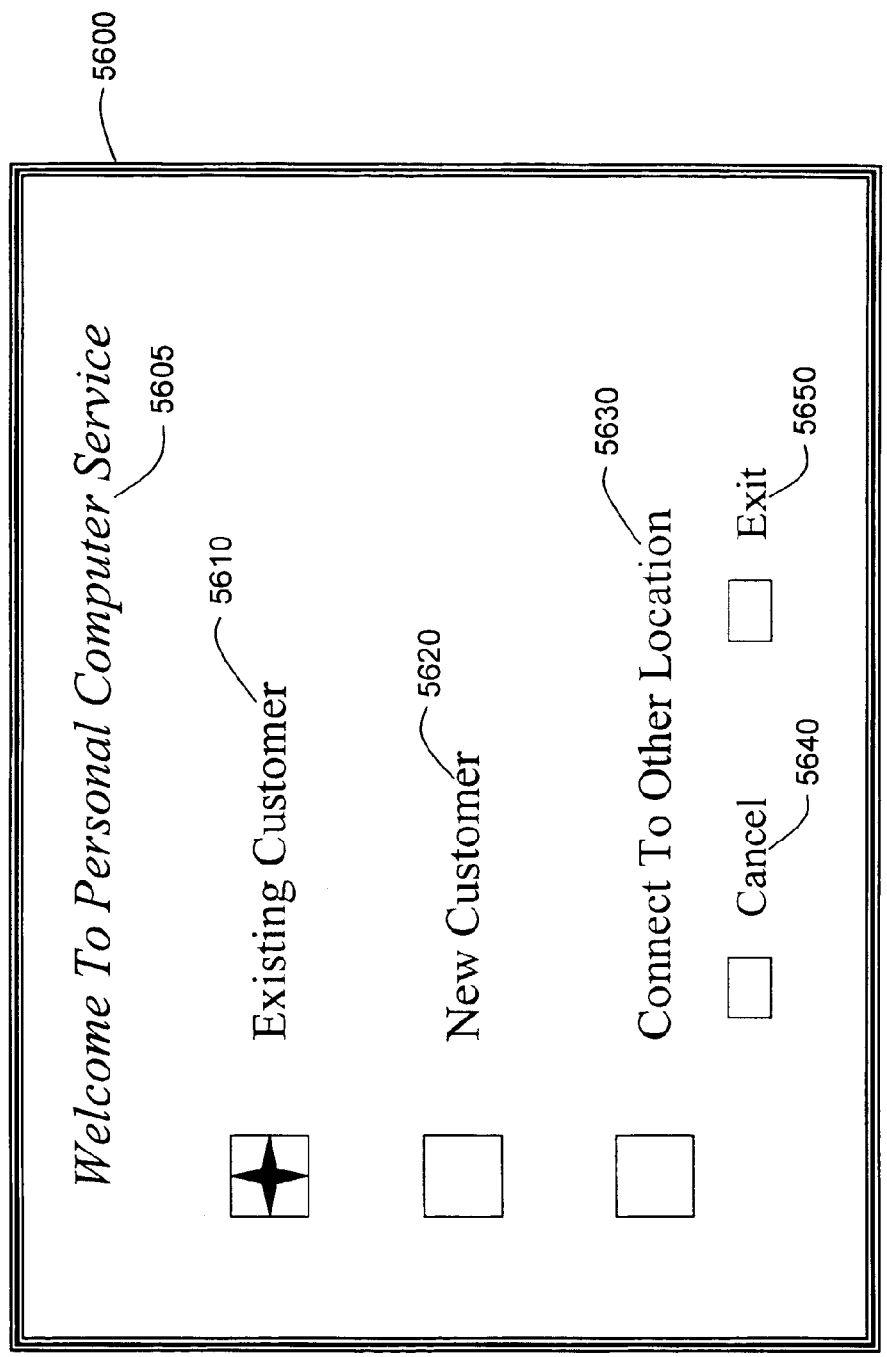

FIG. 47 is a typical start up computer interface menu.

DETAILED DESCRIPTION OF THE INVENTION

In general, a Proximity Service Provider System (PSPS) 1 relates to methods for selling, authorizing, collecting, distributing payments, and maintaining proximity services from a central location wherein the proximity services are provided at remote locations. More particularly, the PSPS 1 allows users of proximity service systems to sign up for the service, operators of proximity service systems to receive maintenance information, and owners of proximity service systems to get paid without having to have separate communication networks and methods to obtain these separate services. Proximity service systems require a person to be within predetermined close distances, such as 200 feet, to the proximity service systems in order to receive a service therefrom. Examples of proximity service systems 3 are physical POS stations, ATM machines, toll gates, gas pumps, kiosks, pay phones, vending machines and parking meters to name a few.

The problems to be solved by the PSPS 1 are related to the proximity services for such proximity service systems as kiosk machines, vending machines, ATM's and toll and access systems being implemented for the convenience of the mobile consumer. Most of these proximity service systems have their own special activation devices and methods of payment and means for the operators to maintain the proximity service systems. In most cases these proximity service systems are either operated by coins or cards of some type. Wireless activation devices, such as toll tags, gate and garage openers are often used when vehicles are involved. Except for credit card payments, most proximity service systems have their own activation and payment means and will not operate with other activation and/or devices. Even in the case of credit card payment methods, both consumers and owners are obliged to carry or accept many types of cards (e.g. Visa, MasterCard, American Express, Discover, Diners Club, plus five merchant cards, plus five gas cards for a total of 15 cards is typical). Also, the means for authorizing and collecting for these proximity service systems are typically done over networks designed separately for the owner.

In recent years there have evolved service companies servicing merchants that accept most credit and debit cards and can even authorize check payments. These services certainly help both the consumer and merchant and have facilitated more proximity service growth. However, the available authorization and collection services are only directed at retail POS systems (both physical and cyber services) and they do not let a consumer sign up for the service but only collect payment for the merchant from the consumer's card.

Another recent system for universal credit is called "Proton" (the details are at www.proton.be), which uses a smart card to pay at the merchants site once the card has been verified to be valid. However, this is just a replacement for the credit card and requires the customer to carry cash in the card rather than the merchant and credit card company giving credit to the customer for 30 days. The smart card is good for merchants but not so good for customers. There are several virtual credit cards a person can apply for to make purchases in cyber stores, similar to card services that allow purchases in physical stores but they can not be used in physical stores and again, the person registers for the cyber card, not for a service.

In summary, regarding the prior art credit card payment and collection systems, consumers have to sign up for cards of some type and hope merchants accept the cards they have. That is, the consumer does not sign up for the service, they sign up for a device. Also the technology has made it so easy for each merchant to have a card or device system for offering "purchase points" as a way of attracting repeat business, the proliferation of devices carried by the consumer is huge. The number of cards total into the thousands in this country alone, when regional merchants cards are included. But again, the consumer actually signs up for a card or device that allows them to receive the service, they do not sign up for the service itself.

With other types of proximity service systems such as toll tags, gate and garage access, vehicle access using wireless activators and payment methods, virtually no commonality exists. Combining these devices with the new wireless communication device revolution involving cell phones, pagers, and now, hand held wireless digital devices, a consumer is faced with a formidable array of physical devices (along with remembering their authorization codes) when leaving the home prepared to function each day. The means to service all of these devices with a common approach has not ever been attempted except in futuristic concepts such as the "piano software platform" Motorola announced this year involving the development of a software platform so wireless devices could operate on a network such as the Internet in the future.

There are several reasons proximity service provider systems have not been designed before now, but probably the main reason is that owners of these various systems, such as the tolling authorities, parking garage owner, paging company, cell and pager communication operators, are primarily trying to increase their customer bases by offering more services. They are notworking to solve the commonality problems with other services, as the credit card industry did. Commonality problems exist in terms of devices, activation methods, collection methods, marketing, maintenance, and operation procedures for the various services. The FCC regulations, of course, help in terms of device signal commonality, but not regarding the styles, activation, payment, and collection means across the wireless device utilization spectrum. All of the other commonality problems have barely been addressed in the proximity service industry other than adopting credit card payment methods into most collection systems.

A number of specialized service systems designed for owners of the proximity systems such as vending machines connected by networks like the Denmark company "DIKU" that connected a coke machine to the Internet so the owners could check the sales and inventory status from a web-site (1997 time frame). Another example is the "Harvest system" (can be reviewed at www.harvest.com) designed for the Coca Cola Company starting in 1990 to monitor their machines in terms of sales and inventory over a private network. More recently on-line vending in the UK have networks being established similar to harvest .com run by GPT Telemetry whereby an owner can connect his vending machine and obtain data regarding sales. There have been parking lots and meter electronic management systems designed that use various collection and maintenance means for the owners but none that offer a parking lot or meter service for the consumer (other than issuing access cards). The same is true in the electronic lock industry where all the service systems are designed privately for the owners and not the consumers. The leaders in this field primarily involve hotel systems that issue electronic door keys to new customers.

The above problem discussion has focused primarily on the fact that today, consumers can only sign up for devices (physical or virtual) not services, even though the person only wants a service. This is true even in the case of access services such as automatic toll gates, hotel rooms, subway debit cards, etc. There are similar problems and disparities when the focus is on the operating costs the owners have because they force the customer to use special activation and payment means rather than accept common devices or methods. This has hampered the vehicle access systems for years because authorization, activation and payment methods have not been common among the operating systems. Thus, not only is it very inconvenient for the customer, the cost of operation has remained very high because service companies can not make a profit operating the various access systems for the owners. Consequently, there are hardly any service companies (other than the individual owners) that the owners and operators of these other proximity service systems can use to lower their cost, as for example, in the POS systems discussed above. Thus in all cases: 1.) the consumer can only sign up for more devices if they want more services; 2.) for services other than POS, the owners cannot even sign up for the collection service except using specialized collection systems designed for devices such as toll tags or gate and parking cards; and 3.) the operators of the proximity service systems have no service center for maintenance and inventory control other than those specialized for the owners centered around collections.

Some of the prior art for services involving the consumer, owner or the proximity system operator were reviewed in discussing the problem. An apparatus and methods for monitoring and communicating with a plurality of networked remote vending machines is disclosed by Konsmo in U.S. Pat. No. 5,844,808, to help owners monitor the state of their remote vending systems. However, this system does not allow customers to sign up for proximity services supplied by the owners.

A system described by Gomm in U.S. Pat. No. 5,753,899 allows smart cards to be accepted at owner vending machines and can be used entirely for the purchase or to supplement the customer's coins by rounding the machine up or down to the closest amount accepted by the machine for the selected item.

Yet another payment system for cards is disclosed by Muehlberger in U.S. Pat. No. 5,285,382, where the system only validated remotely for transactions exceeding $2.00. The less than $2.00 fraudulent transactions were considered to be acceptable by the owner in favor of not having to get remote approval for every transaction.

A networked parking meter system is disclosed in U.S. Pat. No. 5,648,906, wherein a vehicle was sensed automatically and a meter would be reset, for example, when the vehicle left the parking space.

Again, none of the cited art discussed systems that allow both the owner of proximity service systems and the customer to sign up for services and/or allow local transactions to be validated locally by fraudulent detecting means. The state of the art for networked services to help more than one participant is best described in Fortune magazine September 1999 on pages 215–224, wherein a summary of services for both hardware operations and software operations that can be obtained today or will be available in the near future were listed. The list is not complete, but does indicate that web based services for application software, "Rent-AN-App" and "Rent a Whole Service" are just emerging and range from rent a software program to a service for purchasing products for companies. The closest service available on the published list to the type disclosed herein is that of Bidcom (www.bidcom.com), in which construction companies services are offered. Bidcom provides information services for employee and managers, such as schedules, blueprints, work permits, etc. associated with a construction project. The cited example, along with the other services listed are nothing more than moving services to the WEB, that have been offered inside the company for years in order make access much more convenient and possibly allow out sourcing by companies not wanting to maintain their own internal service. Such changes are certainly steps in the right direction, but do not address the problems discussed above.

Web-site services for finding and purchasing products and services abound on the web, but most sites do nothing more than move physical stores and services to the cyber world. In fact, most web-sites do nothing more than convert a lot of proximity services, such as retail stores, to non proximity services so that the consumer does not have to be within a predetermined distance of the service to purchase a product and/or get the service. This explains, in part, the rapid growth of cyber stores, because this conversion in itself is a huge convenience for the consumer.

The web based technology for implementing the Proximity Service Provider System 1 is available by combining: 1.) interactive web-site page designs like those used on company sites such as Microsoft, Cisco, Motorola, or Sun Micro Systems, for examples that have specialized pages for world wide customers and products for purchase, developers of related products (third parties), the owners for corporate data with; 2.) the web-site designs available for collecting and distributing payments, such as done on the new MP3 web-site when customers purchase songs and royalties must be paid to the copyright owner; and 3.) the automated machine reporting web designs such as that used by on line vending. Other available technologies for implementing the preferred methods are referenced below.

The PSPS 1 provides solutions to all three of the basic problems mentioned earlier and does it in such a manner to take advantage of the www system that is currently available. In summary, there are no proximity service provider systems, such as the one presented herein, that is designed for the owners of proximity service systems, physical operators of proximity service systems, and the consumer of proximity services from the proximity service systems to go to the same location, such as a web-site, and receive or sign up for the service or services pertaining to their needs. The solution then is one, of letting the consumer, the owner and the physical operator interact with (i.e. provide information to and receive information from) that portion of the proximity system service information and data each needs from the same web-site or affiliated web-sites, for example. Actually, the solution is the same with or without using the www network, but without the www, a worldwide private communication network would have to be established in order to implement the design. Clearly a free world wide network eliminates this major obstacle and allows the design to be implemented with current technology in a very practical fashion and more communication options are available when discussing the preferred embodiments of the various communication requirements.

In summary, the PSPS 1 concerns a web-site that a customer, owner, and third party operator can subscribe to for service to increase convenience for the customer, and lower cost for the owner and is designed to work with any type legacy or cyber card system that the owners subscribing to the service agree to accept and customers subscribing to the service agree to use. The fees charged by the owner of the PSPS 1 web-site to the owners and customers can be similar to those charged by credit card companies today.

The terms "PSPS site", "PSPS Web-site" and "PSPS system" are used interchangeably herein.

The terms "user", "person" and "customer" are used interchangeably herein.

Figure 1:
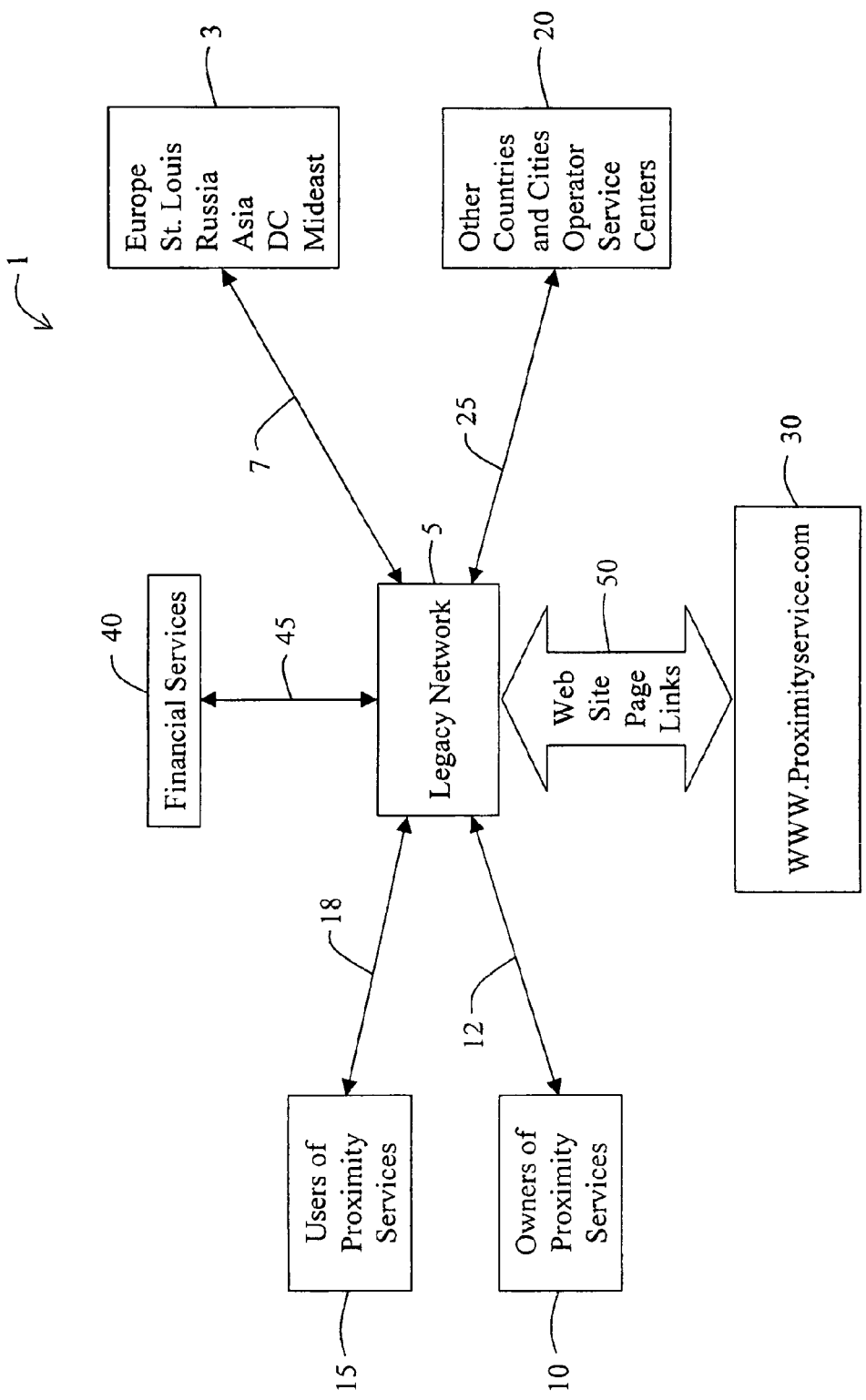
FIG. 1 is a block diagram showing a Proximity Service Provider System (PSPS) having customers, owners, operator locations, legacy financial and communication networks communicating in accordance with the present invention.

Referring now to FIG. 1, shown therein is the Proximity Service Provider System (PSPS) 1, which is constructed in accordance with the present invention for managing a plurality of Proximity Service Systems 3 of any type located at any world wide location connectable or connected by any suitable communication system to Legacy World Wide Communication Networks 5 as indicated by a communication link 7. Examples of proximity service systems 3 are physical POS stations, ATM's, toll gates, gas pumps, kiosks, pay phones, vending machines and parking meters to name a few. Different geographic locations are labeled in FIG. 1 to show that the proximity service systems 3 can be located in various geographic locations. The legacy world wide communication networks 5 are shown to indicate that users 15 connected to this same network 5 will have access to a new PSPS web-site 30 via Website Page Links 50 also connected to the network 5. The web-site page links 50 may be on one or several thousand web-sites around the world such as AOL and Yahoo. Likewise, owners 10 and operators 20 of the various proximity service systems 3 are connected to the communication network 5 via communication links 12 and 25, respectively, that allow access to the PSPS web-site 30 via one or more of the web-site page links 50. The PSPS web-site 30 is connected to Financial Services 40 and vice versa via the web site page links 50, the communication network 5 and the communication link 45. The users 15, owners 10, operators 20 and financial services 40 can each be provided with a suitable computer system (or web-TV), capable of communicating with the web-site page links 50 and the PSPS web-site 30, as indicated by FIG. 1. Thus, if any of the users 15, owners 10, operators 20 or financial services 40 click on any web-site page link 50 any where around the world they are immediately connected to the PSPS web-site 30 that has the URL of say, for example, www.proximityservice.com, which was an available domain name at the time of this application. The web-site page links 50 and PSPS web-site 30 are described in more detail in connection with FIG. 2. The PSPS web-site 30 can be implemented by a single web-site, or multiple web-sites with suitable firewalls and/or other security measures utilized between each of the various components (as discussed below) of the PSPS web-site 30. For example, each country or separate geographic region might be serviced by a separate server in order to lower the communication costs worldwide and distribute the database.

The communication networks 5 can be a worldwide public network, such as the World Wide Web, or a worldwide private communication network. The worldwide public network is preferred because of the expense of implementing a worldwide private communication network.

The term "communication link", as used herein, refer to any suitable communication link which permits electronic communications, such as extra computer communication systems, intra computer communication systems, internal buses, local area networks, wide area networks, point to point shared and dedicated communications, infra red links, microwave links, telephone links, cable TV links, satellite links, radio links, fiber optic links, cable links and/or any other suitable communication system. It should be understood that each of the communication links are shown and described separately herein for the sole purpose of clearly illustrating the information being communicated between the various components. The communication links may not be separate communication links but may be a single physical communication link.

As will be discussed in more detail below, the PSPS web-site 30 receives for registration information from each of the owners 10, users 15, operators 20 and financial services 40 to carry out the registration, selection, use and collection of the proximity service systems 3 as discussed in detail herein. For example, the PSPS web-site 30 receives for registration information from each of the owners 10 registering particular one or ones of the proximity service systems 3 owned by each particular owner 10. The PSPS web-site 30 also receives for registration information from each of the owners 10 regarding payment and collection methods approved by the particular owner 10.

Generally, the owners 10 and operators 20 of proximity service systems 3 such as those listed above, as well as ATM's and POS merchants, can sign up for the PSPS service from the same PSPS web-site 30 or affiliated web-sites. The owners 10, for example, can list the physical location of proximity service systems 3 and services they provide and at what physical locations they will accept customer regular legacy payment cards and in what form or methods they will allow PSPS cyber card codes, discussed further below, to be accepted. The owner 10 enters the bank accounts into which money is to be deposited each time transaction data is delivered to the PSPS web-site 30 and they plan for delivery of the accepted transaction data (both frequency and method). For example, the legacy data can be routed through the PSPS web-site 30 using the legacy card method and the PSPS web-site 30 collects from the legacy card company and puts the money into the proximity service owner's account. PSPS cyber card delivered transaction data might be delivered several times a day or weekly from the proximity service systems 3 to the PSPS web-site 30, depending on the collection method used by the proximity service owner 10 and desirably lists the customer cyber card code along with the amount charged for each service at each location along with the time the service was delivered.

As further discussed below, once the owner's service(s) are approved, the owner 10 is given a web-site cyber card code plus a special cyber card code to be incorporated into or stored by the proximity service system 3 or service transaction unit at each of the owners' locations. The owner cyber card code allows the owner 10 to access PSPS owner web-site pages that provide the owner 10 transaction reports made available with the PSPS service including how much money was paid each day and at what physical locations. The special cyber card code issued for the owner locations can be stored at each of all of the owner's proximity service systems 3 or at proximity service systems 3 selected by the owner 10. The special cyber card code can be utilized in conjunction with a customer access cyber card code, discussed further below, to authorize services locally at the service location (or proximity service system 3) without having to get remote authorization each time a service or product is delivered, as is commonly done at present. That is, the PSPS 1 allows local authorization using a cipher algorithm supplied to the proximity service systems 30 selected by the proximity owner 10 or operator 20 as part of the special location cyber card code rather than remote authorization as done now for credit, debit, and smart cards.

Once various proximity service systems 3 are registered with the PSPS website 30 (as will be discussed in more detail below) the PSPS web-site 30 receives for registration information from each of the users 15 regarding predetermined payment methods and the selection of one or more proximity service systems 3 that the respective users 15 wish to be available for use by the respective users 15. Generally, the PSPS web-site 1 allows a plurality of consumers or users 15 to log on and sign up for individualized arrays of different world wide proximity services provided by various separate proximity service systems 3, such as "vending machines", "parking meters", "pay phones", and POS terminals, for example. The users 15 then select individualized predetermined payment methods, such as which credit cards or which banks to pay for the services and the manner in which each the consumer wants to be billed (debit the account, monthly statement, etc.). A simple example would be that the user 15 selects to pay for all the selected services with a Visa card and wants to use the legacy method of service activation rather than use a PSPS unique cyber card code assigned by the PSPS web-site 30 (discussed below), and the user 15 is then told which proximity service systems 3 accept such services.

Generally, if the user 15 is approved for the requested service and the payment method, the user 15 is then given two cyber card codes if he signs up for the PSPS service method. One cyber card code is for accessing the proximity services and the other cyber card code is for accessing PSPS web-site pages designed for customers. The PSPS customer web-site pages provide individualized reports regarding the services the user 15 received that might include locations, amount paid and dates of the received service, for example. Also, these pages may also be used by users 15 to get updated cyber card codes (cyber card codes may optionally automatically expire at predetermined periods, for example, each month, in order to virtually eliminate fraud and remote authorization requirements in the preferred PSPS 1 design). These pages are also used to report lost devices that might be carrying a person's cyber card code, such as a credit card or cell phone or to request another cyber card code at anytime in case a person has let another person use their cyber card code temporarily. The second cyber card code is for receiving one of the approved services when at a specific location and these cyber card codes may be renewed by each user 15 at predetermined times. This feature allows the PSPS service payments to be guaranteed to the owner 10 of the proximity service system 3 providing the services to the user 15 without having to have remote authorization services each time the user 15 wants a relatively inexpensive service, such as the dispensing of soda pop or ice cream at an amusement park, for example. Also the feature is considered much less bothersome than refilling a smart card with money, for example, each time the card runs out of money. In addition, limits can be put on a user's account, either by the user 15 or the PSPS web-site operator, and the cyber card becomes invalid when received services of all types exceed these predetermined amounts. The user 15 and owner 10 are automatically notified in such a case and desired a new valid cyber card code is issued. The second cyber card code may be generated from a private encryption key produced by the PSPS web-site 30, for example. Only the PSPS web-site 30 can generate these keys, so that only the proximity service systems that also have a different public key corresponding to the cyber card code will unlock the customers key locally and approve a transaction.

After one of the users 15 utilizes one of the proximity service systems 3 which has been registered with the PSPS web-site 30, the PSPS web-site 30 receives information (either periodically or in real-time) from the proximity service system 3 utilized by one of the users 15. The information received from the proximity service system 3 may include a location of the proximity service system 3, an amount paid and a date or dates of the received service, for example.

Figure 2:
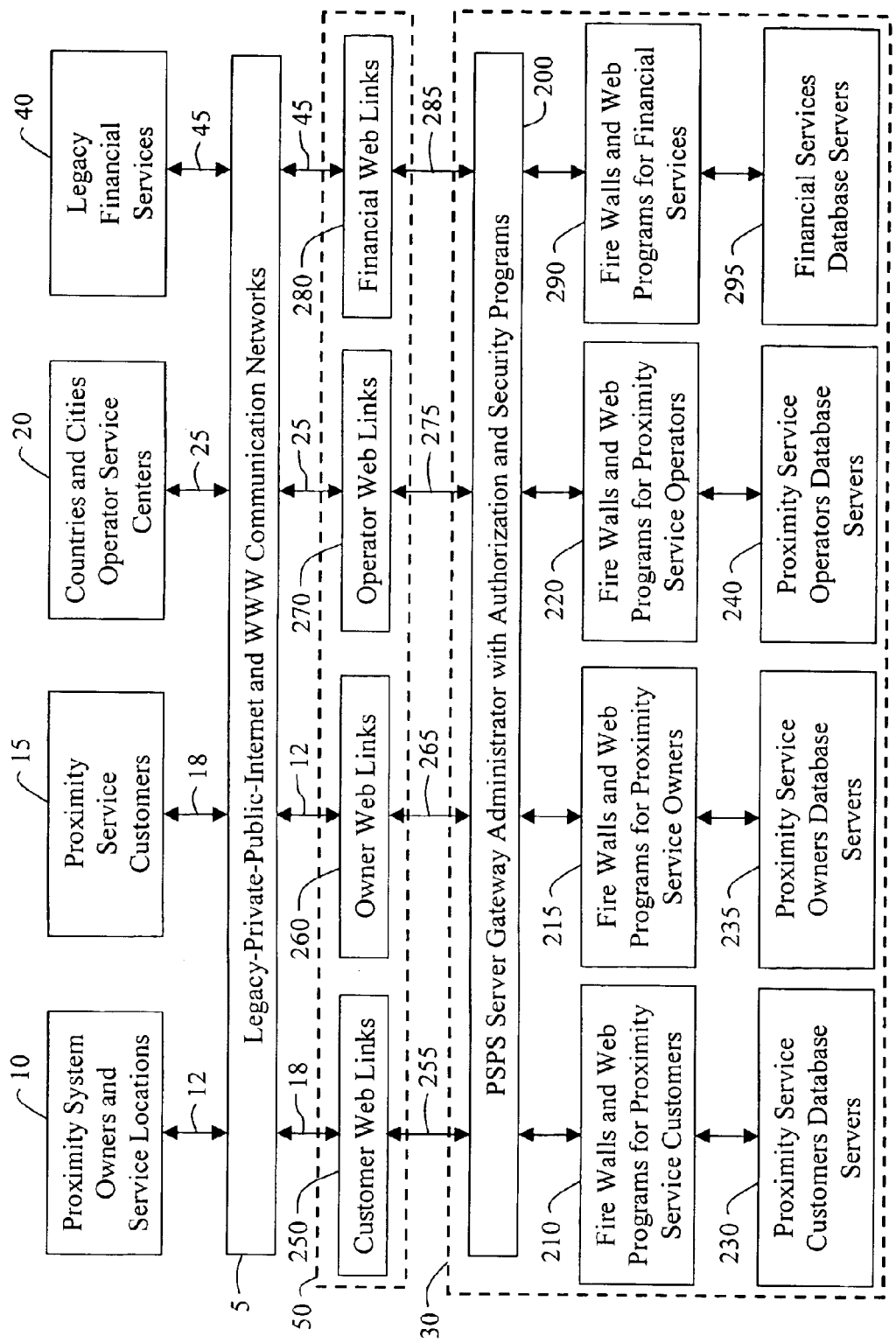
FIG. 2 is a block diagram showing a PSPS interface with customers, owners, locations and financial services.

In FIG. 2, the legacy world wide communication network 5, owners 10, users 15, operators 20 and financial services 40 are shown and the PSPS web-site 30 and web-site page links 50 are shown. The web-site page links 50 of the PSPS web-site 30 show at least four separate hyper links or hot spots: for a Customer Home Page 250; for an Owner Home Page 260; for an Operator Home Page 270; and for a Financial Home Page 280. The actual home page or web-site page links 50 showing these four links is not illustrated because this could take many forms and can be designed by any one skilled in the art of web page design of which people with these type skills number into the hundreds of thousands. Also there might be 100 different PSPS home page designs located on various (maybe as many as 2,000) search engines and home pages such as the financial services home pages around the world.

When the user 15 clicks on the hot spot 250 of the web-site page links 50 while connected to the www service provider 5 via communication link 18, the user is then connected via communication link 18 to the customer home page indicated by the hot spot 250 which is, in turn, connected to a server gateway 200 of the PSPS web-site 30 via a communication link 255. The server gateway 200 has the administrator, authorization and security programs that allow users 15 to be connected to Customer Programs 210 that maintain a Customer Database 230. The server gateway 200 and customer programs 210 and customer database 230 will be discussed in more detail in connection with FIG. 3.

Figure 3:
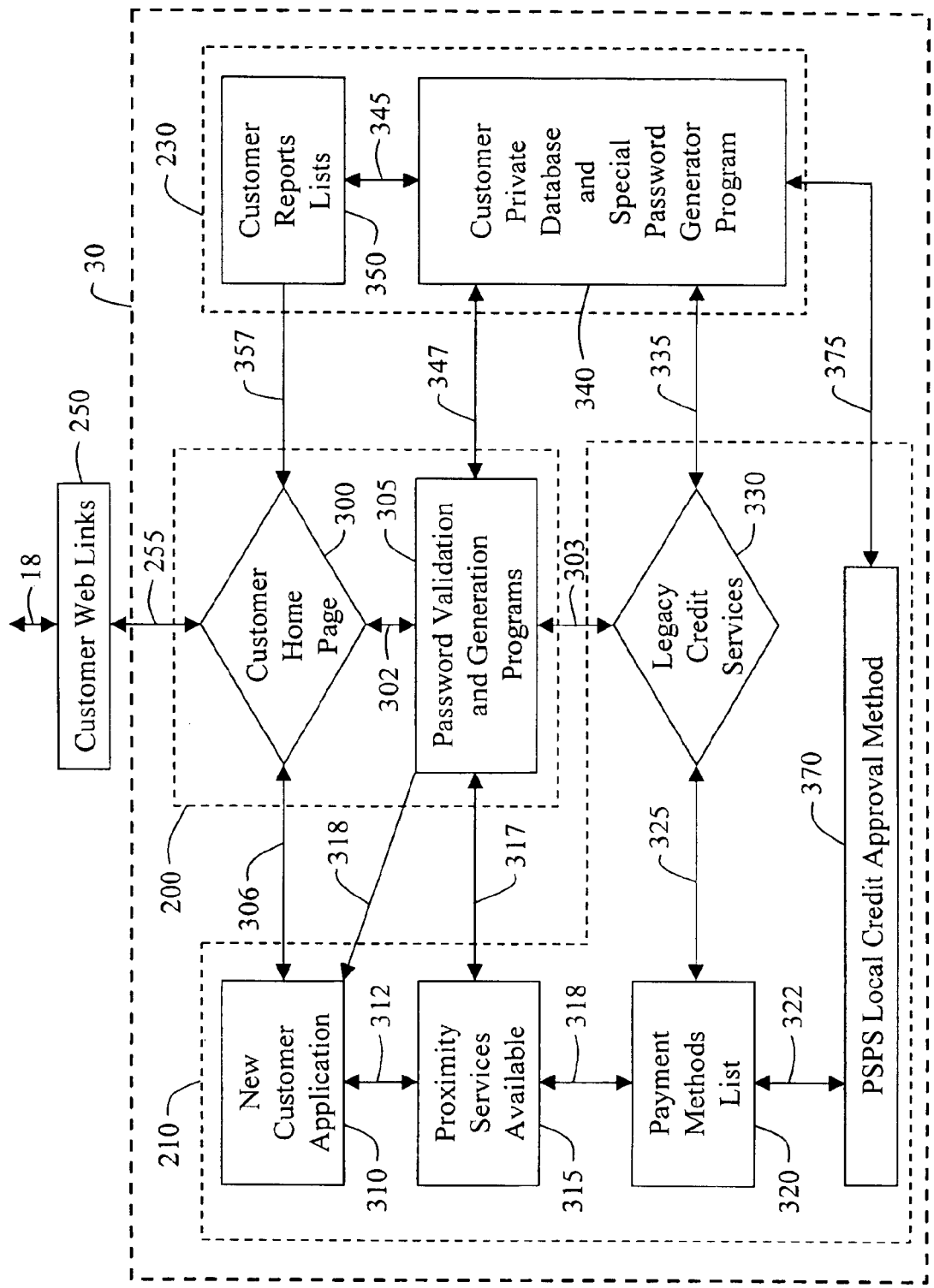
FIG. 3 is a block diagram showing a PSPS communication logic flow diagrams for customer services.

In FIG. 3 the server gateway 200 has a customer home page 300 connected to the user 15 (or customer location) via 255 and 18 as described earlier. The customer home page 300 allows a new customer to sign up for a number of services via paths 306 connected to New Customer Application Programs 310 as part of 210, or an existing customer to enter a password as will be discussed below to modify existing service selections. The new customer application programs 310 in turn is connected via a communication link 312 to Available Proximity Service Data 315 that also lets the customer or user see where the various available services are available (e.g. USA, Europe, Japan, Washington D.C. etc.) and select which one or ones of the proximity service systems 3 the customer 15 wants to obtain services from in the future. Moreover, the available proximity service data 315 can be categorized by type of proximity service system 3, i.e. vending machine types, toll tag type etc., or geographic region. In addition the customer is connected to Service Payment Choices 320 via a communication link 318 that in turn is connected to either Legacy Credit Service Programs 330 via a communication link 325 and/or they choose a PSPS Local Credit Approval Method 370 via a communication link 322. Legacy Credit Service Programs 330 are connected via a communication link 303 to a Password Validation And Generation Programs Unit 305. The legacy credit service programs 330 request credit check or approval for the customer 15 via Financial Home Page 280 of server gateway 200 and will be described in more detail in connection with FIG. 6.

Approval is either granted or denied depending upon what the customers application and payment request data and what is allowed by the financial service selected. When the request is denied the customer is notified to make different selections or to quit the new application process. When the customer is approved for legacy credit, the legacy credit service unit 330 notifies the password validation and generation programs unit 305 via communication link 303 to generate a site pass word for the customer 15 and provides the pass word via communication link 318 to the new customer application programs unit 310 connected to the user 15 or customer site via communication links 306,255 and 18. In addition, a Customer Private Database 340 is developed in the customer database 230 and partitioned from other customer databases as indicated via a communication link 335 and the access code information to the customer private database 340 is provided by the password validation and generation programs unit 305 via a communication link 347. When one of the users 15 with a site password visits the customer home page 300 they can enter the pass word via a communication link 302 and access is granted by the password validation and generation programs unit 305 if the password is valid. Once access is granted to the customer 15, the customer 15 can access any one or more of the available proximity service data 315, the service payment choices 320, the legacy credit service programs 330 and make changes in the services or payment methods previously approved. In addition the customer 15 can request reports from an available reports list 350 via communication link 347 and the reports are delivered from the customer private database 340 via a communication link 345 and 357.

When a customer 15 selects the PSPS local credit approval method 370 rather than the legacy credit service programs 330 described above (where the payment is guaranteed and approved by a credit card company, for example, each time the service is requested) in which the PSPS web-site 30 owner guarantees payment to the owner 10 of the proximity service systems 3 for a service approved locally at the owner 10 proximity service system 3 (e.g. a vending machine or parking meter) the customer 15 is given a special cyber card code generated by the customer private database unit 340 using one of the many standard RSA algorithms available, for example, and provided back to the customer 15 via communication links 375, 322, 318, 312, 306, 255, and 18.

Embedded into and made a part of each customer cyber card code can be a service provider identification number (SPIN). The SPIN is unique and may be valid for a predetermined time period. The SPIN will be stored at each owner proximity service location (proximity service system 3) selected for service by the customer 15 as described in more detail in connection with FIG. 4 and is used to approve or disapprove credit locally. Thus after selecting and being approved for the PSPS local credit approval method 370, the customer 15 can receive local proximity services at those owner locations (proximity service systems 3) where the method for entering the special cyber card code is accepted.

Generally, the cipher algorithm, as discussed above, converts every valid customer cyber card code into the same PSPS service provider identification number (SPIN) that is valid during the predetermined period along with a unique code identifying the customer 15. The SPIN can be changed as often as the owners 10 and PSPS system 30 decide, but normally they would change every month, for example, when the customers 15 get new cyber card codes. Thus no matter which distinct customer valid cyber card code was entered at a proximity service system 3 or service location, the same SPIN number would be computed by the proximity service system 3 or transaction unit and be checked against the valid SPIN number for the predetermined period. Also a customer data portion of the deciphered customer cyber card code would be checked against in a valid customer card file. To speed up the approval process, these computations could be done in parallel even though milliseconds are involved rather than seconds, as currently required with legacy remote approval systems. If the cyber card code is not approved locally by the proximity service system 3, the transaction service is denied. Such a feature greatly reduces the cost of operation and payments are guaranteed by the PSPS web-site or PSPS system 30 that deals with the customer 15. In other words the PSPS web-site 30 really becomes the collection agent rather than the proximity service system owner 10. In the past, this was only partially accomplished by credit card companies such as Visa, MasterCard, etc. that issued physical cards and required the proximity owner 10 to get remote approval each time a customer 15 wanted to use the card for which they would guarantee payment. However, credit card systems are only practical in limited proximity service systems such as those with POS checkout stations connected to a phone line.

Further, to protect the PSPS web-site owner from loss due to known collection problems, there can be lists of bad legacy and cyber cards given out to the proximity system owners 10 when they connect to the site to turn in the collection transaction data (in the case of legacy cards these are maintained at the web-site for the owner 10 since connection is required each time a service is requested). Each of the bad cyber cards may have a location of prior use, such as Dallas, Tex., associated with it so the owners 10 or the operators 20 of proximity service systems 3 do not necessarily have to notify each proximity service system 3 owned or operated thereby(in Japan for example) to not accept that particular cyber card. This is especially true since the cyber card valid life is relative short to begin with. Generally, this decision is left up to the owner 10. However the PSPS web-site 30 is preferably not responsible for payment on invalid cyber cards accepted by an owner's proximity service system 3 once the owner 3 or operator 20 of the proximity service system 3 has been notified that the cyber card is bad. In cases where an owner 10 subcontracts the operation of the proximity service system 3 to a third party, the third party operator 20 is assigned a cyber card code that allows the third party to access the owner information that is designated by the owner 10, plus routine maintenance data collected along with the daily transaction data. This information is transmitted to the PSPS web-site 30, and typically by the proximity service systems 3 partitioned over to the PSPS web-site pages for the operators 20 and most likely includes all of the maintenance and daily operational tasks such as delivery of transaction data to the PSPS web-site 30 and notifying the service location sites regarding invalid cyber cards.

In general, the process described above lets the customer 15 select the type of legacy or cyber card method desired to convey the customer cyber card code to the proximity service system 3 based on the list of methods the proximity owner 10 will accept supplied to the PSPS web-site 30. These might range from using a visa card plus a PIN number that changes each month to a portable wireless device carried by the customer 15 that transmits the customer cyber card code to the proximity service system 3 that deciphers the SPIN number cyber card code for the month that is stored and delivered by the wireless unit such as a cell phone to the proximity service system 3 each time the service is requested. The preferred embodiment for conveying the customer cyber card code to the proximity service system 3 is a common device for all proximity service systems 3 and all customers 15 such as a Master PASS or an Advanced Wireless Phone System described in detail in co-pending patent application Ser. Nos. 60/152,184 and 09/325,500, the entire content of both are hereby expressly incorporated herein by reference and advocated by the inventor. Alternatively, the customer cyber card code could be punched into a key pad provider or the proximity service system 3 or entered into the proximity service system 3 via a card reader, for example. Such devices will most likely be adopted in the next few years so consumers 15 only need to deal with one or two devices to face the world each day while owners 10 and operators 20 could finally solve the proximity service system or transaction unit commonality problems. Alternatively, the customer cyber card code could be punched or manually entered into a key pad provider or the proximity service system 3, or electronically entered into the proximity service system 3 via a card reader, for example.

As discussed earlier, the preferred method for housing and delivering the cyber card code to the proximity service system 3 is a wireless master proximity activation service system (Master PASS) device or the user's cell phone configured and operated in the manner disclosed in the applicants co-pending patent application entitled "Advanced Wireless Phone System" (AWPS), which is expressly incorporated herein by reference. These preferred wireless devices can store all of a persons credit cards, PIN numbers and/or other codes which may be required to the activate one or more of the proximity service systems 3. It should be noted that each of the proximity service systems 3 can be constructed in a manner disclosed in applicants co-pending patent application entitled "Communication and Proximity Authorization Systems", which has been expressly incorporated herein by reference, so as to receive and decode signals to activate any one or more of the proximity service systems 3 to provide the specified service. For example, one of the proximity service systems 3 can be a vending machine adapted to dispense candy. Upon receipt of an activation signal (such as a signal containing the cyber card code or a legacy credit card code from the wireless device carried by the customer) and the selection of a candy, the vending machine attempts to obtain authorization for the specified service (as discussed herein) and then provides the specified service of dispensing the selected candy for the customer once authorization is obtained.

The local authorization is approved at the owners 10 proximity service system 3 when a special password generator located in the proximity service system 3, similar or the same as the one in the customer private database unit 340 of FIG. 3, generates the same SPIN number when used in the computation of the valid monthly password provided to each owner 10 as described in more detail in connection with FIG. 4.

For example, this process can be very similar as that done in the public key private key security systems used extensively in the bank money authorization systems today. In the PSPS 1 preferred embodiment all of the owners 10 of the proximity service systems 3 are given the public key and they are changed periodically, such as each month for security reasons. This change in turn, forces the customers 15 to log back on to the web-site 30 periodically, such as each month (or when they have lost their device having the cyber card code stored thereon, etc.) to get a new password (that can be the private key, for example) that will generate a valid SPIN when used at approved proximity service systems 3. When the customer 15 is approved locally (by a process such as the one described above) or any other means agreed to between the owners 10 and web-site 30 owners that guarantee the payment, the amount of the transaction is computed (for example if the service is for parking the amount may be $3.00 an hour). The amount of the approved service along with the customer cyber card number or code is stored in a local transaction data base associated with the proximity service system 3 where the service was delivered to the customer 15. This data base can be delivered at predetermined intervals discussed in more detail in connection with FIG. 4 to the web-site 30 in an agreed to manner. For example, this polling can be accomplished in a manner similar to the manner in which many cable service systems are polled by the owners operating company (such as harvest does for Coca Cola on the company machines to deliver inventory and maintenance data). At the PSPS web-site owners home sites (FIG. 4) or operators home sites (FIG. 5), the credit and/or cyber card codes for each transaction is again deciphered and validated, sorted and sent to the customer private data base 340 for collection from the customer 15 who provided the cyber card code or credit card number to the proximity service system 3 and thereby received the service therefrom. The specified credit account and money is then deposited to the owner's bank account as described in more detail in connection with FIG. 4. The data is also accumulated and available on predetermined customer reports 350 available to the customer 15 via communication link 357.

The above description is in regards to how the special local authorization credit approval 370 may work in terms of using the special cyber card code by the customer 15 for a service and the owner 10 eventually gets paid and the web-site owner 30 collects from the customer 15 and provides the customer 15 a report listing all the charges, locations and service dates for example. The service reports provided in the available reports list 350 also provide customer 15 transaction data for the legacy credit card approvals for proximity services that are routed through the PSPS web-site 30 as described earlier and such payments are also deposited into the owners account as described in more detail in connection with FIG. 4.

Figure 4:
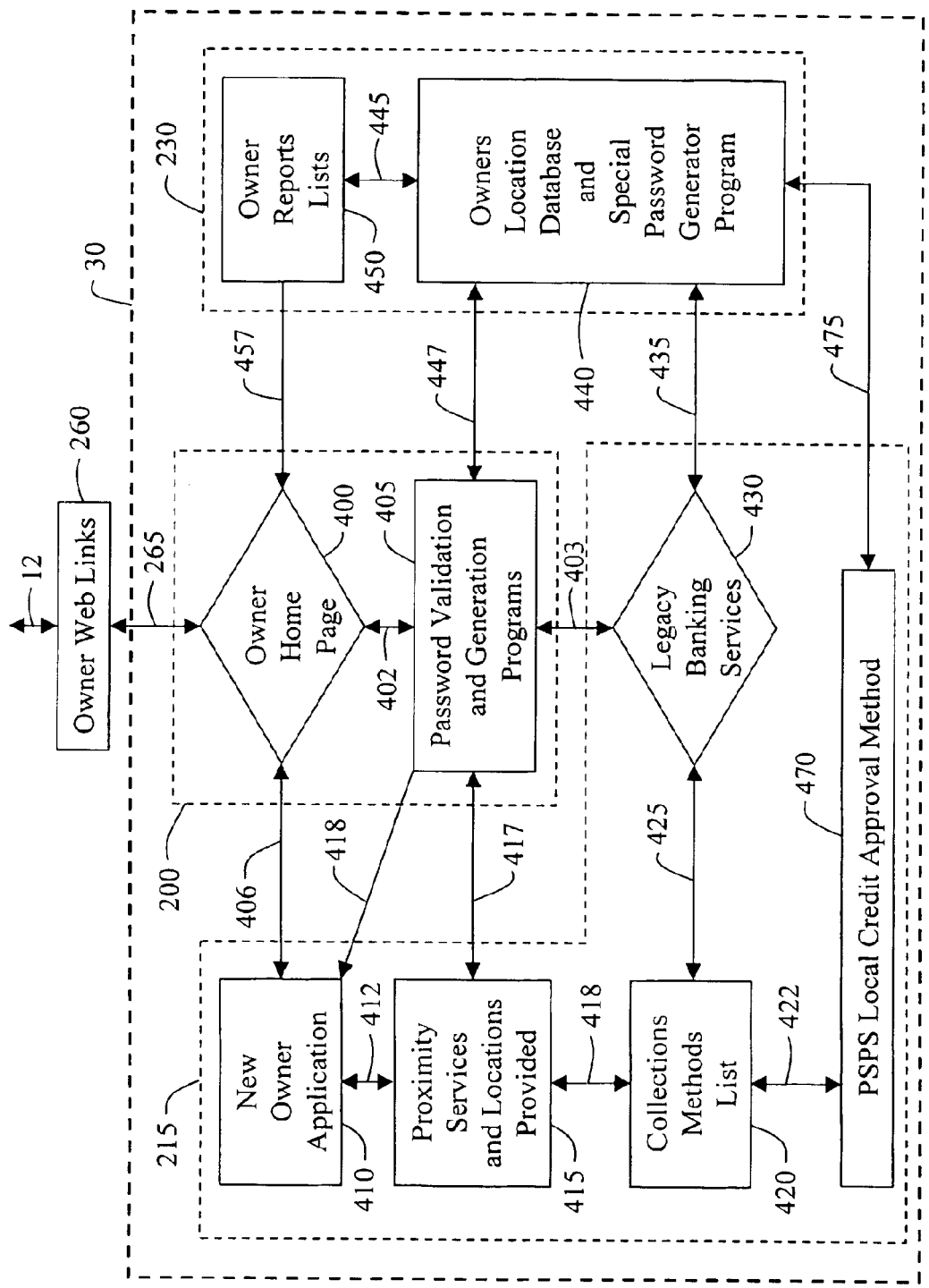
FIG. 4 is a block diagram showing a PSPS communication logic flow diagrams for owner services.

In FIG. 4 the server gateway 200 has an Owner Home Page 400 connected to the owner 10 via a communication link 265 and 12 as described earlier. The owner home page 400 allows a new proximity owner 10 to sign up for services via a communication link 406 connected to New Owner Application Programs 410 as part of Firewalls and Web Programs 215 for Proximity Service Owners 10. The application programs 410 in turn is connected via a communication link 412 to Proximity Services To Be Provided Data 415 that also lets the owner 10 list the owner's proximity service systems 3 and/or available service location sites (e.g. USA, Europe, Japan etc.) along with the methods the owner will permit proximity transactions to be approved and data to be collected (legacy or local). In addition the owner 10 is connected to Service Payment Choices 420 via a communication link 418 that in turn is connected to either Legacy Bank Service Programs 430 via a communication link 425 or a PSPS Local Credit Approval Method 470 via a communication link 422 that is eventually connected to 430 via a communication link 435 from an Owner's 10 Private Database and Special Password Generator Program 440 activated by a communication link 475. The legacy bank service programs 430 are connected via a communication link 403 and Password Validation and Generation Programs 405 to the bank account selected by the owner 10 via home page 280 of 200 and will be described in more detail in connection with FIG. 6.

Approval of services is either granted or denied by the PSPS web-site 30 owner depending upon how the owners 10 proximity services, locations, collection and payment requirements fit the PSPS web-site 30 owner predetermined criteria. When the request is denied, the owner 10 is notified to make different selections or to quit the new application process. When the owner 10 is approved for providing proximity services, the legacy banking unit 430 notifies the password validation and generation programs unit 405 via communication link 403 to generate a site pass word for the owner 10 and provides the pass word via communication link 418 to the application programs unit 410 connected to the owners 10 terminal via communication links 406, 265 and 12. In addition, an owner private database 440 is developed in Proximity Service Owners 10 Database Servers 235 and partitioned from other owner databases (as indicated by communication link 435) and the access code information to this database is provided by the password validation and generation programs unit 405 via a communication link 447.

When the owner 10 with a site password visits the PSPS owner home page 400 they can enter the pass word via a communication link 402 and access is granted by unit 405 if the password is valid. Once access is granted, the owner 10 can access any of the services 415, 420, 430 and 470 and make changes in the services available or collection methods previously approved. In addition the owner 10 can request reports from an available reports list 450 via communication link 447 and they are delivered from the owners 10 private database 440 via communication links 445 and 457.

When the owner 10 approves the PSPS local payment service 470 rather than or in addition to the legacy bank service 430 described above (where the payment is guaranteed and approved by a credit card company or other third party each time the service is requested) in which the PSPS web-site 30 owner guarantees payment to the owner 10 for a service approved locally at the owner 10 proximity service location (e.g. a vending machine or parking meter) the owner 10 is given a special cyber card number or code generated by unit 440 and provided back to the owner 10 via communication links 475, 422, 418, 412, 406, 265, and 12.

This special cyber card code will generate a unique service provider identification number (SPIN) at each owner 10 proximity service location selected for service by the customer 15 as described in more detail in connection with FIG. 3 above. Thus after selecting and being approved for the PSPS local payment method 470 the owner 10 can have local authorization services provided at those proximity service systems 3 or locations where the method for entering the customer's special cyber card code is accepted. As discussed earlier, the preferred method for housing and delivering the cyber card code is a wireless master proximity activation service system (Master PASS) device or the persons cell phone operating in the Master PASS mode disclosed in an advanced wireless phone system (AWPS) of which both are disclosed in co-pending applications as discussed above. These preferred wireless devices can store all of a persons credit cards, PIN numbers and be made to deliver the required cyber card code to the proximity service system 3. The local authorization is approved at the owners 10 proximity service system 3 as discussed above.

The authorization process can be similar to that done in the public key private key security systems used extensively in the bank money authorization systems today. In the PSPS web-site 30 preferred embodiment the owners 10 are given the public key and they are changed each month for security reasons. This change in turn, forces the customers to log back on to the PSPS web-site 30 each month (or when they have lost their card carrier etc.) to get a new password that will generate a valid SPIN when used at approved proximity service systems 3. When the customer 15 is approved locally (by a process such as the one described above) or any other means agreed to between the respective owners 10 and PSPS web-site 30 owners that guarantee the payment, the amount of the transaction is computed (for example if the service is for parking the amount may be $3.00 an hour). The amount of the approved service along with the customer 15 cyber card code is stored in the local transaction data base associated with the proximity service system 3 where the service was delivered to the customer 15. This data base can be delivered at predetermined intervals to the PSPS web-site 30 in an agreed to manner such as done with many cable service systems on a polled basis by the owners operating company (such as harvest does for Coca Cola on the company machines to deliver inventory and maintenance data). The operators 20 discussed in more detail in connection with FIG. 5 may connect the individual machines, i.e. the proximity service systems 3, to an Intranet or the Internet directly to make transaction collections very easy.

At the owners home page 400 (FIG. 4), the credit and cyber card codes for each transaction is deciphered and sorted in unit 440 using the same algorithms used to generate all of the customer 15 cyber cards. The cyber card codes entered into the proximity service systems 3 can be batched in the proximity service systems 3 and then periodically transferred to the PSPS web-site 30 and entered into the owners location database 400. The information associated with the legacy codes, i.e. transaction data in which the PSPS web-site 30 does not guarantee payment, is preferably transmitted to PSPS web-ite 30 in real time and entered into the owners location database 400 in real time. The PSPS web-site 30 may be programmed such that the legacy codes are periodically transferred to the PSPS web-site 30 and entered into the owners location database 400, if the entity that is guaranteeing payment to the owner wishes to conduct business in this way.

The collected money is sent to the owners bank account via communication link 435 and the owner 10 transaction data for each site along with any inventory or maintenance data is stored in the owner private data base 440. The customer 15 data is sent to the customers 15 home page through the fire walls using SSL for example in the server 200 administration. The data is also accumulated and available on predetermined owner reports 450 available to the owner 10 via communication link 457.

Figure 5:
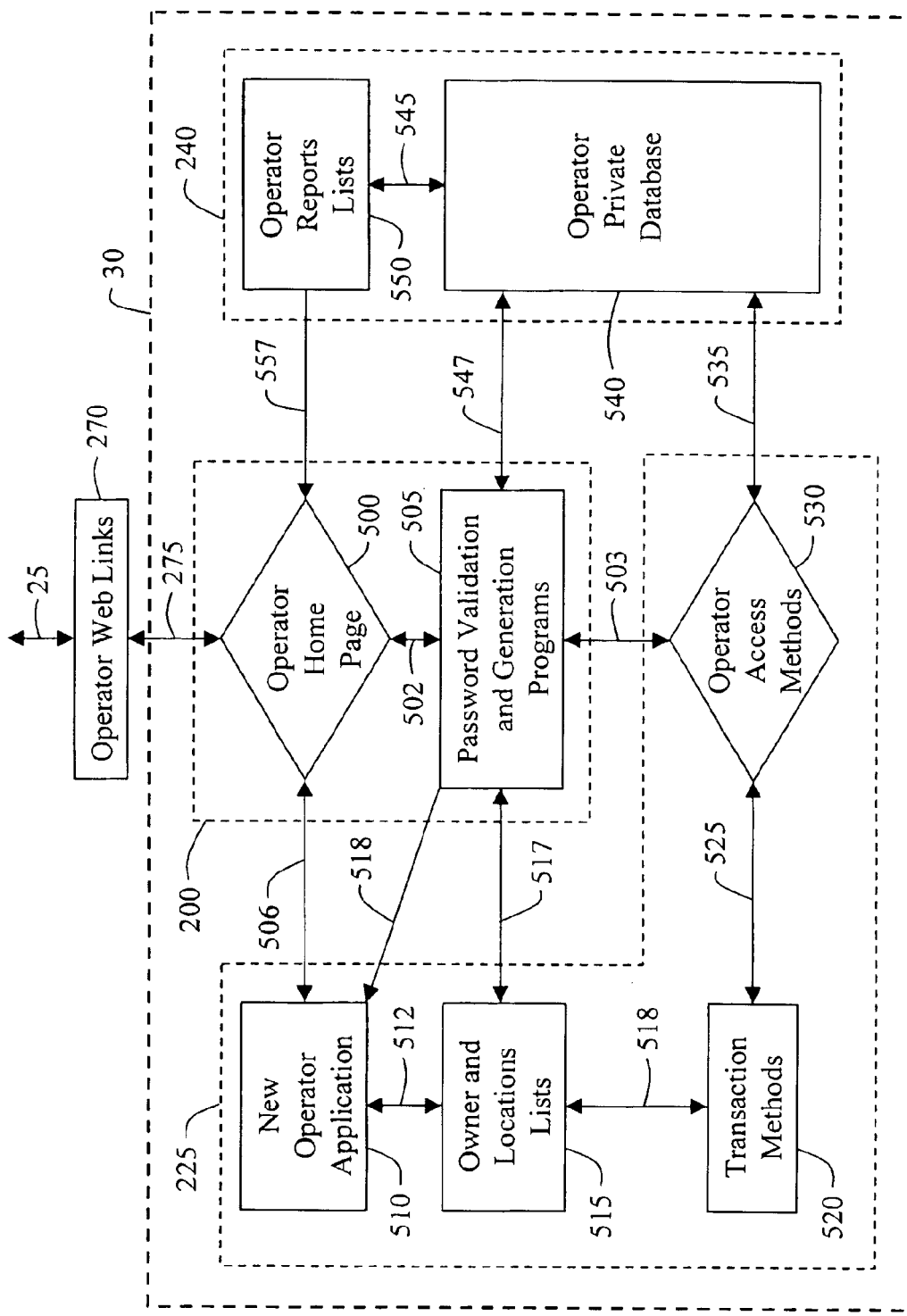
FIG. 5 is a block diagram showing a PSPS communication logic flow diagrams for operator services.

In FIG. 5 the server gateway 200 has a proximity system operator home page 500 connected to the computer system utilized by the operator 20 via communication links 275 and 25 as described earlier. The operator home page 500 allows a new proximity operator 20 to sign up to provide services for owners 10 via a communication link 506 connected to New Operator Application Programs 510 as part of Firewalls and Web Programs for Proximity Service Operators 220. The application programs 510 in turn are connected via a communication link 512 to a Proximity Owner Locations To Be Operated Data List 515 that list the owner service location sites (e.g. USA, Europe, Japan etc.). In addition the operator 20 is connected to an Accepted Transaction Choices 520 via a communication link 518 that in turn is connected to Access Programs 530 via a communication link 525. The access programs 530 are connected via a communication link 503 and a Password Validation and Generation Program 505 to the owner 10 home page 270 of 200 and will require one or more passwords given" to the operator 20 by the owner 10 that owns the proximity systems being operated by the operator 20. In other words, the owner 10 controls access to the information associated with the owner's proximity service systems 3 and only allows operators 20 access via passwords the owner controls. When the operator 20 is approved for providing proximity services for an owner 10, unit 530 notifies unit 505 via communication link 503 to generate a site pass word for the operator 20 and provides the pass word via communication link 518 to unit 510 connected to the operators 20 terminal via communication links 506, 275 and 25. In addition, an Operator Private Database 540 is developed in Proximity Services Operator's Database Servers 240 and partitioned from other operator databases (as indicated by a communication link 535) and the access code information to this database is provided by unit 505 via a communication link 547. When an operator 20 with a site password visits the PSPS 30 operator home page 500 they can enter the pass word via a communication link 502 and access is granted by unit 505 if the password is valid. Once access is granted to an operator 20 they can access any of the services 515, 520, 530 and make changes in the services available or collection methods previously approved. In addition the operator 20 can request reports from an Available Operator Reports List 550 via communication link 547 and they are delivered from the operators private database 540 via communication links 545 and 557. The operators 20 will normally focus on providing all proximity services for an owner 10 in a region, state or country for example and thus and an owner 10 may give out passwords to several operators 20 for different geographic regions and likewise an operator 20 may service many different proximity owners 10 in a same region. For example, an operator 20 may service toll systems for the regional tolling authority 10 and parking meters for the cities 10 in the region and parking lots for several more private owners 10 in the same region. Thus the main function of the operator 20 home page programs 500 are to manage regional data bases for multiple owners and combine these individual data bases 540 managed by proximity system operators 20 into the complete owner data base 440 discussed in connection with FIG. 4. This would be similar to the owner of a franchise letting the individual franchisees report their store data into a central location where it is combined into demographics for the complete set of operating stores. In this case the complete set of data is maintained in the data base 440 and the individual pieces are reported into the data base 540. Of course if one of the owners 10 managed all of their own proximity systems there would be no need to sign up one of the operators 20 except possibly to advertise that the owner 10 was looking to find an operator 20 or the owner 10 operated some systems as an operator 20 for other owners 10.

Figure 6:
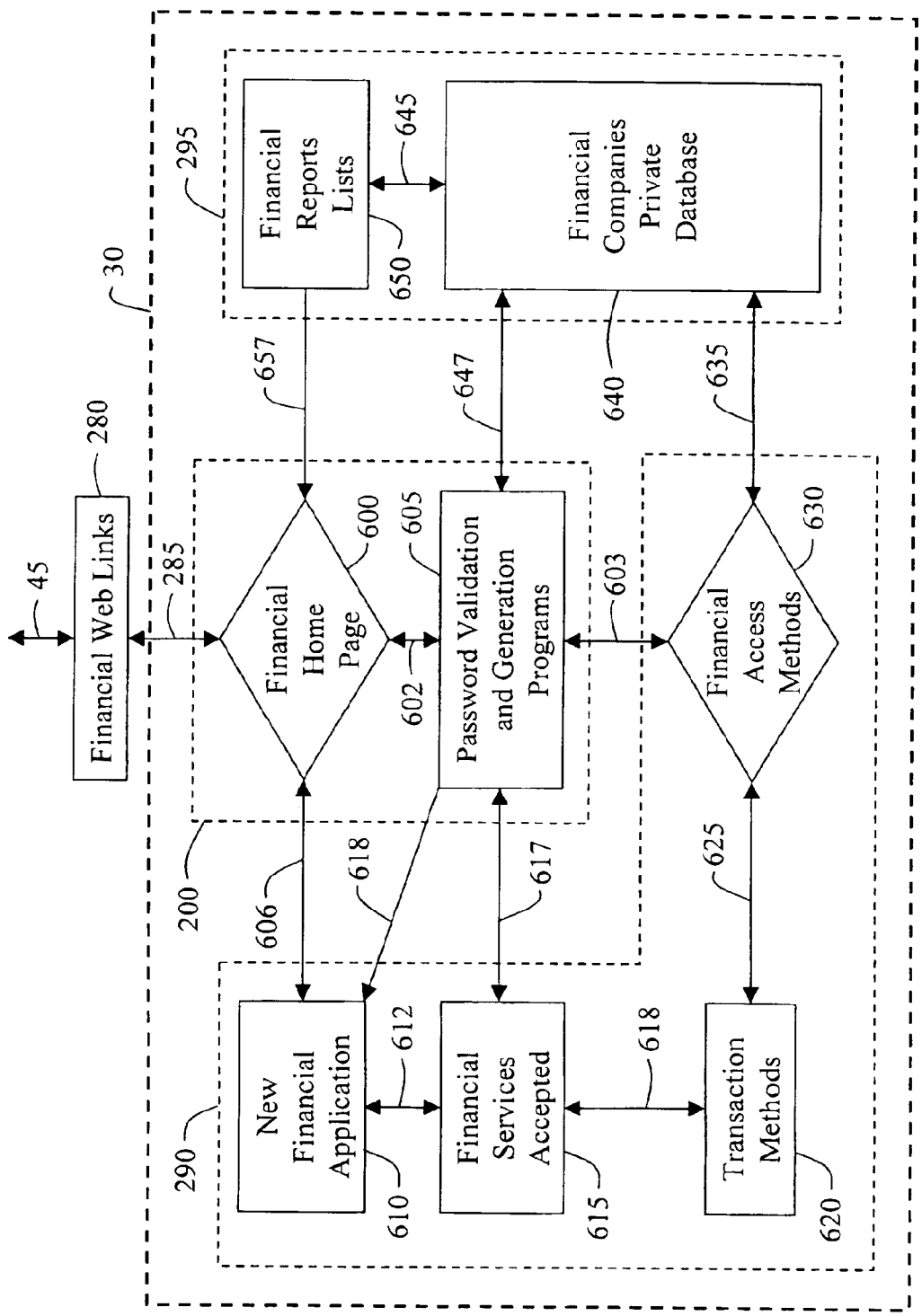
FIG. 6 is a block diagram showing a PSPS communication logic flow diagrams for financial services.

In FIG. 6 the server gateway 200 has a Financial Services (FS) Home Page 600 connected to the financial service location via 280 and 45 as described earlier. The FS home page 600 allows a new FS 40 to sign up to provide financial services for customers 15, owners 10 and operators 20 via a communication link 606 connected to a new FS Application Programs 610 as part of Firewalls and Web Programs for Financial Services 290. The application programs 610 in turn are connected via a communication link 612 to a PSPS Services Accepted List 615 for the customers 15, owners 10 and operators 20 requiring financial services.

Financial Transaction Method Choices 620 via a communication link 618 are designated and each method is connected to Access Programs 630 via a communication link 625. The access programs 630 are connected via a communication link 603 and Password Validation and Generation Programs 605 to the owner home page 260, the customer home page 250, and the operators home page 270. Connection to the financial programs in each of the other entities sites will require one or more passwords. When the financial service 40 is approved for providing services for one of the entities, unit 630 notifies unit 605 via communication link 603 to generate a site pass word for the financial service company 40 and provides the pass word via communication link 618 to unit 610 connected to the financial service company 40 terminal via communication links 606,285 and 45. In addition, a FS database 640 is developed in Financial Service Database Services 295 and partitioned from other FS 40 databases (as indicated by a communication link 635) and the access code information to this database is provided by unit 605 via a communication link 647. When a FS 40 company with a site password visits the FS home page 600 they can enter the pass word via a communication link 602 and access is granted by unit 605 if the password is valid.

Once access is granted to the FS 40, the FS 40 company can access any of the services 615, 620, 630 and make changes in the services available or credit methods previously approved. In addition the FS 40 company can request reports from an available Financial Reports List 650 via communication link 647 and they are delivered from the FS private database 640 via communication links 645 and 657.

FIGS. 7–12 depict more specific categories of customers 15, owners 10, and operators 20 that might want services more tailored to their needs. The operational description process of FIGS. 7–12 is the same as that identified for FIG. 1, except that the systems shown in FIGS. 7–12 each include a different category of proximity service systems 3 working in conjunction with various different categories of customers 15, owners 10, operators 20, and financial services 40. By way of example each of the systems shown in FIGS. 7–12 may be linked to the more general all inclusive proximity services PSPS website 30, which may be identified by the URL www.proximityservices.com, for example. Similar elements will be designated in FIGS. 7–12 with the same numeric prefix, and a different alphabetic suffix for purposes of clarity.

FIG. 7 shows a world wide proximity access service provider system (PASPS) 1000 for use by owners 10a of proximity service systems 3a, such as parking lots, airports, subways, and buses that have real need for local access requirements from customers 15a using wireless or card devices is shown. The operational description process of FIG. 7 for customers 15a, owners 10a, operators 20a and financial services 40a is the same as that used in connection with FIG. 1. Consequently an access services web-site 30a identified by the URL www.accessservices.com, for example, is depicted in FIG. 7 to show the more specific categories of customers, owners, and operators that might want services more tailored to their needs. By way of example the access services web-site 30a might be linked to the more general all inclusive PSPS web-site 30.

FIG. 8 shows a world wide proximity meter service provider system (PMSPS) 1002 for use by owners 10b, such as cities, of proximity service systems 3b, such as parking meters, that have a real need for local access requirements from customers 15b using wireless or card devices is shown. The operational description process of FIG. 8 for customers 15b, owners 10b, operators 20b and financial services 40b is the same as that used in connection with FIG. 1. Consequently a web-site 30b identified by the URL www.meterservices.com, for example, is depicted in FIG. 8 to show the more specific categories of customers, owners, and operators that might want services more tailored to their needs. By way of example the web-site 30b might be linked to the more general all inclusive PSPS web-site 30.

FIG. 9 shows a world wide proximity pay phone service provider system (PPSPS) 1004 for use by owners 10c, such as telephone companies, of proximity service systems 3c, such as pay phones, that have a real need for local access requirements from customers 15c using wireless or card devices is shown. The operational description process of FIG. 9 for customers 15c, owners 10c, operators 20c and financial services 40c is the same as that used in connection with FIG. 1. Consequently a web-site 30c identified by the URL www.picopay.com, for example, is depicted in FIG. 9 to show the more specific categories of customers, owners, and operators that might want services more tailored to their needs. By way of example, the web-site 30c might be linked to the more general all inclusive PSPS web-site 30.

FIG. 10 shows a proximity toll service provider system (PTSPS) 1006 which is similar in construction and function as the Proximity Service Provider System 1 discussed above with reference to FIGS. 1–6, except that users of proximity services 15 have been shown as users of toll services 15d, and the PSPS web-site 30 has been shown as a web-site 30d identified by the URL www.tollservices.com, for example. Thus, a link is provided between the users of toll services 15d and the web-site 30d for those customers or users to select proximity services to make it more convenient to drive through any toll gate any place in the world and for owners and operators of proximity service systems 3d, such as toll gates, to authorize the proximity service systems 3d for selection by the customers or users.

FIG. 11 shows a proximity vehicle service provider system (PVSPS) 1008 which is similar in construction and function as the Proximity Service Provider System 1 discussed above with reference to FIGS. 1–6, except that users of proximity services 15 have been shown as users of vehicle services 15e, and the PSPS web-site 30 has been shown as a web-site 30e identified by the URL www.vehicleservices.com, for example. Thus, a link is provided between the users of vehicle services 15e and the web-site 30e for those customers or users to select proximity services for those customers that want to be able to have vehicle services any place in the world and for owners and operators of vehicle services that want to make it more convenient for their customers such as a car rental customers to be able to select and thereafter utilize all of the proximity service systems 3, such as the access, toll, parking lot, and parking meters authorized by the owner of the vehicle services.

FIG. 12 depicts a Financial Service Provider System 1010 link to yet another web-site 30f which is identified in FIG. 12 as www.vendingmachineservices.com, by way of example, for those customers that want to be able to use any vending or kiosk machine any place in the world in accordance with the present invention, as discussed above with reference to FIGS. 1–6, and for owners and operators of vending and kiosk machines such as vending machine and kiosk service companies that want to make it more convenient for customers to use the proximity service systems 3f that will authorize vending machine products or services locally or remotely as discussed above.

As will be understood by those skilled in the art, the PSPS Web sites 30, 30a, 30b, 30c, 30d, 30e and 30f can be constructed in numerous different manners. For example, a system for constructing the PSPS Web sites 30, 30a, 30b, 30c, 30d, 30e and 30f, and thereby managing the various databases for the users, owners, operators, and financial services is discussed hereinafter.

In FIG. 13 a Master Integrated Technology System (MITS) 1301 for a predetermined generic user has all of the generic user elements (GUE) available to increase the users productivity. The MITS 1301 GUE will clearly be different for different generic users such as the MITS 1301 GUE for a hair salon franchisee would be different than the MITS 1301 GUE for a hospital. Also as technology improvements come along the MITS 1301 GUE for every predetermined generic business will have improvements just like car models have improvements. However these are slowly varying improvements and do not influence the basic MITS 1301 GUE for each generic user. The improvements just change the program features such as running faster costing less etc. similar to yearly improvements in automobiles. The improvements do not require the generic user to change the way they are doing business or to hire a person with a technology background. The MITS 1301 GUE are of three basic types and are grouped under a Master Operating Software System (MOSS) 1300 type elements and a Master User Interface (MUI) 1310 elements grouped separately since they are connected to both a User (U) 1390 and a System Bus SB 1356 and they are the "users input output control points" and in cooperation with the MITS 1301 elements puts the user in complete control of the underlying electronic controllable technology available to increase the users productivity.

Probably the single most important feature that allows a single program to be constructed to operate a MITS 1301 GUE for any generic user is a System Bus (SB) 1355 and 1356 versus a Master Bus 1315 design model. This simple "orthogonal" model for any user, independent of size and complexity, combined with available technology programming tools is what allows the invention to be described in terms that allows those skilled in the art of programming to construct a single program controlling vast resources. Probably the best recent analogy is the simple "layers, etching and doping" model used to describe how to grow and integrate unlimited numbers of circuit components onto to a single chip. The SB and MB design model provides a similar simplicity to those familiar with both the electronic technology available to increase user productivity (the MITS 1301 GUE attached to the SB 1355) and also familiar with the user requirements (the MITS 1301 GUE attached to the MB 1315) of the individual, business, government, school, or institution user. It is the "user requirements" (UR) defined by the set of MUI 1310 elements and accessed by the U 1390 that create the MB 1315 for every generic user. As will be described in connection with FIG. 19, the MB 1315 and SB 1355 orthogonal bus model allows those skilled in the art of UR (e.g. business, government, school, home etc.) to define the MB 1315 and SB 1355 "intersections" in such a way that those persons skilled in the art of programming can build a MITS 1301 MOSS 1300 and MUI 1310 for the User 1390.

Both the MOSS 1300 and the MUI 1310 will be described in more detail in connection with FIGS. 14 through 22 since they are the elements, along with the converter boxes (CB) associated with them that are created by this invention. The remaining MITS 1301 GUE are referred to sometimes as the users legacy elements since they are the application programs (AP) type elements 1305 controlling the users computers, networks, other electronic equipment plus any office and data bases AP connected directly to the system bus (SB) 1355. Because of some important difference in the types of 1305 AP and to add clarity to the description they are further sub grouped into System Application Programs (SAP) 1330, System Computer/Network Programs (SCNP) 1350 and System Machine Programs (SMP) 1360.

In common legacy terms the SAP 1330 are those programs written to meet multiple user requirements (UR) such as an accounting program or a CAD/CAM program where the users interacts with the SAP 1330 from a System Application Interface (SAI) 1335 unit (such as a legacy PC GUI terminal) controlled by the SAP 1330 via a communication link 1331 to try and satisfy his UR.

The SAP 1330 include all of the Internet programs employed by the user (such as AOL, Netscape, etc) and all of the SAP 1330 run on or in conjunction with at least one of the users SCNP 1350. The SCNP 1350 are normally thought of as legacy computer or network operating system programs such as Windows 98, NT 4, Linux, Unix, operating on Compact, Dell, Sun Micro computers connected to Cisco, Lucent, Nortel network systems that allow the SCNP 1350 operator to interact using System Computer/Network Interface (SCNI) 1352 units such as the familiar desktop manager controlled by a mouse via a communication link 1351 in order to satisfy the UR for platform capacity.

The SCNP 1350 elements include Internet legacy infrastructure elements if and only if one of the other MITS 1301 GUE groups (1300, 1310, 1330 or 1360) includes a program requiring connection to an Internet URL address. Today as a practical matter all of MITS 1301 GUE will include the Internet SAP 1330, SCNP 1350 and in many cases the SMP 1360 programs such as Point of sale or access control programs will connect to SAP 1330 programs residing on the Internet included in the users SCNP 1350 elements. In fact it turns out that a lot of the legacy Internet technology terminology makes it easy to understand and build a single MOSS 1300 for each MITS 1301 GUE as described in connection with FIGS. 14 through 24. Once a user has an MOSS 1300 constructed as described herein then utilizing the features of a Split Personal Computer System as discussed further below and in U.S. Ser. No. 09/014,859, filed Jan. 29, 1998 or a Multiple Service Customer and Multiple Location PC Service Provider System as discussed further below and in U.S. Ser. No. 09/408,598 filed Sep. 30, 1999, an individual or an owner of any company can stay in complete control, from any place in the world, of their MITS 1301 GUE employed to increase their productivity.

Before proceeding to the more detailed descriptions of how to build a MITS 1301 GUE MOSS 1300 that operates with the MUI 1310 elements to meet the UR selectable via 1390 while hiding the GUE 1305 elements, an explanation is in order of why two systems buses are shown (SB 1355 and 1356) versus the single master bus MB 1315. First, the SB 1355 and SB 1356 can be the same physical bus or they can be different if the user really wants to isolate their operation from outside intervention. Second, since the CB, to be described in great detail later, created by the intersection of the MOSS 1300 elements and the MUI 1310 elements are not orthogonal there are no CB required. So for the sake of clarity in description when the SB 1356 is involved no CB are required for the GUE associated with MOSS 1300 and MUI 1310 elements to communicate with each other. The opposite is true for the AP 1305 elements connected to the SB 1355 and the MB 1315, they are always subject to the CB requirements as described herein after and in conjunction with FIGS. 14 through 27.

In FIG. 14 the MITS 1301 GUE are further described in terms of the actual number of GUE associated with the MOSS 1300 the MUI 1310 and each of the AP 1305 types 1330, 1350 and 1360. The only MITS 1301 GUE group whose number of elements is not a function of the generic user such as the users, owners, and operators are the MOSS 1300 element group. The MOSS 1300 elements can be associated with four modules (elements) referred to as a Master Input Output System (MIOS) 1406, a Master Element Manager (MEM) 1407, a Master Database Manager (MDM) 1409 and a Master User Interface Manager (MUIM) 1408. These same four modules are in all MITS 1301 GUE MOSS 1300 and are connected together via a communication link 1405 their functions and purpose do not change. The number and purpose of the elements in the other GUE categories (groups 1310 and 1305) depend on the generic user, such as the users, owners, and operators and financial services, as will be described in detail in connection with FIGS. 24–27. The MIOS 1406 stores the MOSS 1300 input information such as the number and location of the AP 1305 elements and the MUI 1310 elements for each generic user MITS 1301.

The MIOS 1406 stores the user output information required from each AP 1305 element along with the user output format for each MUI 1310 element requested via U 1390. The MIOS 1406 will be described in further detail in connection with FIGS. 16, 17 and 18.

The MEM 1407 is the operational workhorse of the MOSS 1300 and is described in more detail in connection with FIGS. 16, 17 and 18. Functionally the MEM 1407 manages all the AP 1305 elements to only produce outputs meeting the UR and suppressing all of the other output possibilities.

The MDM 1409 maintains the databases needed to satisfy the UR and is described in more detail in connection with FIGS. 16, 17 and 18. The MUIM 1408 manages all of the communication between the MEM 1407, the MDM 1409 and the MUI 1310 elements created by the User 1390 demands.

In FIG. 14 legacy AP 1305 elements SAP 1330, SCNP 1350 and SMP 1360 along with the MUI 1310 elements are separated into individual elements for describing how a complete MITS 1301 GUE are constructed. Each of the individual MUI 1310 elements 1410-1 to 1410-*i*, each SAP 1330 element 1430-1 to 1430*n*, each SCNP 1350 element 1450-1 to 1450-*t* along with each SMP 1360 element 1460-1 to 1460-*p* could used in the construction of a truly generic MOSS 1300 program but since the user requirements would also have to be generic an example for a specific generic user is considered more appropriate. Consequently, referring to FIG. 14*a*, the MITS 1301 GUE for a generic theme park owner is used as an example. In order to keep it simple, a Park Integrated Technology System PITS 1301 PUE POSS 1300*a* for a single theme park user elements (PUE) as shown in FIG. 14*a* will be constructed and then further described with the aid of FIG. 26 to show how the same PITS 1301 PUE can be extended to include other theme parks or a set of theme parks belonging to the same owner. In FIG. 14*a* the Park Operating Software System (POSS) 1300*a* has the same four elements as described earlier for the MOSS 1300 where Park (P) replaces Master (M) but the function descriptions for 1406*a*, 1407*a*, 1408*a*, 1409*a* and 1405*a* remain as in the function description of the MOSS 1300 elements given earlier. The MUI element 1410-1 of FIG. 14 is expanded into the (i) Park User Interface (PUI) elements 1410-11 through 1410-1*i* that will represent the set of generic park user requirements (PUR) for a theme park. By way of example PUI 1410-11 may be the gate entry terminal for the Park Users PU 1390*a* at a front gate connected by the Park Bus PB 1355-11 to the automated gate entry equipment controlled by the Park Machine Program PMP 1460-11 that runs on one of the park computer/networks PB 1355-11 controlled by the Park Computer/Network Program (PCNP) 1450-11. The PUI 1410-11 may require an additional PUI 1410-111 to PUI 1410-11*k* (k additional "views") not shown since all programmers skilled in the art of programming understand how to set out the UR for a program "view". This set of k generic views for this one set of PUE would be one set of PUR that would be stored in the Park Input Output System PIOS 1406*a* and associated with the PUI 1410-11. For example PUI 1410-111 might be the view required when the PU 1390*a* asks for the user requirement request "give me entry gate demographics" (e.g. # of tickets sold today, # sold this season, etc). Note that this same set or a subset of these PUI 1410-11 PUR may be (most likely are) associated with other PUI 1410-11 to PUI 1410-1*i* PUE. In fact the actual number of necessary and sufficient PUR subsets to manage a park are not nearly as large as the number of times the set can subdivided into subsets of PUR and then be allocated to satisfy the theoretical number of PU 1390*a* requests on different PUI-1410-1 elements located through out the park system.

For example if the PUR total was 100 and the set of distinct PAP 1430-1 and PMP 1460-1 elements were 50 then there are 100!/(50!*50!) potential PUI 1410-1 elements that in turn may have 5 to 20 views. That many views PUR combinations are clearly not manageable by any stretch of the imagination. Not manageable like it was not manageable to have electronic technicians in the 1960's learn all the possible circuits that could be constructed taking 100 elements 50 at a time or to have programmers in the 1980's writing all the possible programs to control machines from 100 commands taken 50 at a time.

In the case of electronic circuits the problem became manageable using a generic set of useful circuits invented under the master invention of the Integrated Circuit (IC) so that a relative few useful generic circuits could be used to build a relative large number of specific electronic machines (the IC invention allowed the circuits to be hid from the user). In the case of programming a few useful programs were invented to control the electronic machines and these standard programs (called operating systems OS) allowed a large number (growing geometrically at the time of this invention) of specific user application programs to be written (the OS hid the machines from the user) for users buying the machines. As shown by the example given above for the PUE and PUR it is now time to hide the application programs from the user using the machines. The methods to do this will be referred to as Master Programming to distinguish it from legacy application programming methods or Operating System Programming methods. Master programmers will follow the design procedures (or their equivalent steps) as set out in this application. Fortunately the same programming tools and skills can be used in constructing a MOSS program that are used to construct specific user applications programs (AP) and write good Operating System (OS) programs. It is the MOSS method described in this invention or an equivalent description that will allow an application programmer to quickly become a MOSS programmer once the user (actually the MOSS designer) tells the MOSS programmer what the sub sets of the GUR are along with the number and type of MUI elements associated with each GUR subset. The MITS 1301 system designer for a generic user needs to be familiar with all the GUE and GUR where as the MOSS designer only needs to be familiar with the MOSS programming aspects of the MITS 1301 design.

In FIG. 15 is an example of a typical generic Park User Interface (PUI) 1410-1 connected to nine U 1390 and connected via SB 1356 to the PUIM 1408*a* connected to the other MITS 1301 elements via the communication link 1405*a*. The User 1390 can select any one of nine PUI choices 1500, 1505, 1510, 1515, 1520, 1530, 1540, 1550 and 1560. Upon selecting one of the nine choices a predetermined set of UR will be updated in the PDM 1409*a* after receiving a predetermined command from the PEM 1407*a* caused by the selected U1390*a* command sent to the PEM 1407*a* by the PUIM 1408*a* via communication links 1356 and 1405*a* respectively. The PUIM 1408*a* then sends back to the PUI 1410-1 along the same path 1405*a* and 1356 the information requested by the User 1390 in the predetermined format stored in the PIOS 1406*a* for the PUI 1410-1 for the selected one of nine choices.

Continuing with another example of the PITS 1301 PUE design lets say the PUI 1410-1*i* is the park owners U 1390*a* terminal having the nine view requests 1500 to 1560 shown in FIG. 15 and discussed earlier in connection with the PUIM 1408*a*. Each of the nine sets of PUR associated with PUI 1410-1*i* are stored in the PIOS 1406*a* and are used by the PEM 1407*a* to maintain the park master database (discussed in more detail in connection with FIGS. 16, 17, 18 and 19) under the control of the PDM 1409a. In addition lets assume that the nine predetermined sub views in PUI 1410-1i each have 3 additional predetermined sub views for a total of 27 views associated with PUI 1410-1i. Then the PIOS 1406a has to maintain 27 instead of 9 for the PEM 1407a and the PDM 1409a to manage. Note that in this second example no mention was made of how the PUI 1410-1i was connected to individual elements in the PAP 1430-1 or PMP 1460-1 or PCNP 1450-1 as done in describing the PUI 1410-11 operation and connections earlier in the first example. The reason is that maybe each of the 9 or 27 predetermined views requires combinations of information generated by two or more of the PAP 1430-1 or PMP 1460-1 elements connected to one or more PCNP 1450-1 elements. Such a number of combinations quickly leads to the hundreds of millions of combinatorial numbers used in the above illustrations. Thus we need a simple multiple dimensional method to quickly relate the subsets of PUR to the various PAP 1430-1 elements. Although any of a number of terminology and words could be used to describe what follows, the terminology used seems appropriate and easily understood by those skilled in the art of programming over the last two to ten years.

With the aid of FIG. 14b, the Master Bus MB 1315a and Park Bus PB 13551-11b-1355-ltk are related to a design matrix and described in such a manner to reduce the combinatorial PUR possibilities to a set determined by simple straight forward design steps. The design steps use Converter Boxes CB which can be thought of as multiple functional browsers for those programmers used to the Internet programming terminology. In FIG. 14b the PB 1355-11b to 1355-1tk (herein after referred to as PB1355 unless a particular bus need to be identified) represent the respective park physical system computers and networks on which the various PAP 1430-1 and PMP 1460-1 programs are operating and all of them intersect the POSS MB 1315a in an orthogonal manner (this is clearly not a physical intersection) and the number of times the PB 1355 intersects the MB 1315a depends on how many unique PUI 1410-11 to PUI 1410-1i elements are required to operate the park and satisfy the park user input out put requirements. Note that the (i) elements are the number of unique PUI 1410-1 elements not the physical number of park terminals on the PB 1355. The PUIM 1408a keeps track of the actual number and location of the park physical terminals and performs a many to one mapping prior to requesting a specific PUR view from the PEM 1407a. This many to one mapping done by the PUIM 1408a is a simple but powerful feature because it automatically scales the size of a generic PITS 1301 PUE POSS and lets a single POSS design operate many different parks scaled to many different sizes.

The number of intersections between the PB 1355 and the MB 1315 shown in FIG. 14b is i*r. the r=n+p and represents the number of PAP 1430-1 and PMP 1460-1 programs shown in FIG. 14a available or needed to run the park electronic controlled technology and included in the PUE and (i) is the number of unique PUR subsets built into the generic POSS 1300 as requested by the generic park owner. Both i and r represent the "features" and "horsepower" of the park PITS 1301 and POSS 100a and just as in the automobile industry their will be the "economy", "Midsize" and "Luxury" PITS 1301 and POSS 100a models with some selection of features given by the "Park PITS 1301 Companies". However having 3 to 10 models to chose from versus having millions of choices for each PUE set of park parts is analogous to the choices of "do you want to buy all the automobile parts and make your own automobile and then drive what you built with no warranty" or "do you want to chose from a selection of automobiles with warranties and drive one that is reliable and affordable".

It is already known that major PAP 1430-1 elements (this will be true for virtually every generic user) will be accounting programs such as DacEasy, Great plains, and office programs such as Office 2000 etc. In addition to these and the gate entry program used in the first example other programs that will most likely be behind the scenes of a POSS to meet the PUR subsets are Tax, Customer, Website, Ride, Office equipment, Security, Maintenance, Insurance, Purchasing, payments, HR, Government Regulations, Training, and Facility Mgt programs slanted towards park operations. Continuing with the design steps each of the (i) PUI 1410-1 elements represent a unique subset of PUR. Each unique PUR subset such as PUI 1410-1i requires information and/or actions from the PUE elements intersecting the POSS 1300a MB 1315a shown in FIG. 14b where at each intersection a CB is either shown or not shown.

In the example a CB is shown for the three intersection points (i,1), (i,n) and (i,r). Each CB say CBi,1 defines the information and/or actions to be taken by the PAP # 1, CBi,n the actions taken by the PAP #n and CBi,r the actions taken by the PMP # 1p shown in FIG. 14b upon receiving a particular View (subset of PUR subset) associated with the PUI 1410-1i unit. Each time a view is selected by a PU 1390a one or all of the three PUE elements might be required to meet the CB requests required for the view when the POSS 1300a receives a PU 1390a request from PUI 1410-1i via the PB 1356 for a specific view available to the PU 1390a using the PUI 1410-1i element.

Thus each view selectable from any PUI 1410-1 by a PU 1390a is associated with a set of predetermined CB's that are activated from the POSS 1300a PIOS 1406a as controlled by the PEM 1407a via PB 1356 in connection with the appropriate PAP's of 1430-1 or PMP's of 1460-1 to take action or generate information when instructed. Also a view command associated with each unique PU 1390a request will be sent by the PEM 1407a via 1405a to the PDM 1409a that will select the predetermined view response and the PDM 1409a will send via 1405a this response to the PUIM 1408a that will format and send via PB 1356 the information to the physical PUI 1410-1 terminal requesting the view.

In FIGS. 16, 17, and 18 a more detailed description is given so that any programmer skilled in the art can build a converter box and write master programs controlling a predetermined set of PUE having a predetermined set of converter boxes. FIG. 16 shows the inner workings of a typical MOSS 1300 and the inner workings of a typical SAP 1430-1 element and how the preferred communication between the MEM 1407 and the SAP 1430-1 element is accomplished. FIGS. 17, and 18 are the same as FIG. 16 except they relate to the SMP 1460-1 elements and the SCNP 1450-1 elements respectively. Consequently only a detailed description is given in connection with FIG. 16 and the FIG. 17 and FIG. 18 explanations are obtained by replacing the symbols for the SAP 1430-1 elements with those for the SMP 1460-1 and SCNP 1450-1 respectively.

In FIG. 16, the MIOS 1406 includes a MIOS Program 1605a connected to MIOS address tables 1605c via a communication link 1606 and connected to MIOS converter engines (CE) 1605b via communication link 1606 and getting commands via communication link 1405 from the MEM 1407 module. When the MIOS program 1605a gets a command from the MEM 1407 via communication link 1405, the command uses a predetermined format that tells the MIOS program 1605a what converter boxes need to be activated. The MIOS program 1605a decodes this command into an associated CB address located in the address table 1605c and a set of CE located in the MIOS converter engines 1605b. The MIOS address Tables 1605c store the Master Resource Locator (MRL) for each CB in each predetermined MITS 1301 system. The MRL identifies the exact SAP 1430-1 of FIG. 16 that each CE must operate with to cause the View request associated with the set of CB to be satisfied. The format of the MRL can be similar to that used on the Internet but should be of a higher level since the Internet SAP 1430-1 elements are just one set of elements to be controlled by the MEM 1407. Also the CE can be simple or complex engines as will be discussed in connection with the detailed workings of the MEM 1407 depending on the degree of security the MOSS user selects. For example the Military or Government Spy agencies would want more security in the CE program running their operation than a commercial business would be willing to pay. Another important aspect of the CB design are features that allow the Generic User Requirements (GUR) command from a CB received by the MUIM 1408 from a MUI 1410-1 element to be a CE command as simple as "connect SAP or SMP directly to the MUI 1410-1 element specified by the CB". There are many good examples of a stand alone SAP 1430-1 request such as a request for Office 2000 that already have useful control panels and do an adequate job of hiding the technology behind both the. SAP 1430-1 and the SAI 1335 as shown in FIG. 13. Other good examples are the SAP and SMP game programs developed for children and the SMP POS terminals used in many retail outlets today including those used at theme parks. In the cases where the MOSS CB requests a "direct connection" to the GUE a simple direct one to one communication connection between SB 1355 and SB 1356 is made by the MEM 1407 unit.

This is shown in FIG. 16 where a more detailed working of a SAP 1430-1 element is shown to make it easy for those skilled in the art of programming.

In FIG. 16 the working elements inside a SAP 1430-1 such as a word processing program are shown. The three key elements of any SAP 1430-1 are a SAP Program Engine 1660 connected to a SAP System Application Interface (SAI) Generator 1670 via a communication link 1665 and also connected to a SAP Database Manager 1650 via a communication link 1655. The SAP SAI generator 1670 is connected to the user SAI 1335 via a communication link 1331 as shown in FIG. 13. Thus when a Master Bus/System Application Program (MB/SAP) Browser Engine 1680 of FIG. 16 detects its MRL address sent from a Master Browser 1620a over SB 1356 to SB 1355 wherein the MB/SAP unit 1680 decodes a "direct connect command" the MB/SAP unit 1680 unit can either make a direct communication connection from the SAP SAI generator unit 1670 via the communication link 1331 to the requesting MUI 1410-1 element by connecting the SB 1355 to the SB 1356 or require that the connection be made back through a communication link 1645 connected to the MB/SAP Browser Engine 1680 connected via SB 1355 to SB 1356 to the units 1620a and a Master Program 1620b connected via a communication link 1621 and passed through communication link 1405 to a master interface program 1610a connected to a Master User Internet Browser 1610b via a communication link 1612 and finally out to the MUI 1410-1 element via SB 1356. The reason the connection might be forced back through the MOSS 1300 modules are for security and isolation reasons. However for this discussion it is assumed that CB "direct connect commands" means the underlying SAP or SMP "information and action" generators are connected to the MUI 1410-1 element in unaltered form. The above discussion disposes of the simple direct cases which will often occur since most all MUI 1410-1 elements will have generic user requirements (GUR) views that can be satisfied quickly by sending "direct connect commands" to SAP 1430-1 or SMP 1460-1 elements some of which were mentioned above.

The more interesting and much more useful situations regarding databases are when the direct command will not bring to the user the requested GUR subset or when the master database is being updated automatically and are being used to feed other AP so they automatically stay current based in the history of all the user MITS 1301 MUI 1410-1 element transactions. A good example would be when the manager of the theme park used in the early example requested the days operational summary data. Such a PUR would cut across many if not all the databases of the PAP 1430-1 and PMP 1460-1 elements such as shown in FIG. 16 as 1650 and in FIG. 17 as a SMP Database Manager 1750. It is these cases where the need for the MITS 1301 MOSS 1300 becomes so productive for the user. Also there are many interesting business data base threshold combinations were the data bases are being generated in "unconnected AP's 1305" that can signal good or bad situations developing or existing in the business. In most of these situations owners are managers would like to know ASAP when critical operating thresholds where crossed. It is the multiple database GUR activated by a MUI 1410-1 view via a U 1390 request that makes the current cost of operating technology so high since with out a MOSS the data from one SAP or SMP into still another SAP or SMP has to be combined manually in some fashion. These multiple database view requirements are an important number of GUR views for the individual and certainly for any business. The fact that nobody has written down these GUR and the predominate sub set of CB needed to run an operation from a MOSS is probably because direct operation of a SAP or SMP are all that has been available up until this invention. Even where a special program has been written for the customer to combine some data bases available from other programs the special program is still accessed directly and all the other GUR sub sets are still not considered for the generic user MOSS. Again the reason is probably because of the astronomical possibilities a programmer would face if asked to write a single program to completely run all aspects of a business. However using the MOSS design method described herein a single MOSS can be constructed to operate a complete generic business such as a theme park by those skilled in the art of programming. Continuing with FIGS. 14b and 16 the case for when the GUR view request requires information from multiple SAP 1430-1 database interrogations will be described.

In FIG. 14b the number of potential multiple data bases that could be required from a PUR request was r=p+n which represents the total predetermined PAP 1430-1 and PMP 1460-1 databases for a generic theme park PITS 1301 PUE. Although it probably would be rare to have information from every PUE database in a single view the question of the MB 1315 size (address plus command words) must be determined in any design. For example SB 1355 sizes range from 4 words (bytes) up to 256 words in order to have enough address plus command capacity for the SCNP 1450-1 elements to control every element on a predetermined MITS 1301 GUE system ranging from a standalone PC MITS 1301 up to a MITS 1301 that includes all the Internet SAP elements. The address size of the MB 1315 represents how many CB can be activated in the MIOS 1406 module by a single U 1390 view request. The MB 1315 command size needs to accommodate the largest number of unique MUI 1410-1 elements that need a view. That number was represented by (i) in FIG. 14b. As a practical matter the number of unique MUI 1410-1 probably will be less than 32 for a home MITS 1301 GUE even when the home appliances and security systems along with the entertainment and phone systems are included and as large as several hundred for world wide multi-national companies.

The number of MUI 1310 will be discussed in much more detail in connection with FIGS. 20 through 24. The size of the active MB 1315 also determines how large a MDM 1409 User Database 1615c must be to accommodate all of the potential data received from multiple SAP 1430-1 and SMP 1460-1 database queries. The active size of the MB 1315 is the actual predetermined number of MUI 1410-1 unique elements of a generic MITS 1301 GUE used in a specific design. MDM user data generator 1615b takes via a communication link 1616 the View data stored in the MDM user database 1615c each time a MDM program unit 1615a receives a request for view data from the Master Program 1620b via communication link 1405 and sends the view data to the Master Interface Program (MIP) 1610a via communication link 1405 that formats the view data before sending the view request data to the Master User Interface Browser 1610b via the communication link 1612 for delivery back to the requesting MUI 1410-1 unit via SB 1356. The preferred embodiment has the Master Browser 1620a periodically, at predetermined intervals associated with each CE in the MIOS converter engines 1605b, sending out CE requests for the predetermined MIOS 1406 sets of view data to the respective multiple SAP 1430-1 and SMP 1460-1 elements so that view requests from a MUI 1410-1 element U 1390 can be filled by the MOSS 1300 modules without having to wait for the Master Browser 1620a interrogation responses.

Since the active size of the MB 1315 can be specified for every specific generic design, a MB 1315 address size of two words (over 10,000 multiple data bases per view) and a MB 1315 command size of two words (over 10,000 unique user terminals) will be used as the preferred embodiment. It is important to distinguish the difference between the size of the MB 1315 (2 words by 2 words) and the size of the other various MOSS 1300 databases such as the MIOS 1406 databases and the MDM 1409 databases. The active size of the MB 1315 only determines the addressing range of the other two MOSS 1300 databases the active size of the MB 1315 does not indicate the size of each database cell in either the MIOS 1406 or MDM 1409. For example, the active MB 1315 size might indicate there are 200 View cells but the size of each view cell is a function of the GUR set associated with each cell in the case of the MDM 1615c database of FIG. 16.

In the case of the MIOS converter engines 1605b database the size of each cell depends on a number of factors ranging from the number of multiple database sets to the degree of security designed into the MOSS 1300. Both of these factors are well known to those skilled in the art of database programming and discussed In even greater detail in connection with FIGS. 20 through 24.

After choosing the active size of a specific MB 1315 design for a generic GUR set of views the GUE SAP 1430-1 and SMP 1460-1 of FIGS. 16 and 17 required to satisfy the GUR can be chosen which in turn dictates the SCNP 1450-1 of FIG. 18 needed to complete the MITS 1301 GUE design process for each generic user. The final detailed programming steps for the multiple database views are associated with periodically (or on command) launching the MIOS converter engines 1605b (or a search engine (SE) as will be described in more detail later). In the preferred embodiment the MIOS program 605a in FIG. 16 maintains an update table for every set of predetermined GUR views for a generic MITS 1301 MOSS 1300. The update table in the MIOS address tables 1605a associates a set of CE and SE stored in the MIOS program 1605a with each predetermined set of GUR views along with the frequency of update for each CE and SE. The MIOS program 1605a via the communication links 1405 notifies the master program 620b each time a CE or SE needs to be launched and provides both the MRL address from the MIOS address tables 1605c and the CE or SE or both from the MIOS converter engines 1605b via the communication link 1606 to the master browser 1620a via communication links 1405 and 1621. The master browser 1620a launches the selected CE and or SE to the MRL address of a predetermined SAP 1430-1 element that has a MB/SAP 1680 browser engine as shown in FIG. 16 via the SB 1356.

The MB/SAP browser engine 1680 unit detects the CE on the SB 1355 and notifies a MDM/SAP translator engine (TE) 1640 (put into the SAP 1430-1 as part of the MITS 1301 MOSS 1300 design procedure and discussed in more detail in connection with FIG. 24) via communication link 1645 to provide the requested CE or SE engine View Data or make the requested CE or SE View transaction or make an update to a predetermined portion of the MDM 1615c database where the predetermined data is used as a silent automatic input to other SAP 1430-1 or SMP 1460-1 program not requiring manual assistance. As will be discussed again in connection with FIG. 24 the TE will eventually become the heart and soul of good MOSS designs. Upon receiving the CE or SE request the SAP program engine 1660 is directed via communication link 1645 by the MDM/SAP translator engine 1640 to effect the request and the SAP program engines 1660 unit causes either the SAP database manager 1650 to get the data via communication link 1655 or instructs the SAP SAI generator 1670 to cause a transaction via communication link 1665 or both predetermined actions might take place. When the CE or SE requests requires data to be sent back the process is reversed as well understood by those skilled in the art of programming. The process described above is repeated for every CE or SE associated with the predetermined GUR view set of CE or SE until the multiple transactions are completed and the MDM user database 1615c associated with the view is updated. Thereafter if a MUI 1410-1 view request is received by the master user interface browser 1610b, an accurate response can be provided from the MDM user database 1615c. The discussions above apply equally to the FIGS. 17 and 18 where the workings of the MOSS 1300 is applied to the workings of SMP 1460-1 elements and to the workings of the SCNP 1450-1 respectively.

A key part of the MITS 1301 MOSS 1300 design is to hide all but the "direct connect" programs from the generic user and not require the user to understand how to load them or how to operate the AP 1305 elements. To accomplish this key feature each of the SAP 1330-1, SMP 1460-1 and SCNP 1450-1 elements are put under the control of the MOSS 1300 converter box engines (the converter engines act like today's IT administrators only the engines work at computer speeds and accuracy). The transactions required by the CB engines can be done in one of three ways well known to those skilled in the art of programming. The three ways are 1) through cooperation with the original AP 1305 designer to perform much of up date and upstream as requested 2) by operating the AP program from a set of view database generating Macros, or 3) finding another equivalent AP 1305 element designer that is willing to modify their design in order to be part of a higher order more appealing user friendly program. Also, by hiding all of the AP 1305 elements behind a single program multiple marketing and training materials will reduce the cost of each AP 1305 element product available to the user. Consequently the modifications required to incorporate MB/SAP, MB/SMP, and MB/SCNP Browser Units 1680, 1780, 1880 along with Translator Engines 1640, 1740, 1840 of FIGS. 16, 17 and 18 respectively can be done in at least three ways as just described. Note that this key part of the integrated program design is similar to describing the several "doping" methods that can be used to build IC's.

The preferred embodiment for incorporating each of the AP 1305 GUE is to start with the predominately accepted set of GUE for each generic industry and integrate these into an economy model, mid-size model luxury model etc in cooperation with the AP developers. However, the invention quickly lends itself to modifying several AP 1305 elements for each MITS 1301 GUE model able to satisfy each associated set of GUR with only slight difference and give the users choices like automobiles allow several choices of tires, sun roofs, and other accessories. In other words AP 1305 element designers will not only want to be SCNP 1450-1 Application Program Interface API compliant they will want to become Master Program Interface (MPI) compliant and future OSI programmers will want to be MPI compliant. The main difference between being API or OSI compliant is that your program will require someone to learn how to load it and use it where as when a designer makes his program MPI compliant a MOSS program will load it and manage it for the user. Also since MOSS 1300 has the "direct connect CE command" a user will not be giving up any API available in today's market but they will be gaining the full power of today's AP 1305 enslaved and integrated to work for each generic user using less skilled workers.

To review the design process, FIGS. 19 through 22 are used to more clearly describe both the process and the design matrices associated with each MITS 1301 GUE. In general, a design matrix is first provided. The design matrix has at least two axes with the system application programs 1430 being represented on one of the axes, and user requirement elements (GUR) being represented by another one of the axes. The system application programs 1430 each defining a particular technology. Each of the user requirement elements define a particular user requirement.

One unique intersection point is located between each of the user requirement elements represented on one of the axes and the system application programs 1430 represented by another one of the axes in the design matrix. Then, a technology converter requirement or converter box is developed for each intersection point. Each technology converter requirement uses the system application program at each intersection point to develop an output satisfying the user requirement element at the corresponding intersection point.

More specifically, in FIG. 19 a set of predetermined GUR are shown allocated to a set of predetermined MITS 1301 MUI elements 1 through v required to satisfy the necessary subset of the GUR that can be made by a user 1390. The GUR subset allocation is done by 1) either a MITS 1301 designer being familiar with the generic user input output needs at various points of the generic user operation such as a theme park, a hair salon, or fast food franchise operation or 2) a design GUR request form along with a MOSS AP 1305 size form is filled out by the generic business owner or Individual. Method two is tomorrows Web store version of purchasing a complete MITS 1301 with the MOSS 1300. At the time of this invention only some of a MITS 1301 GUE can be purchased by filling out an order form such as the SCNP 1350 elements and some SAP 1330 and SMP 1360 but none have a MOSS 1300. With this invention tomorrow's users will be able to order integrated technology elements operating as they specify under the control of a single MOSS and for the most part only need MUI terminals at the user interface points 1390. Each MUI element 1 to v has at least one GUR subset called a GUR view (GURV) that can be requested by one of the users 1390 via SB 1356 connected to the MOSS 1300 as represented by a CB shown at the intersections of the MITS 1301 MB 1315 created by the GUR and the AP 1305 MITS 1301 SB 1355. Note that each GURV is defined as either providing an input (I) action such as a POS credit card transaction or requesting an out put (O) action such as a report, picture or receipt, etc or the GURV might require several I and O actions. For example a credit card GURV might always require a set of several predetermined I and O actions. Sets of I/O caused at an MUI location are treated as one GURV and define one CB like CB1n in FIG. 19 for example and in FIG. 20 the Intersection Address (IA) is IA1n. Note that terminal view changes that just give the user another menu to make another choice are handled directly by the MUI terminal or MOSS 1300 and are not part of the MB 1315 and SB 1356 interconnection logic diagram shown in FIG. 19.

The CB and associated CE discussed herein always refer to MOSS actions causing transaction processing other than giving a user another MUI view to make a request from. In FIG. 20, one of the MIOS address tables 1605c discussed earlier is shown for a predetermined number of n AP 1305 elements and a predetermined number of v MUI terminals that each have a unique set of MITS 1301 GURV. Each IA of FIG. 20 is associated with a predetermined MRL relating a specific Predetermined MOSS AP element with a specific predetermined MITS 1301 MUI element. The MIOS address table 1605c exists even though there may not be a CB associated with each address.

In fact as shown in FIG. 21 the MIOS 1406 CE table 1605b has fewer CE than the MIOS address tables 1605c has IA addresses. This will most likely be the case and especially as the predetermined MITS 1301 generic user becomes larger and the MUI terminals required to satisfy all the predetermined sets of GURV range from those MUI with the GURV sets for the corporate officers that are interested in company performance down to those less skilled workers operating specific POS MUI with only the GURV sets required for customer interface transactions. In FIG. 21 the three types of CE types associated with any MOSS MIOS 1406 CE table 1605c are shown. The CE shown in FIG. 21 with an IA matrix subscript such as CE11 and CE42 are IA where either a) multiple AP database, b) specific parts of a single AP are required or c) combinations of these two CE transactions are required to meet the GURV for the MUI requested by a user 1390. This type CE is really one of the major purposes for the MOSS invention because this need for automated AP database transactions integration and control Is what MOSS is really all about. The other two types of CE engines shown in FIG. 21 and are referred as the Direct Connect (DC) engine and the Not/Applicable (N/A) engine. The DC engine was also discussed earlier and that is a simple GURV request to DC the AP associated with the IA to the MUI element associated with the IA. For example in FIG. 21 the DC at IA22 would directly connect the AP#2 (say office 2000) to the MUI # 2 terminal when requested by the user 1390. While discussing the MUI # 2 note that the GURV selections available to the user at that location are one DC and one N/A and two complex GURV CE23 and CE2n respectively. Also note that every MUI 1 through v shown in FIG. 21 to have at least one complex GURV or N/A or both. At this point it is important to understand that the MOSS invention is only needed for that part of a user MOSS GUE that requires complex AP database transaction integration or AP blockage as will be discussed last. If for example a users MUI terminals where the matrix of FIG. 21 was filled with DC engines then the user does not need a MOSS 1300. The corollary is that users can have all sorts of non MITS 1301 GUE but they will not be integrated into the users MOSS and if they influence the users bottom line or performance goals the user will clearly not have a complete MITS 1301 design. The third type of CE shown in FIG. 21 is the N/A and it is the opposite of the DC engine and probably the most important CE in every generic MOSS design in terms of making money or increasing performance goals for the user. The N/A in essence blocks the complete underlying AP 1305 element from the MUI terminal and as shown in FIG. 21 many IA show N/A engines. In fact for the purposes of these descriptions all of the SCNP 1350 elements are considered N/A and not even used in these discussions or considered part of the IA matrix. To show and discuss the actual SCNP AP 1305 elements in a MITS 1301 MUI discussion would be like discussing what an API is or OSI is to a programmer that has written 100 programs to operate with the NT 4 platforms or to run on an ISP.

The purpose of the MOSS 1300 is to hide all the AP 1305 elements and especially the SCNP 1350 platforms and programs that support the multitude of SAP 1330 and SMP 1360 programs that MOSS 1300 controls under a single program. The N/A feature block all SCNP 1350 programs in essence and says no MUI 1310 user terminals will ever have to deal with complicated and confusing desktop GUI MUI as presented to SCNP 1350 administrators such as described in the Microsoft Certified System Engineer (MCSE) series of twenty or so books. The MOSS designs will in essence hide completely all the confusing desktop managers available to help allocate what AP 1305 Icons show up on what terminals like 1335, 1352, and a Terminal 1365. This fact is probably the greatest feature of the MOSS 1300 from a practical point of view since the user can greatly reduce the employees using the MUI terminals to play games and visit the Internet on company time since those options simply wont be available due to the N/A blocking engine capability of the MOSS 1300 design on most MUI 1310 terminals. Another easy feature to include in the MOSS 1300 design are the automatic MUI 1310 transaction demographics that can be kept in the MDM 1409 data base or can be kept in the MUIM 1408 unit so that user customer, user facilities, and employee activity can be easily observed by the owner. FIG. 15 is a good example of how the theme park PUI terminal 1410-1 only had nine user related GURV selection request shown and all of them showed park related GURV transactions would follow when any one of the nine selections were made. The MOSS 1300 design descriptions given are more than adequate for those skilled in the art of programming to build a MOSS 1300 unit for a predetermined set of AP 1305 elements related to a predetermined set of GURV and MUI 1310 terminals as defined by the matrices in FIGS. 20 and 21.

In addition, with the rapid movement of AP 1305 elements for "rent" from website's such as office 2000, accounting, e-mail service, etc., the MOSS design lends itself nicely to provide the "ultimate rent a master program" in that each user has their own Website and keeps all the MITS 1301 GUE except the MUI 1310 elements themselves that are disbursed through out the users operation at the ISP location or location. In this manner the AP 1305 elements are not only MOSS 1300 design hidden they are physically eliminated from the users operation and that is most likely even better (the government and institutional users will probably still want the have their own AP 1305 elements and just have them hidden from the employees). This Internet service is anticipated and is actually the preferred embodiment of the MOSS 1300 design and so in FIG. 22 all of the FIG. 21 CE are converted to Converter Browser Engines (CBE) to show that all communication between the MUIM 1408 interface browser 1610b as shown in FIGS. 16, 17 and 18 are MOSS 1300 browser engines located at the ISP location of the MITS 1301 GUE and the MUI terminals involve Internet browsing.

Note however that a FIG. 22 must all ways be associated with a FIG. 21 (Internet service or not) because the CE of FIG. 21 relate to the MIOS 1406 1605b engines controlled by the MEM 1407 MP 1620b and master browser 1620a that communicates with the hidden AP 1305 elements whereas the CBE of FIG. 22 relate to communication engines between the MUI 1310 elements and the MUIM 1408 and MDM 1409 elements that provide the MOSS 1300 responses for each user 1390 request. This double buffered or double protection feature of the MOSS 1300 was discussed earlier and the two CE FIGS. 21 and 22 for every MOSS design makes this design fact abundantly clear to those skilled in the art of programming. In addition each CB could have a search engine SE as mentioned earlier to perform selected internal or external database searches to satisfy many of the GURV especially in the future, consequently as a good design procedure for every CE there should be an associated SE in the design matrix and FIG. 22a is used to depict this fact even though both a CE and SE might not be required. Even though the combinatorial design possibilities with a lot of GURV, say n having a number of MUI showing specific GURV subsets say v, become astronomical quickly (n!/(v!*(n−v)!), as a practical matter, for any particular generic user only a few are required and in most cases the GURV subsets are well known to the user. This is shown with the aid of FIGS. 23, 24, and 25.

In FIG. 23 an embodiment of a GURV MUI generation table for a typical medium to large size company is shown. In FIG. 23, four basic well known User Relation (UR) groups (they also can be thought of as department groups) are shown that apply to virtually any generic user along with a special UR group that will depend on the specific sub generic user along with 20 AP 1305 SAP and SMP program elements. The sub generic UR group is described in more detail in connection with FIG. 25. The 19 AP programs listed along with the specialty AP programs (of which one is shown) are also well known to the generic user and in most cases multiple AP are available to satisfy the UR groups. For example there are probably at least five accounting programs that will service all UR large and small, two tax programs, three office programs, three forms programs etc. Since for the most part these programs become hidden from the user behind a MOSS 1300, a list of the AP to use are not necessary in order to describe the design procedure. In FIG. 23 the four UR groups or departments are operations, accounting, HR and G&A. The GURV for essentially all MOSS 1300 designs can be generated using the table in FIG. 23 (or its equivalent) by assigning a MUI 1310 to each of the intersections points created by the AP line intersecting with each of the five UR groups along with the number of CE required for each MUI 1310. The CE number is shown in parenthesis as (r) and for sake of demonstrating the size of a typical MOSS CE matrix as shown in FIGS. 21, 22 and 22*a* assume r was 3 for an economy MOSS 1300 design. If in fact the numbers in FIG. 23 are typical, then only 100 MUI 1310 type terminals, each satisfying 3 sets of GURV are required for a typical MOSS 1300 (the economy model) and 300 CE would be distributed over a 2000 element matrix in FIGS. 20, 21, 22 and 22*a*. Even if the number of CE engines for each MUI were increased to r=10 only 100 MUI 1310 are still required where each can Satisfy 10 GURV (the luxury model) and the 2000 size matrix in FIGS. 20, 21 and 22 would be 50% full instead of 16% full as in the case of the economy model r=3. In fact the number of MUI 1310 are much smaller than the design matrix used in FIG. 23 to build the MOSS 100. The reason is that each department usually only needs or wants more than 1 to 10 MUI 1310 types for the employees to work with and most of the CE choices at each of the intersection points of FIG. 23 will be either DC or N/A (the N/A is the default value) if the user does not specify. Consequently it becomes clear that following the object oriented design procedures described herein programmers skilled in the art can readily become master programmers and write programs for any MOSS 1300 design where the CE GURV and AP 1305 elements are provided.

As discussed in connection with FIGS. 16, 17 and 18 another powerful (in the future maybe the most powerful) feature of the MOSS 1300 design are the silent translator engines (TE) that feed the common MOSS 1300 databases to predetermined frequencies managed by the MEM 1407 MOSS 1300 module. It is these behind the scenes TE that operate to keep all the MOSS 1300 user data bases feeding a common database in a fashion not unlike the concept behind synchronizing two databases such as done between portable computers and desktop computers but clearly much different in how they work since synchronizing two is much easier than feeding a master database from say 100 slices of many separate databases as done by the MOSS 1300. However to elevate this part of the design procedure to its proper place FIG. 24 shows the same MOSS 1300 design as FIG. 23 except TE (t) are used to denote silent MOSS database automation features that are transpiring periodically to maintain the MDM 1409 databases required to satisfy all of the theoretical MUI (millions and millions) if one is ever needed. A good example would be say the Tax AP # 10 of FIG. 24 was a program such as Turbo Tax and the 15 or so accounting related programs in column 2 of FIG. 24 all came from Quicken. Both of these AP brands are very popular for both individual and small business generic users. Then the MOSS 1300 would be filling out all the generic user Turbo Tax return behind the scenes based on the 110 transactions coming in from all the MUI 1310 terminals and the computations being accomplished in the other 15 or so AP Quicken accounting related AP. Then for example if one of the special MUI GURV was "let me see the Tax due" an individual or owner would know during the year what his tax liability was and maybe have the Tax expert make suggestions. In this example it is clear that the behind the scenes processing is huge and most likely has more and different contact points than the simple I/O points made visible to the generic user.

With the aid of FIGS. 25 and 26 a more detailed description of a generic user is afforded. In FIG. 25 a table for 536 generic users and specific sub users is given where the user categories were taken from the Standard Industrial Classification (SIC) published by the Department of Commerce and used industry wide. The table was constructed by taking the major generic categories and then counting the number of sub categories at the next level to arrive at the 536. If one was to go to the next level another multiplier of approximately 10 would give over 5000 MOSS programs is all that is required to service the industry (that is actually a very small number compared to the number of SAP 1330 programs alone that are on the market when website programs are included). Continuing, if there were say 1000 businesses operating in each of the 5000 category a market of one thousand users for every MOSS 1300 design would be a good supportable market and if each license was for say 3% of the gross (user savings from a MOSS 1300 will range from 10 to 20%) then you can see the industry of hiding technology from the user in combination with automating the users business (remember a MOSS 1300 does both) will become as big if not bigger than the underlying technology. The business of hiding, automating, and integrating technology together for the benefit of the customer can now be very practical if the Internet is properly employed.

In FIG. 26 the preferred deployment of the MOSS 1300 invention on the Internet 2600 is shown where Generic User Websites 2610 maintain generic MITS 1301 AP 1305 technology for the sub generic users like those of Websites 2620. The 2620 Websites have the actual MOSS 1300 programs for specific User Websites such as shown in 2630. The specific user Website 2630 then services their specific users like kind MUI's 1310 shown as Franchisee MUI's 2640 and can offer tailor made features such as now done by technology, grocery or automobile shopping carts. The specific users themselves only have to have the MUI 1310 terminals required for their specific business.

In addition to the fixed generic user technology AP 1305 and MUI 1310 described in FIGS. 13 through 18 the MOSS invention with the appropriate interface modifications using Converter Boxes 2719 are shown in FIG. 27 to operate with portable MUI 1310 and wireless AP 1305 and SCNP 1350 elements. Some of the Mobile Devices 2710*a,b,n* and proximity systems described in a patent application identified by U.S. Ser. No. 09/652,077, entitled "New Communication and Proximity Authorization Systems"; and filed on Aug. 31, 2000, the entire content of which is hereby expressly incorporated herein by reference, are shown in FIGS. 27 along with Communication Networks 2745 and 2760. The devices 2710*a–n* can be given a MOSS 1300 unit with converter boxes 2719 to automatically detect and operate with all the various proximity and communication systems automatically upon activating the proper MUI 1310 User 1390 selection. Some of the specific proximity systems identified in FIG. 27 are referred to as, 2722 for Toll/Subway Systems, as 2724 for ATM Systems, as 2726 for Gas Station Systems, as 2728 for Store Checkout Systems, as 2730 for Vehicle Systems, as a 2732 for Parking Systems (including parking meters), as 2734 for Mobile Transportation Credit Systems such as used in taxis and buses, as 2736 for House and BuildingS, as 2738 for Vending Machine Systems that also can be made to work with wireless mobile devices.

In FIG. 27 the basic operation of a mobile MITS 1301 is described by starting with the multiple mobile devices shown in 2710 where five different type devices such as a digital cell phone, pager, computer, PDA or a specialty device are shown. For the sake of clarity, let four types of the devices be wireless mobile and not discussed in connection with FIGS. 13 through 18. These devices are those that work with existing communication systems SCNP 1350 platforms such as Windows CE, Blue Tooth, WAP and activate existing Proximity systems SMP 1360 and will be denoted by 2710*a*, 2710*b*, 2710*c* and 2710*n*. The fifth mobile MUI 1310 (it may or may not be wireless) already designed to operate with a MITS1301 (shown as 2720) is denoted as 2710L. The four 2710 wireless mobile device elements 2710a, 2710b, 2710c and 2710n can be made to operate with compliant proximity and communication system after the MOSS 2719 elements are installed in 2710a, 2710b, 2710c, 2710n and connected via a communication link 2717 are connected to the MITS 1301 via a communication link 2716. The complete SB 1355 and 1356 are shown in FIG. 27 as communications links 2717, 2729, 2745 and 2760. For those persons skilled in the art of programming on the Windows CE platform, the above description along with the detailed design descriptions given in connection with FIGS. 20 through 25 allow the MOSS 1300 to be incorporated into the four types of devices.

Further, in one preferred embodiment, the MUI 1310 above can include a Low Entropy Terminal User System (LETUS) 1320, discussed further below so that data entry outputs, information outputs, selection outputs and computer terminal contacts of the LETUS 1320 can be used for controlling the MOSS 1300.

In general, the LETUS 1320 relates to the methods by which computer systems are controlled by individuals using a terminal of some type and the terminal patterns presented to a user for controlling the computer system. In particular the LETUS 1320 relates to a general method for users to control computer systems and networks from computer interface devices (terminals) such as computer screens, radios, telephones or keyboards that precludes the user from changing the terminal control patterns increasing the entropy of the interface device control terminal as they operate the computer system.

Ways for users to control and operate computer systems are as old as computers themselves and until the advent of the Graphical User Interface (GUI) in the 1980's the text selection menu was the most common method to allow a user to operate the computer system from a terminal. With the advent of the GUI selection "Icons" attached to applications or other computer commands, the need for desktop managers such as used by Windows 2000 or the iMac "became a defacto adopted standard" in the early 90's for allowing a user to operate and design their own computer control terminal interface. With the advent of the HTML standards and the World Wide Web (WWW) distributed database computer networks, the Browser was created to read all the various distributed "desk top" computer screens or "Website pages" as they are commonly called. The "dynamic hyperlink icon" was created in the mid 90's to move quickly from one piece of information to another located at another location on the WWW distributed computer system and many more "network User Interfaces" (sometime referred to as NUI's) were provided to the user.

At present there are two major Browser desktop manager interpreters and icon interface controllers referred to as Netscape (the forerunner of Netscape was Mosaic created by Marc Andresson and others at the University of Illinois) and Internet Explorer created at the Microsoft Company in the last couple of years to compete with the Netscape browser. In fact Browser user interface screens are quickly replacing standard desk top manager user interface screens as the preferred computer user interface screen in order that a user can look at any of the millions of WWW computer screens. Plus, they are now adapted so one can look at one's own computer directories and files from the same browser.

However, whether it is the local computer system desktop manager or a WWW plus local computer system browser, the poor user is still deluged with 100 and 1000' and now millions of icons (including the hyperlinks) attached to information files or computer program. One can summarize the above computer control systems by saying "they have the ability to connect any computer file through out the world to any user through out the world with as many screen combinations of information connection icons as a programmer can create in their lifetime (programmers include individuals designing their own desk top screens using programs such as Windows or iMac or WWW programs supplied by companies such as AOL or Yahoo to attach icons to files or programs). In fact, this has become a popular past time with many because it is so easy. Although the user computer control system is only useful to a single individual, it is highly promoted by the desktop manager program developer companies (see U.S. Pat. No. 6,061,692 by Thomas, et al. assigned to Microsoft Corp and U.S. Pat. No. 6,014,638 by Burge et al. assigned to AOL).

In terms of low entropy control systems (Reference Information Theory, pattern recognition and neural networks by David J. C. MacKay published by Cavendish Laboratory, Cambridge UK), it was much better when one had to use the "C:\" prompt because it was standard and the prompt always started at the top of the computer file directory system no matter whose computer one was using. That is, the energy required to learn how to operate somebody else's computer was much less than when all files were arranged automatically into a directory and a file (only two things to look for) than now where one can arrange one's own connection patterns (unlimited things to look for). Hence, it is not hard to see there is near chaos in many Schools, work places, and certainly the Governments around the world because of the unwanted Information (called "noise" or "entropy" in the field of information theory) associated with current computer terminals used to operate the computer systems.

Today, virtually every desktop terminal system is different and information learned while learning to operate every new screen presented when a selection or control icon is "clicked" is mostly never used again (this is especially true when surfing the Internet). One could easily say the current computer control system terminal design is a very high entropy terminal user system (most of the learning energy is wasted and the designs certainly result in extremely high error selection rates for operators and increases the skill level requirements for companies and individuals hired to operate the computer systems using the existing terminal designs). Considering this has only happened in a five year period (the WWW was unheard of by people out side the universities and a few technology companies until 1995), is remarkable because many that had taken the time to learn DOS or Unix control standards thought that attaching the files underneath the "C:\" or "login" prompt to a GUI icon would be a good thing and make the computer more user friendly.

Thus, GUI and NUI desktop managers were heartedly embraced as a step in the right direction. Little did people realize that in a few years computer terminal control system gridlock and near chaos would prevail through out many industries let alone the computer and communication industries.

Note that in many cases "Icon desktop managers" have worked as intended such as the simple retail control screens where the icons are standard (at least for that retail chain such as McDonalds or Wendy's).

In fact, one can run a computer screen patent search between 1985 and 2000 and find a number of computer control systems methods to interface tasks or searches with a user. However they all are of the type falling into one of the categories such as described in U.S. Pat. Nos. 5,875,110; 5,768,142 and 5,550,746 by Jacobs for data searches and U.S. Pat. No. 5,999,918 by Williams for interacting with customers regarding products and U.S. Pat. No. 5,961,592 by Hsia for managing screens and U.S. Pat. No. 5,682,506 by Corby et al. for multiple customizing a screen for the same object (this is a patent promoting entropy) and U.S. Pat. No. 5,999,908 by Abelow for a user product selection system and U.S. Pat. No. 4,972,318 for an order entry system.

Another invention by Rowe et al. and assigned to Microsoft Corporation, U.S. Pat. No. 5,812,123, actively promotes tools that let programmers design screens which mix categories on the same screen and put text and information of their choosing where ever they think it should go and put their own screen patterns on the screen. In fact the screen entropy has become so bad that Microsoft developed screen wizards to help the user use their application programs ( see U.S. Pat. No. 5,301,326) and other companies such as IBM have been working the same problem (see U.S. Pat. No. 5,859,637 by Tidwell).

Screen designs of this type are further encouraged by the "build your own website" programs on the market today such as MS Publisher and FrontPage along with the step by step website design programs offered by AOL and many other Internet Service Providers seeking customers. All of these programs and services actively promote increased entropy and in fact most desktop manager programs today actually have "trash cans" so that user efforts can be quickly converted into "wasted" effort (or increased entropy) for the user.

But one can observe quickly in everyday transactions and articles (with out having to do patent searches) that if we accept the need for a mobile low skilled labor force between countries and industries even the screens between McDonalds and Wendy's should not be different other than in color, language or other brand items not affecting the user interface training requirements.

Those computer system control advocates voting (designing) to let the individual choose the screen design look and icons systems such as the current browser and desktop manager programs are high entropy system promoters and thus vacuously are also information age chaos prompters. The automobile analogy would be, "let every automobile manufacture, lease agent, or owner configure their own car engine and accessories control system and let every road authority design their own roadway signs". One can review the history of transportation during the period when such absurd ideas were in fact the state of the art and see near chaos prevailed in that industry during that brief period.

All of the screen inventions in use today, other than the general desktop managers and browsers, are "niche" specialized user control screens primarily focusing on the file management portion of the system and usually changing every time a new model is produced. Good examples of these are Kiosk Terminals designed for fixed information databases and or fixed connections to outside services such as the Internet. Virtually none focus on the user skill levels required to use the system and on the high entropy involved if choices are left up to manufactures or users. Other analogies for control standards were experienced with the automobile (until standards for controls were adopted the industry floundered) the Internet (until a standard communication language HTML was created the network floundered). Probably the latest example (which is less than 15 years old) is the application programs industry. Until standard open architecture operating systems were established, the industry floundered for lack of good development tools. In essence, without standards being created for multiple users systems the entropy (wasted time and effort) will always tend to unnecessarily increase for users of those systems because learning multiple terminal control systems for operating the same system is very wasteful.

Unfortunately the screen standards (desktop managers and browsers) are diametrically opposed to low entropy terminals because they are part of the tools developed for the application program developer which give the unlimited design freedom mentioned above. They are very high entropy terminals such as those running with the Windows 2000 and Browser designs that allow any user to configure (in fact demand that they configure) their own computer control system.

Before computer technology became ubiquitous in every day life, computer standard problems were the responsibility of committees set up in trade organizations or among the major manufactures themselves. Good examples are in the communication industry and especially more recently within the wireless industry for protocol standards such as the Wireless Application Protocol (WAP), so that all wireless devices such as cell phones and Personal Digital Assistant (PDA) can interconnect to the Internet and each other and run applications using a standard communication Protocol. However, these standards are still focused on the "cross platform" or interchangeability of various devices or programs and have nothing to do with standards for the user (terminal standards) who has to ultimately control the system.

The user is often the last to be considered in these discussions. In fact, the advent of the wireless devices are compounding the entropy problem for users because each designer uses the designer's own voice user interface (VUI) control words or, even worse, lets the user create the user's own (analogous to letting every user design the users own desk top control system). Braille control systems are no better because they just take the existing high entropy control systems and convert them to the Braille touch keyboard symbols.

The move to control computers by voice commands (because phones are ubiquitous worldwide as are internet Service Provider (ISP) systems connected to the phones), prompted the inventor to adapt the current invention methods to solving the voice high entropy user control problem as well as the screen high entropy control system. As with many problems requiring a good standard for solution, the results pay off in many ways because standards always open the door for automation.

The Low Entropy Terminal User System (LETUS) 1320 is designed to let almost every conceivable computer system and every conceivable piece of information associated with the computer system and required by a user to be controlled or accessed from a few simple screens having a few standard symbols. The LETUS 1320 utilizes a server side Browser that detects the type of legacy browser operating program the user terminal device has and then directs the terminal browser to only display the LETUS terminal control patterns. In one preferred embodiment, the server side browser always detects the types of legacy browser operating program. This approach lets the current design to be adopted as a standard with out having to be incorporated into all the existing desktops and browsers on the market today.

In addition, the LETUS 1320 allows the same system to be controlled or accessed by a few simple voice commands or to be controlled or accessed by a few simple Braille commands in the case of the blind. The standards are designed so that once a user learns to "drive a car built with these control systems" they can drive "any car using the same type control system except for maybe color and language changes not effecting the basic control and information display patterns" in almost any industry and in any country where the user knows the language. In other words, the LETUS 1320 method is to computer control system designers what the car and roadway control standards are to car manufactures and roadway designers. In terms of the existing computer control systems for example, very few people can "drive each others computer" unless they are skilled in the art of computer control technology (as mentioned earlier the "C:\" even made it easier for those skilled in the art to drive each others car in the early days but that vanished with the GUI and the desk top managers/browser control systems). Those not skilled In the art of "computer driving" are hopelessly at the mercy of those who are skilled drivers or worse yet those persons trained by the skilled drivers. This was the way the automobile industry was for almost fifty years (ironically this is just about the same number of years computer technology has been around).

In general, the LETUS 3120 relates to a terminal user system for controlling a personal computer or a kiosk. Referring now to FIG. 28, shown therein is the LETUS 3120 connecting a LETUS user 3100 via a user interface 3110 to existing desktop managers and browsers 3130 and existing computers and operating systems and applications and databases 3150 of a computer system. The LETUS 3120 is provided with a control program or a LETUS Computer System Interface Manager 3250 (see FIG. 29) providing interaction with a LETUS user 3100 in at least one format selected from the group consisting of a graphical user interface (see FIG. 28), an audio interface (see FIG. 35), and a braille interface (see FIG. 36). The control program 3250 includes a plurality of data entry outputs 3500 (such as shown for example in FIG. 34), a plurality of information outputs 3400 (such as shown for example in FIG. 33), a plurality of selection outputs 3300 (such as shown for example in FIG. 30), and a plurality of computer terminal controls 3380 (such as shown for example in FIG. 30). Similar elements will be designated in FIGS. 28–37 with the same numeric prefix, and a different alphabetic suffix for purposes of clarity.

FIG. 29 illustrates the logic flow of a preferred embodiment where the LETUS 3120 includes the LETUS Computer System Interface Manager 3250 and a LETUS User Interface Device Screen Manager 3200, and information 3240 is conveyed between the LETUS Computer System Interface Manager 3250 and the LETUS User Interface Device Screen Manager so that instructions 3210 provided by the user are caused to be executed by the computer system.

The plurality of data entry outputs 3500 are selectively providable to the LETUS user 3100 for receiving data input from the LETUS user 3100. The data entry outputs 3500 have a single data input pattern.

The plurality of information outputs 3400 are selectively providable to the LETUS user 3100 for outputting information to the LETUS user 3100. The information outputs 3400 present information to the LETUS user 3100 in a single information output pattern.

The plurality of selection outputs 3300 are providable to the LETUS user 3100. Each of the selection outputs have a plurality of choices 3320 that permit the LETUS user 3100 to select and run various selections selected from the group consisting of a web access program, an application program, another selection output, an information output and a data entry output. The choices 3320 on each of the selection outputs 3300 are presented to the LETUS user 3100 in a single selection pattern.

The plurality of computer terminal controls 3380 are associated with the choices 3320 on the selection outputs 3300 for allowing the LETUS user 3100 to navigate among selected ones of the web access program, the application program, the data entry outputs, the information outputs and the selection outputs whereby the LETUS user 3100 can control the entire personal computer or kiosk.

In one preferred embodiment, the LETUS 3120 only uses the three types of outputs (selection outputs 3300, data entry outputs 3500, and information outputs 3400) and a few control symbols and a few standard shapes along with a pattern recognition screen layout with all the icons connected to successfully lower equivalence class icons. The preferred embodiment selection outputs 3300 are equivalent information class icon patterns layered on top of each other by starting at the top of the equivalent class system and each "click or touch" drops to the next equivalence class level screen. Each of the lower selection outputs 3300 have an identical screen pattern (not necessarily screen identical) to the next higher screen level except for the class of selection choices 3320 (such as shown for example by the selection output 3300*a* in FIG. 30, selection output 3300*b* in FIG. 31, and selection output 3300*c* in FIG. 32, or the selection output 3300*d* in FIG. 37*a* and selection outputs 3300*e*, 3300*f*, 3300*g* in FIGS. 37*c*, 37*i*, and 37*j*, respectively). Note that the top of the equivalence class can be subject or location for example such as a Ford or Buick have some cosmetic difference that do not effect the ability of a Ford driver from driving a Buick.

The preferred system pattern has eight, twelve or sixteen shapes equally distributed around the center shape with the center shape always being the same icon symbol "clicked or touched" at the next higher equivalence selection level to get to the lower level. Most all of the simple control symbols (analogous to the lights, trunk, hood, radio, etc control buttons on cars or traffic symbols on roadways) are distributed equally around the screen borders and except for the few standard "go to" control symbols, are always in the same border location for every screen. For example a 15 equivalence class system (a 15 click system) with 16 classes at each level theoretically can connect the LETUS user 3100 to virtually everything known to man and certainly every thing on everybody's computer that has any meaningful value. Yet the LETUS user 3100 would never have to look at (learn) more than two types of the outputs to get any information in the world ever again or to go to computer driving school ever again even though the information storage capacity keeps doubling every 18 months according to Moore's law.

A 32 class icon screen distributed around the center shape would attach to the same number of objects as the 16 class screen using only 13 clicks and is also described and becomes useful down at the lower equivalence class levels to reduce the number of "clicks" required by the LETUS user 3100. This is like using a 16 cylinder engine rather than an 8 cylinder engine, to the computer driver, it is just more powerful but it does not require any change in driver education. In practice to have to use more than a 3 click system is rare and for extensive website information management normally a 1 to 2 click system handles every thing (even the large Websites like Dell's, Cisco's, Microsoft on the Internet today is less than a four click LETUS 3120 design).

All information is presented on the same information output 3400 independent of what type information, such as shown for example in information output 3400*a* in FIG. 33 or in information outputs 3400*b*, 3400*c*–3400*g* in FIGS. 37*b*, 37*d–h*, respectively (the information screen is like a standard billboard and you can paste any thing you want on the board if several billboards are required then they automatically are put behind each other).

The third type output is the data entry output 3500, as shown for example in FIG. 34, and it is considered a most useful and innovative screen type, for example, belonging to the LETUS 3120 screen method. The data entry output 3500 preferably includes a simple data prompt screen with the same layout pattern as the selection screen but the center shape has been converted into an instruction prompter where one class item is entered into the form database one prompt at a time and the entry engine steps to the next item of each class before stepping to the next class. For example, a 4 item 8 class data entry screen allows forms with up to 32 item blocks to be filled out where the user never has to learn to read a 32 block form and only has to follow input instructions one simple item step at a time. Additionally if the item is required to be entered, a control symbol, such as a standard "r", will be denoted next to the item instruction. A preferred design has the "r" flashing or the "r" a different color than the instruction font to make it easy for the driver to know they must input the required information.

Once all of the prompted steps are finished the complete form is presented to the LETUS user 3100 on the standard information output 3400 for a final check before submitting to be processed. All three type LETUS 3120 output functions described above plus others discussed in the detailed description are done behind the scenes and the LETUS user 3100 never has to understand anything about how the computer works or what happens to the submitted information.

One of the more easy classes to handle is for LETUS users 3100 who went to the old driver school such as desktop managers or Internet browser school. For example the internet computers are connected from a "web" symbol on the shape positioned in lower right corner of the selection outputs no matter what level the LETUS user 3100 is at and a click or touch sends the LETUS user 3100 to a 16 class website selection system (one class could be Yahoo or AOL for example or the top level could start with travel, shopping, real estate ,etc. and then the next levels would give choices under each of the top level choices). A similar "desktop" icon is used to quickly connect the user to the main computer engine applications such as word or excel or adobe (operating on a platform such as Windows or iMac or NT) for the LETUS user 3100 needing to work directly with the application being controlled by the LETUS 3120 engines (actually they are being controlled by the MOSS 1300 element engines which are described above and in Provisional Patent Application 60/186,874, the entire content of which is hereby incorporated herein by reference).

A separate but most powerful feature of a LETUS 3120 design is that computer automation and communication compression would be greatly enhanced because "invariant class and item tagging" would be practical for use when designing communication between programs and activating canned programs residing within all access terminal browsers for example (you can think of it as a "super Java" MOSS 1300 browser language or a Barcode for invariant information tagging). For example if all the location classes and items such as a) country, b) State, c) county, d) city, e) zip, where for example coded like 3, 4, 5, 6, 7 where "3" for country means "a three click " (an 8 icon screen is used in this example) then each of 512 (8 raised to the 3rd power) countries could be uniquely represented by codes such as (4, 5) which would always mean "the fourth icon from the top on the top country screen" and the "fifth icon from the top on the second country screen". By way of another example a "7" for zip means a "a seven click" which would uniquely represent 2,097,152 (8 raised to the 7th power) zip codes in each country and the series (4, 7, 2, 0, 3) would require only five digits instead of 7 like in the case of the first example on two digits were required instead of three. If countries and locations in countries were then class ordered in their frequency of use transmission time could easily be cut in half (or bandwidths doubled depending on how you want to describe the increased efficiency). If MOSS 1300 language activated programs resided in the access browsers for the invariant tasks of "local screens", "local voice" etc. then you are talking about bandwidth gains of ten or more times. In other words combining the LETUS 3120 user terminal standards with MOSS 1300 communication standards can yield powerful terminal access devices requiring much less bandwidth than required today.

The above description is for a video control LETUS 3120 but the audio control, shown for example in FIG. 35, or Braille control system, shown for example in FIG. 36, is based on the similar principals. The audio system can for example use a telephone 3550 or other audio device and a single syllable sound icon for the top class, a double syllable sound icon for the second class level etc. along with easy distinguishable sounds for the control icons such as the "web" sound for activating the Web icon and the Braille symbol for "Web" to activate the Web icon from a Braille keyboard 3600. The advantage of using the same standard in all three user languages (video, audio, and Braille) the conversion back and forth is really simple and the conversion to different ethnic languages can be handled by simple automated standard word translators which are available today in operating systems such as Windows 2000 for most of the major countries.

The preferred method for implementing the LETUS 1320 onto existing terminal devices such as desktops and portable computers is to use a server side MOSS 1300 browser that detects the existing device control system and either temporarily replaces the existing control system or directs the control system to display the LETUS patterns.

In addition, since MOSS 1300 hides the underlying technology from the LETUS user 3100 and the LETUS 3120 terminals allow the LETUS user 3100 to operate every thing related to the underlying technology only the LETUS 3120 part of a MOSS 1300 program needs to have the user language changed to accommodate various countries. This is a much simpler approach to spreading computer technology world wide than having to change the underlying technology to another countries language such as NT or Windows 2000. Note again that this approach was used to spread transportation technology to all countries very quickly.

All fixed symbols for every class or control function are deceptively simple and is somewhat akin to the simplicity and power of the Barcode invention (the Barcode invention solved a basic standards labeling fragmentation problem 40 years ago and today barcode systems are used for efficiently identifying almost anything).

In one preferred embodiment, the video selection outputs 3300 have choices 3320, such as icons, symmetrically distributed around a center shape with the center shape being a selection pointer 3310 always pointing to the location of the mouse pointer. Each of the choices 3320 for each video selection outputs 3300 can be connected to the same equivalent class of items as the other choices 3320 arranged on the video selection outputs 3300.

Furthermore, in one preferred embodiment, "clicking" on one of the choices on the selection outputs 3300 can only send the LETUS user 3100 to one of two terminal pattern screens, where one of the two terminal pattern screens is an information output 3400 and the other is another selection output 3300 at a lower equivalence class level than the level where the choice 3320 was "clicked". When successive information outputs 3400 are selected by "clicking" on one of the next higher choices 3320 the center shape may always denote the next higher equivalence class choice 3320 "clicked" on by the LETUS user 3100 to arrive at the current information output choices 3320.

Predetermined screen navigation and predetermined computer function icons can be distributed symmetrically around the screen borders and appear on all three LETUS 3120 type screens in the same position.

The LETUS user 3100 can choose the pattern icon ethnic characteristics, such as color, but has no control over the basic icon physical pattern shapes and geometrical distribution on the screen.

Using the choices on the selection outputs 3300, the LETUS user 3100 can navigate to the computer application programs and operating systems residing on the user computer system underlying the three terminal patterns without requiring the underlying computer application programs and operating systems residing on the user computer system to be converted to the three LETUS 3120 terminal types. Furthermore, the LETUS user 3100 can navigate to the World Wide Web system underlying the three terminal patterns without requiring the underlying World Wide Web terminals to be converted to the three LETUS 3120 terminal types. The user computer system underlying the three terminal patterns can all reside on the World Wide Web.

Additionally, once a user has the MOSS 1300 constructed as described herein, the user can utilize features of a Split Personal Computer System 3810, as discussed further below, or a Multiple Computer Service System 4205, as discussed further below, so that an individual or an owner of any company can stay in complete control, from any place in the world, of their MITS 1301 GUE employed to increase their productivity.

Many people currently use several computers in the execution of their job duties. For example, an individual may have one computer located at work, another computer located in an office at home, and yet another computer which is portable to use when the individual is neither at work nor at home. The quickly changing technology in the computer area constantly requires consumers to upgrade their computer systems to meet their demands. This means that the individual must separately upgrade the software and hardware on each of the office computer, the home computer and the portable computer. To upgrade all three computers requires three separate software licenses and hardware items which are costly.

Communications software for personal computers, such as pcAnywhere obtainable from Symantec Corporation are currently available. These communication software packages permit an individual to control a first computer from a second computer over phone lines.

Large communication networks are currently in use for providing cable television and telephone services to remote locations, such as homes, offices and hotel rooms. In addition, another large network known as the "internet" is being used to permit remote computers to communicate with each other. Cable television companies have recently been interfacing the cable television networks to the telephone and internet networks to provide access to all three networks through the cable television connection provided in a large number of homes.

The companies are working to bring simpler and lower cost internet access to hundreds of millions of households by combining low cost cable television desk top controls with the phone system and a keyboard. This combination of elements and new products will allow users to access the internet and perform interactive tasks such as: a) e-mail; b) database searches; and c) interactive games and advertising.

Time share computer systems have been used for many years. With conventional time share systems, individuals could connect to a central computer from a so-called "dumb" terminal and purchase time on a shared computer system. The dumb terminal communicated with the shared computer system via either phone line or hard wire remote terminal lines. The time share systems have largely been replaced by a personal computer, or a local area network (LAN) system which connects a large number of personal computers together so that resources can be shared.

However, these new systems and networks do not address the problems facing computer users which are: 1) fast obsolescence of personal computer models and operating systems; 2) increasing demand for more memory and speed; 3) constant upgrades of software programs; and 4) need for computer portability by more and more people.

In general, the split personal computer system 3810 discussed herein is a system which allows a personal computer system to be split into a local portion and a remote portion. The split personal computer system 3810 includes a remote portion 3822 and at least one local portion 3812 which is disposed remotely from the remote portion 3822. Generally, the remote portion 3822 of the split personal computer system 3810 is adapted to perform the heavy computational and storage portions of the personal computer tasks, and the local portion 3812 of the split personal computer system 3810 is adapted to solely perform the video and the input/output portions of the personal computer tasks so that an individual manipulating the local portion 3812 of the split personal computer system 3810 is provided with the illusion of utilizing a complete personal computer system. The system operates in such a manner that a user of the split personal computer system 3810 would not realize that the computer was split into two physical portions.

The local portion 3812 of the split personal computer system 3810 is located in conjunction with the TV system located at homes or hotels. The remote portion 3822 of the split personal computer system 3810 is located in a remote location and normally maintained by a network service provider. The local portion 3812 includes a television display unit 3830, and a television accessory unit 3832 in communication with the television display unit 3830. An input unit 3834 is located adjacent the television display unit 3830 and is in communication with the television accessory unit 3832 to input data signals into the television accessory unit 3832. Finally, communication means are provided for interfacing the television accessory unit 3832 of the local portion 3812 to the remote portion 3822 for permitting data signals received by the television accessory unit 3832 from the input unit 3834 to be transmittable from the television accessory unit 3832 to the remote portion 3822 of the split personal computer system 3810. The data signals are processable by the remote portion 3822 to generate output signals. The output signals include video signals and are transmittable from the remote portion 3822 to the television accessory unit 3832. The television accessory unit 3832 receives the output signals and transmits same to the television display unit 3830 as television signals. The remote portion 3822 of the split personal computer system 3810 includes at least one remote computer unit 3824.

The split personal computer system 3810 can be implemented by utilizing a programming language called JAVA, which was developed by Sun Microsystems, Inc. The JAVA language is ideally suited to allow communication between the Graphical User Interface (GUI) requirements of the local portion 3812 of the split personal computer system 3810 and a remote portion 3822 of the split personal computer system 3810. The remote portion 3822 of the split personal computer system 3810 can operate C++ language application programs.

The terms "internet" and/or "communication link", as used herein, refer to any suitable communication link which permits electronic communications, such as extra computer communication systems, intra computer communication systems, internal buses, local area networks, wide area networks, point to point shared and dedicated communications, infra red links, microwave links, telephone links, cable TV links, satellite links, radio links, fiber optic links, cable links and/or any other suitable communication system. It should be understood that each of the communication links are shown and described separately herein for the sole purpose of clearly illustrating the information being communicated between the various components. The communication links may not be separate communication links but may be a single physical communication link.

Referring now to FIG. 38, shown therein and designated by the general reference numeral 3810 is one embodiment of the split personal computer system 3810 constructed in accordance with the present invention. The split personal computer system 3810 includes a plurality of local portions 3812 disposed remotely with respect to each other. Only two local portions 3812 of the split personal computer system 3810 are shown and designated by the general reference numerals 3812*a* and 3812*b* in FIG. 38 for purposes of clarity. The local portions 3812*a* and 3812*b* of the split personal computer system 3810 can be located in homes, hotel rooms, or any other suitable location and can be adapted to solely perform the video and the input/output portions of the personal computer tasks so that an individual manipulating one of the local portions 3812 of the split personal computer system 3810 is provided with the illusion of utilizing a complete personal computer system.

The local portions 3812*a* and 3812*b* of the split personal computer system 3810 communicate with a telephone network controller 3814 via respective communication links 3816*a* and 3816*b*, and a television network controller 3818 via respective communication links 3820*a* and 3820*b*. The telephone network controller 3814 can be any type of bidirectional communication system, such as a direct phone line using a 1-800 line or the internet. The television network controller 3818 can be any type of high-bandwidth communication system which permits at least unidirectional communications and possibly bidirectional communications. For example, the telephone network controller 3814 and the television network controller 3818 can be switches owned by the telephone and cable television companies, respectively, located in the same or different regions as the local portions 3812*a* and 3812*b* of the split personal computer system 3810.

The split personal computer system 3810 also includes at least one remote portion 3822 disposed remotely with respect to the local portions 3812*a* and 3812*b* of the split personal computer system 3810. In essence, the remote portion 3822 of the split personal computer system 3810 is adapted to perform the heavy computational and storage functions of the personal computer tasks of the split personal computer system 3810. The remote portion 3822 of the split personal computer system 10 is provided with a plurality of remote computer units 3824 networked and controlled by a remote system controller 3826. Only two of the remote computer units are shown in FIG. 38 and designated by the reference numerals 3824*a* and 3824*b* for purposes of clarity. The remote computer units 3824*a* and 3824*b* can be any suitable computers which are capable of communicating with another computer located remotely with respect to such remote computer units 3824*a* and 3824*b*. The remote computer units 3824 can be located at an individual's office, home, or any other suitable location. Application programs are typically stored on the remote computer units 3824 and the data associated with previous usage by the individual are stored on the remote computer units 3824 so that such application programs and data are accessible by the local portion 3812*a* and 3812*b* of the split personal computer system 3810, as will be discussed below.

The remote system controller 3826 communicates with the telephone network controller 3814 and the television network controller 3818 via respective communication links 3827*a* and 3827*b* and also communicates with the remote computer units 3824*a* and 3824*b* via respective communication links 3828*a* and 3828*b*. The remote system controller 3826 can be any type of computer or controller which is capable of receiving signals transmitted from at least one local portion 3812 of the split personal computer system 3810 and supplying such signals to at least one of the remote computer units 3824 to permit bidirectional communication therebetween.

For example, the remote system controller 3826 can be a network control computer which stores a list of access codes for individuals authorized to use the remote computer units 3824. The remote system controller 3826 can also include a billing program which counts the time periods in which an individual utilizes at least one of the remote computer units 3824 so that either session billings (in the case of hotel rooms billings, for example) or monthly billings could be made. The time periods can be measured in seconds, minutes or any other suitable unit of time.

The local portions 3812*a* and 3812*b* of the split personal computer system 3810 are substantially identical in construction and function. Thus, only the local portion 3812*a* of the split personal computer system 3810 will be described herein in detail for purposes of clarity.

As shown in FIG. 39, the local portion 3812*a* of the split personal computer system 3810 is provided with the television display unit 3830, the television accessory unit 3832 (shown in dashed lines), the input unit 3834, an output unit 3836 and a telephone 3838.

The television display unit 3830 can be any suitable television set or other display device, such as a computer monitor which is capable of receiving television or other video signals from the television accessory unit 3832 via a communication link 3840 and outputting signals in a format perceivable by an individual located adjacent the television set. The term "television signals" as used herein can mean signals adapted to be displayed by a television set, or any other type of suitable video and/or audio signals.

The input unit 3834 can be a mouse, a keyboard, a scanner, a video wand, a remote control or any other suitable input unit. The input unit 3834 is located adjacent the television display unit 3830 and in communication with the television accessory unit 3832 via a communication link 3842 to input data signals into the television accessory unit 3832.

The output unit 3836 receives data signals from the television accessory unit 3832 via a communication link 3844 to provide an output signal in hardcopy or other tangible or intangible formats. The output unit 3836 can be any type of output unit capable of receiving signals from the television accessory unit 3832, such as a printer, a plotter, a local hard drive or a floppy disk.

The telephone 3838 bidirectionally communicates with the television accessory unit 3832 via a communication link 3846. The telephone 3838 can be any type of telephone or other suitable bidirectional communication system.

The television accessory unit 3832 includes a television interface 3850, a local computer 3852 and a signal separator interface 3854. Each of the television interface 3850, local computer 3852 and signal separator interface 3854 can be located within a single portable housing 3855 (FIG. 41) which is adapted to be disposed adjacent the television display unit 3830, or can be provided as components included in the television display unit 3830. The advantage of the portable housing 3855 is that the individual can transport the television accessory unit 3832 from one location to another location to remotely operate the remote portion 3822 of the split personal computer system 3810 with different television display units 3830.

The local computer 3852 can be any type of suitable computer and desirably includes temporary and permanent storage devices, and an operating system loaded thereon. The operating system can include the display and input/output portions of Windows 95, Windows 3.1, Macintosh, OS/2, NT95 or any other suitable operating system.

The signal separator interface 3854 communicates with the telephone network controller 3814 and the television network controller 3818 via the communication links 3816a and 3820a. The signal separator interface 3854 serves to route signals received thereby to the proper entity to process such signals. For example, two types of television signals can be received from the television network controller 3818: those originally transmitted by the remote portion 3822 of the split personal computer system 3810 and those originally transmitted by a television station block 3857 (FIG. 38). The signals originally transmitted by the remote portion 3822 of the split personal computer system 3810 are forwarded by the signal separator interface 3854 to the local computer 3852, and the signals originally transmitted by the television station block 3857 are forwarded by the signal separator interface 3854 to the television interface 3850. The television station block 3857 can be any television station which transmits audio and/or video signals which can be displayed or otherwise output by the television display unit 3830. A header or other identifier can be included in the signals originally transmitted by the remote portion 3822 of the split personal computer system 3810 so that the signal separator interface 3854 can distinguish between the signals originating from the remote portion 3822 of the split personal computer system 3810 and the television station block 3857.

In addition, at least two types of signals can be received by the signal separator interface 3854 from the telephone network controller 3814: those originating from the remote portion 3822 of the split personal computer system 3810 and those not originating from the remote portion 3822 of the split personal computer system 3810. Those signals received by the signal separator interface 3854 from the communication link 3816a which are originated from the remote portion 3822 of the split personal computer system 3810 are transmitted to the local computer 3852, and those signals which do not originate from the remote portion 3822 of the split personal computer system 3810 are transmitted to the telephone 3838 via the communication link 3846, for a purpose to be described hereinafter. A header or other identifier can be included in the signals originally transmitted by the remote portion 3822 of the split personal computer system 3810 so that the signal separator interface can distinguish between the signals originating from the remote portion 3822 of the split personal computer system 3810 and those not originating from the remote portion 3822 of the split personal computer system 3810.

The input unit 3834 provides signals to the signal separator interface 3854 over the communication link 3842. Included in the signals provided to the signal separator interface 3854, are three different categories of signals. The input unit 3834 may include a header or other identifier in the signals it provides to the signal separator interface 3854 so that the signal separator interface 3854 can distinguish between the three different categories of signals.

The first category of signals are those which control the television display unit 3830. Upon receipt of a signal in the first category, the signal separator interface 3844 forwards such signals to the television interface 3850 via a communication link 3856. The television interface 3850 then forwards such first category signals to the television display unit 3830 so that the television display unit 3830 will receive such first category signals and respond accordingly. First category signals include those signals which change the channel or volume of the television display unit 3830, for example. Before the television accessory unit 3832 can be utilized to access the remote portion 3822 of the split personal computer system 10, an individual located adjacent the television display unit 3820 operates the input unit 3834 to tune the television display unit 3820 to a suitable channel to receive television signals from the television accessory unit 3832 via a communication link 3840 so that the television display unit 3830 selectively displays television signals output by the television accessory unit 3832 in a format perceivable by at least one individual located adjacent the television display unit 3830.

The second category of signals transmitted from the input unit 3834 to the signal separator interface 3854 are those signals intended to control or operate the local computer 3852. Upon receipt of a second category signal, the signal separator interface 3854 outputs such second category signal to the local computer 3852 via a communication link 3858. The second category signals can be the normal computer control signals plus a special remote logon command that can either be a set of keyboard strokes or a special function key provided on the input unit 3834 for this purpose. Upon receipt of the remote logon command, the operating system software of the local computer 3852 outputs signals to the television interface 3850 which formats such signals as television signals. The television interface 3850 then transmits the television signals to the television display unit 3830 to cause the screen (or at least some portion thereof) of the television display unit 3830 to appear as a normal personal computer screen selected by the individual (e.g. Windows 95, Windows 3.1, Macintosh, OS/2, NT95 or any other common PC screen used by the individual).

In addition, the receipt of the remote logon command causes the operating system software of the local computer 3852 to output the remote logon command to the telephone network controller 3814 via the communication links 3858 and 3816a. The telephone network controller 3814 transmits the remote logon command to the remote system controller 3826 via the communication link 3827a. The remote system controller 3826 receives the remote logon command, and in response thereto, the remote system controller 3826 checks the remote logon command for validity and allows connection to at least one of the remote computer units 3824 if the remote logon command is valid and prohibits connection of the remote portion 3822 to the local portion 3812 of the split personal computer system 3810 if the particular remote logon command is not valid. The validity of the remote logon command can be determined in a manner recited in U.S. Pat. No. 4,528,643, issued to Charles C. Freeny on Jul. 9, 1985, which disclosure is hereby incorporated herein by reference.

Once the local portion 3812 of the split personal computer system 3810 and the remote portion 3822 of the split personal computer system 3810 are connected to permit communication therebetween, the remote portion 3822 of the split personal computer system 3810 provides video signals to the local portion 3812 of the split personal computer system 3810 via the sequential communication links 3827b and 3820a, and data signals to the local portion 3812 of the split personal computer system 3810 via the sequential communication links 3827a and 3816a. The video and data signals transmitted from the remote portion 3822 of the split personal computer system 3810 are received by the signal separator interface 3854 and then forwarded to the local computer 3852 via the communication link 3858. The local computer 3852 receives the video and data signals, and then the operating system of the local computer 3852 transmits the video and data signals to the television interface 3850 via a communication link 3860. The television interface 3850 then formats the video and data signals into audio television signals, video television signals or audio and video television signals. The television signals are then transmitted to the television display unit 3830 so that the television signals are perceivable by the Individual located adjacent the television display unit 3830.

The third category of signals provided from the input unit 3834 to the signal separator interface 3854 can be those associated with mouse signals (point and click signals) or keyboard typing signals or any other suitable data input signals. The third category of signals are transmitted from the signal separator interface 3854 to at least one of the remote computer units 3824 via the sequential communication links 3816a, 3827a and 3828a. The remote computer unit 3824a receives such transmitted signals and processes same with at least one of the application computer programs to generate output signals including video and data signals. The video signals are transmitted from the remote computer unit 3824a to the signal separator interface 3854 of the television accessory unit 3832 via the sequential communication links 3828a, 3827b and 3820a. The data signals are transmitted from the remote computer unit 3824a to the signal separator interface 3854 of the television accessory unit 3832 via the sequential communication links 3828a, 3827a and 3816a.

The signal separator Interface 3854 receives the video and data signals and in response thereto, the signal separator interface 3854 transmits such video and data signals to the local computer 3852 via the communication link 3858. The local computer 3852 receives the video and data signals and transmits at least some of such video and data signals to the television display unit 3830 via the television interface 3850 to update the screen. Some of the data signals received by the local computer 3852 can be directed to the output unit 3836 to provide tangible and/or intangible output of the data signals.

The above stated process is then repeated a plurality of times so that the local and remote portions 3812 and 3822 of the split personal computer system 3810 cooperate to provide the illusion of a single complete personal computer system to the individual located at the local portion 3812 of the split personal computer system 3810. That is, the remote portion 3822 of the split personal computer system 3810 provides the individual utilizing the local portion 3812 of the split personal computer system 3810 with access to the application software packages stored on the remote portion 3822 of the split personal computer system 3810, and data stored on the remote portion 3822 of the split personal computer system 3810 on behalf of the individual in conjunction with previous usage. The local portion 3812 of the split personal computer system 3810 provides the individual with visual feedback via the television display unit 3830, and input and output capabilities via the input unit 3834 and the output unit 3836.

Shown in FIG. 40 is a schematic diagram of the remote portion 3822 of the split personal computer system 3810. The remote computer units 3824 are substantially identical in construction and function. Thus, only the remote computer unit 3824a will be described herein for purposes of clarity. However, like components on the remote computer units 3824a and 3824b will be designated with the same numeral, but different alphabetic suffixes "a" and "b", respectively.

The remote computer unit 3824a is provided with a permanent memory 3870a, a central processing unit 3872a and a random access memory (RAM) 3874a. The central processing unit 3872a can communicate with the permanent memory 3870a and the random access memory 3874a via communication links 3876a and 3878a in a manner well known in the art. The remote computer units 3824 can be provided with operating system software stored either on the permanent memory 3870 or the random access memory 3874 to permit more than one individual to simultaneously utilize or share each of the permanent memory 3870, central processing unit 3872, and/or random access memory 3874 on the remote computer units 3824 to conserve resources. The remote computer units 3824 can be loaded with any or all of the application software currently available, such as WordPerfect®, Lotus 1,2,3®, Excel®, MS Word® and Access® brand software, for example.

Although more than one local portion 3812 of the split personal computer system 3810 can communicate with the remote portion 3822 of the split personal computer system 3810 simultaneously, the probability that all of the local portions 3812 of the split personal computer system 3810 will utilize the remote portion 3822 of the split personal computer system 3810 simultaneously is slim. To further conserve resources, the remote portion 3822 of the split personal computer system 3810 desirably has less remote computer units 3824 than the number of local portions 3812 of the split personal computer system 3810 which have access thereto.

In one embodiment, a method for utilizing the split personal computer system 3810 includes the step of inputting respective data signals into at least two of the television accessory units 3832 of the local portions 3812 of the split personal computer system 3810. The television accessory units 3832, then output the respective data signals to the remote portion 3822 of the split personal computer system 3810 via respective communication links 3816a and 3816b, the telephone network controller 3814 and the communication link 3827a. The remote portion 3822 of the split personal computer system 3810 receives the respective data signals. The respective data signals are then forwarded to at least one of the remote computer units 3824 which then processes the respective data signals with at least one application program to generate output signals.

The output signals are then output by the remote portion 3822 of the split personal computer system 3810 to the television accessory units 3832 via the communication link 3827b, the television network controller 3818, and the communication links 3820a and 3820b such that output signals are received by the television accessory unit 3832 which correspond to the data signals input to that respective television accessory unit 3832. Each television accessory unit 32 outputs the respective output signals received from the remote portion 3822 of the split personal computer system 3810 to the television display unit 3830 as television signals. And, each television display unit 3830 receives the television signals output by the respective television accessory units 3832 and then outputs the television signals in a format perceivable by at least one individual located near the television display unit 3830.

Although only one cycle of the method is described herein, it should be understood that such method can be repeated any number of times so that respective individuals are simultaneously provided with the illusion of operating a complete personal computer system.

Shown in FIG. 41 is the television accessory unit 3832 disposed on top of the television display unit 3830. As shown, the television accessory unit 3832 having the portable housing 3855 can be in the form of a cable television interface box interconnecting the television display unit 3830 to a cable television connection 3880. The cable television connection 3880 is desirably interfaced with both the telephone network controller 3814 and the television network controller 3818 so that telephone, internet and television access, for example, is provided from the cable television connection 3880 currently provided in suitable locations such as homes, hotels and businesses.

Although the split personal computer system has been shown and described herein as operating with the television display unit 3830, it should be understood that the present invention should not be limited to including, the television display unit 3830. For example, a monitor or other type of output unit can be utilized in place of the television display unit 3830.

In summary, in one embodiment, the local portion 3812 of the split personal computer system 3812 includes the television display unit 3830, the television accessory unit 3832 in communication with the television display unit 3830, and the input unit 3834 located in close proximity to the television display unit 3830 and in communication with the television accessory unit 3832 to input data signals into the television accessory unit 3832. The television display unit 3830 selectively displays television signals output by the television accessory unit 3832 in a format perceivable by an individual located near the television display unit 3830. The split personal computer system 3812 is also provided with a communication means for interfacing the television accessory unit 3832 of the local portion 3812 of the split personal computer system 3812 with the remote computer unit 3824 of the remote portion 3822 of the split personal computer system 3810 for permitting data signals received by the television accessory unit 3822 from the input unit 3834 to be transmittable from the television accessory unit 3822 to the remote computer unit 3824. The received data signals are processable by the remote computer unit 3824 to generate output signals. The output signals are transmittable from the remote computer unit 3824 to the television accessory unit 3832, and then transmittable from the television accessory unit 3832 to the television display unit 3830 as television signals whereby the input unit 3834 is capable of functioning as an input unit for the remote computer unit 3824 and the. television display unit 3830 is capable of functioning as a monitor for the remote computer unit 3824 to provide the illusion of a complete computer system from the point of view of the individual located adjacent the television display unit 3830.

In another embodiment, the remote portion 3822 of the split personal computer system 3810 communicates with the television accessory unit 3832 of the local portion 3812 of the split personal computer system 3810 over an internet network. The internet network can be interfaced with a cable television network so that internet access is provided from the cable television connection currently provided in homes, hotels and businesses. The television accessory unit 3832 can be included in a cable television interface box interconnecting the television display unit to the cable television connection 3880.

In yet a further embodiment, the television accessory unit 3832 can be provided in the portable housing 3855. The advantage of the portable housing 3855 is that the individual can transport the television accessory unit 3832 from one location to another location to remotely operate the remote portion 3822 of the split personal computer system 3810 with different television display units 3830.

In yet another embodiment, the remote computer unit 3824 of the remote portion 3822 of the split personal computer system 3810 can be provided as a plurality of networked computers which are controlled by the remote system controller 3826. In this embodiment, the plurality of local portions 3812 of the split personal computer system 3810 are contemplated with each of the local portions 3812 of the split personal computer system 3810 being disposed remotely from the remote portion 3822 of the split personal computer system 3810, and remotely from the other local portions 3812 of the split personal computer system 3810. For example each of the local portions 3812 of the split personal computer system 3810 could be provided in an individual's home or hotel room or any other location commonly including or adapted to receive the television display unit 3830. The remote system controller 3826 can be provided with a billing program which counts the number of minutes that respective local portions 3812 of the split personal computer system 3810 are operating at least one of the networked computers of the remote portion 3822 of the split personal computer system 3810. By employing the remote system controller 3826 and the billing program, individuals can "rent" computer time from the remote portion 3822 of the split personal computer system 3810 and obtain the benefits of a centralized management team upgrading the application software and the hardware on the remote portion 3822 of the split personal computer system 3810.

Further, as discussed above, the MOSS 1300 can also be stored and/or run on the multiple computer system 4230 of a multi customer computer service system 4205, discussed further below, such that remote users can operate the MOSS 1300.

Currently, and in the past, an individuals personal computer (PC) could only be accessed via a network using specialized software such as PC Anywhere, windows dial up networking, or a client server system which has a limited number of station locations. This requires very specialized software at both locations along with periodic maintenance at both locations. The worst part of this situation is that each individual is responsible for upgrading, both his hardware and software. The PC obsolescence rate is approximately every eighteen months and is not expected to change in the next twenty years. Both of these problems make using a personal computer very time consuming (low productivity) and location restrictive (inconvenient) at best.

The two current basic solutions to these PC problems revolve around (a) the portable computer and (b) the attempt to expand and simplify client/server systems.

The portable computer industry has grown rapidly to try and eliminate the location restrictions, but portable PC machines suffer from the same obsolescence problems along with another major inconvenience. That of having to carry a computer when traveling and batteries etc.

The solution by the so called "thin client" PC networks is to connect inexpensive PC's (referred to as thin clients) to a company network so employees do not have to maintain as many files at their locations. Such approaches are practical for the work place where many files are shared, but not for the individuals Personal Computer where no files are shared.

The multi customer computer service system (MCCSS) 4205 solves the existing obsolescence and inconvenience problems in a different manner. In general, the MCCSS 4205 relates generally to a system designed to provide an unlimited number of individuals to be connected to a PC computer service provider simultaneously using a variety of existing predetermined customer interface units such as existing PC's running on DOS, OS2, Win95/98, MacOS, NT OS, and the new "Multi-Mode Multifunction Information Management Systems" as they incorporate the PC into single housings being shared by many multiple machines. The individual can be connected from any location (office, home, a friends house, a hotel and from any foreign country), and have their PC GUI (Graphical User Interface) down loaded and appear just as it was, the last time the individual signed off on that particular type of machine. In addition all of the individuals' database and files are decoded and made available just as if they were stored on a PC located at the individuals current log in location. In essence, the MCCSS 4205 combines server methods in use today with advances in microprocessor technology to design a server system that can provide the individual their own PC upon demand from virtually any location without the maintenance and update headaches of today's PC's.

Generally, the MCCSS 4205 described herein contemplates a system whereby a service provider can service a large number of customers (millions) and connect them to their rented PC from millions of locations around the world. Many customers (10 to 100 thousand) can be connected simultaneously. The service provider is responsible for maintaining the latest PC Hardware and Software configurations available on the market instead of the customer. The rented PC operates in essentially the same manner as if one purchased and maintained their PC at home or office. Access to the individuals rented PC can be obtained from any existing PC, office network computer, a Web TV computer or other customer interface computer which has been authorized by the service provider. The MCCSS 4205 discussed herein will greatly improve existing Client/Server systems being used to service large global offices. However, the greatest improvement is to make the PC much more convenient and easier for the individual to use in the future and shift the PC hardware and software update burden to the service provider.

In general, the MCCSS 4205 is a multi-customer computer system which can be implemented by a service provider such as AOL, MSN, or even a communications company such as World Comm, Inc. The MCCSS 4205 would shift the awful burden of keeping ones PC current in both software and hardware (2 year upgrades) to a service provider, and at the same time, free the customer from location restrictions. Also, the service provider can inform the computer user of software updates and new applications, which can be provided as part of the service for a small fee. Even more important the individual does not have to take the new software updates unless they wish (not the case with existing network systems that supply software upgrades). The service provider can maintain many versions of the same software because of the huge economy of scale involved. To see the economic impact of the MCCSS 4205 the following examples are provided.

Current average customer cost to keep hardware updated is $750.00 per year (not including printers and storage devices), but including customers' time to update. Current average customer cost to keep software updated is $250.00 per year counting new applications and customers' time. Thus, the average computer user will spend $1,000.00 per year to keep updated (Worldwide, this represents $800 billion dollars per year in just hardware, software, maintenance and upgrade sales for the personal computer industry in today's market.).

In the system described, a service provider such as AOL, could charge $20.00 a month (they currently charge $20 a month for e-mail and Internet services) for PC service, and pay for the system described in three years plus pay for operational costs and make a profit. This would amount to an annual saving of 75% to the individual. In addition, the number of computer users would quickly rise and offset, to a large degree, the drop in industry hardware and software manufacturing requirements. The requirements are much lower because the current invention allows the service provider to only pay royalty fees when the software is in use (Shannon's Law). The hardware sales requirements would also be reduced because of the same Shannon's law. The service provider for example, can share PC engines (CPU's), software (both operating system and application), fast memory (RAM), permanent memory (Hard Drives) with a number of customers and move permanent storage to Tape/CD units until a customer logs back onto the system and needs their personal database on line. These types of tremendous Shannon Law savings in resource cost, including the sharing of technicians and PC real estate will yield a much more orderly expansion of the PC industry in the future.

Thus, the MCCSS 4205 described in herein provides the means to bring both the convenience and affordability to all persons wanting the advantage of personal computers and would shift the present customer burden of PC upgrades to the service industry. At present, the computer companies such as Compaq, Intel, Microsoft, Sun Micro Systems and Cisco are addressing the obsolescence, convenience and cost problems mentioned above, by lowering the hardware cost through continued developments and using the emerging Web/TV system to eliminate the need for displays at home. However, these are variations on the same old industry approach to progress in which the customer still is left with the annual obsolescence and daily location convenience problems of his personal computer. Until eliminated or substantially reduced, the problems mentioned will keep many people from ever trying to become computer literate than otherwise might be the case.

The MCCSS 4205 described herein really opens up the possibility for major changes in education, and would allow every child with a TV (Web/TV) to have a computer. This could be at school, at home, or any place else (friend's house, hotel, foreign country, etc.) the child happened to need access. Once the "Rent a PC" system described in this invention is implemented it will allow the Internet service providers to expand and provide personal computers to their customers along with the many other services they are providing today. The companies that are successful in implementing the system described will probably end up giving each customer their home customer interface unit as a part of the monthly service charge, just as cable companies do now to connect their customers to selected cable TV channels. A candidate for such a home/office machine is the Multi-mode Multifunction Information Management System (MIMS) described in a co-pending patent application submitted by the author. The multiple customer and multiple location PC service provider system described in herein is only practical because of the recent technical advances listed below, or the small number of operating systems and application programs required and most of all because the service provider industry wants customers.

1) CPU speeds rapidly approaching 1 GHZ
2) Solid State memory size and cost reductions near $ 0.1/MB
3) Hard Drive capacity, speed and size reduction near $ 0.01/MB
4) The Internet & communication/software infrastructure
5) Modem speed, number of lines, and line bandwidth increases
6) Less than ten PC OS used in roughly 95% of PC's
7) Less than 50 PC application programs service 90% of the users
8) The new Service Provider industry needs customers and new services That is, it would not have been practical to consider a true PC worldwide server system in the past because the technological infrastructure was not available, the delivery of information was very expensive, and the computer Service Provider Industry never developed beyond small niche database or accounting services.

The term "multi customer" as used herein means that a large but unspecified number of customers are serviced by the PC server system described herein. An example of the preferred embodiment would be an Internet service provider operating much like a phone or cable company, in which a large number of customers can be connected from a large number of different locations to a large number of PC's, at a specific location.

Referring now to FIG. 42, shown therein is the multi customer computer service system (MCCSS) 4205 which is constructed in accordance with the present invention. In general, the MCCSS 4205 has at least one (1) computer service control unit CSCU 4220, connected to at least two (2) customer interface units (CIU 4210) via at least one (1) modem connection 4231, and possibly two modem connections 4231, 4232 depending on the speed (bandwidth) of the individual modems. In general, the CSCU 4220 is constructed to interrogate each new CIU 4210 connection via a browser for example and receive a request for service from the customer interface unit (CIU) 4210 via line 4231 in which the interrogation response contains information about the customers Interface Unit CIU 4210. The CSCU 4220 could be a standalone PC Service provider with connections to the Internet, company intranets, the regular phone system and maintain it's own multiple computer systems (MCS) 4230 unit or have connections to other service provider systems that have been approved by the owner of the MCS 4230 such as AOL that has multiple tier connections around the world to be the customer service control unit CSCU 4220. The preferred embodiment is for many Internet service providers and large companies to maintain their own CSCU 4220 along with their own MCS 4230 in order to simplify having to hand off the actual PC service once the customer has logged onto the service.

Once the customer CIU 4210 is connected to the CSCU 4220, the customer information is either a new customer service information, or is simply an old customer already assigned a personal identification number (PIN) asking to be connected to their personal computer located within the service centers multiple computer systems (MCS) 4230, via line 4235, or to one of the customers computers located at another location via line 4239 (see FIG. 43). In response to the CIU 4210 requesting the multiple computer systems 4230 computer service, the CSCU 4220 either establishes a new customer account, or connects the CIU 4210 to the MCS 4230 via line 4236 when an encrypted valid PIN is received. The MCS 4230 first downloads a program to the CIU 4210 to determine the CIU 4210 configuration and possibly, a more sophisticated browser, for example, than that used in the original automatic interrogation when the CIU 4210 was first connected to the CSCU 4220. The down loaded program evaluates the CIU 4210 in a manner similar to that used by software installation programs such as that used by PC anywhere to determine the computer system configuration or most any new software program that needs to know all of the basic information about the CIU 4210 regarding modem type and speed, printer type, browser type and version. The preferred embodiment of this downloaded program is that used by all operating systems set up programs used to determine the target computer configuration modified to determine additional factors such as modem speed, and display capability in order to determine if the existing CIU 4210 connection is one of the predetermined configurations acceptable by the MSC 4230 unit. This is required since the customer is free to use any predetermined CIU 4210 configuration located any place in the world at anytime. The only requirements for a CIU 4210 unit is to be recognized by the MCS 4230 is that it have a predetermined number of communication, customer interface elements to be discussed in more detail in connection with FIG. 2. Once the MCS 4230 establishes the configuration of the CIU 4210, the MCS 4230 down loads the customer's personal computer information file (PCIF) to the CIU 4210, which causes the CIU 4210 display to appear as the last time the customer used their computer before being stored in the MCS 4230 at shut down. The CIU 4210 display is modified only by changes caused by the difference in the last CIU 4210 unit used by the customer, and the one currently being used to access their PC.

This feature, of being able to call up one's own personal computer (just like a person left it the last time used) from anywhere in the world, using any PC or Web/TV is what makes the system so significant. In fact, once the Personal Computer Industry is converted to a service industry, individuals will be able to use their computers almost any time or any place. Public CIU 4210 terminals in airports, malls, and hotels will be as common as public phone booths are today, and at about the same cost (i.e. CIU 4210's will be the phones of tomorrow).

If the customer requested the CSCU 4220 to connect them to their (or anybody else in which they had the phone number or authorization code if required) computer at home, office. etc., the connection would be made via line 4239 and in these cases the initial information displayed at the CIU 4210 would be that provided by the "special" computer requested by the customer. This would, in essence, bypass the use of the customer's PC stored in the MCS 4230 unit. For many years this will certainly happen often, since many customers will still want their own "personal" system at home and/or office in addition to a service provider PC. That is, it is anticipated that the PC service computer described herein will initially be used in addition to the customers home or office PC and will be used to extend the obsolescence period of existing PC systems. As customers convert over to the advanced computers and software available with service center PC's, to maintain anything other than displays, keyboards, mouse, printer and fax at home will more than likely decrease. To connect the customer to special PC's at locations other than that of the MCS 4230, the CSCU 4220 would either, provide the software to connect the CIU 4210 with the required special computer via line 4239, or just allow the modem connection 4239 connected to 4232 to be made and allow the CIU 10 to perform the required communication without, intervention from the CSCU 4220 (e.g. operate just like PC anywhere software was loaded on both the CIU 4210 machine and the special PC machine).

The CIU 4210 is further described in connection with FIG. 43 where unit 4210 and unit 4210 n are shown to depict that the MCCSSC 4205 can work with multiple type CIU 4210 units, for the sake of clarity only the more complicated CIU 4210 will be described. Whenever the customer has a display unit 5115 such as a Packard Bell model 1412 SL connected via line 5114 to a Computer Service Center Interface, and local control unit 5105, (which could be a PC unit such as a Packard Bell platinum pro 650), which has an internal modem connected to line 4231 and keyboard 5110 connected via line 5108 and mouse unit 5130 connected via line 5128, connected to a printer unit 5120 such as and HP model 820c via line 5118 then such a configuration is for example qualified and an appropriate CIU 4210 predetermined CIU file is placed in the configuration files of the MCS 4230 memory unit and the MCS 4230 matches this file with the information provided to the MCS 4230 when the customer logs into the service provider to use their PC from that same location or same type configuration at a different location. The CIU 4210 just described could be located at the customers home, office, friend's house, hotel, mall, or airport in any city or country. The customer for example could log onto an internet service provider and could click the mouse arrow on the computer service icon (not shown in FIG. 43) for example and the computer service icon screen would appear and give the customer several options to select from. As a minimum the options available to the customer are a) new customer, b) service computer and c) other computers. If the new customer (option a) is selected the next menu collects the necessary information to identify the new customer (name, address, phone, etc.) plus payment information. Upon completing the new customer form the data is submitted to the CSCU 4220 via line 4231 and upon acceptance by the CSCU 4220 a personal Identification Number (PIN) is given to the new customer to use in the future. In addition, new customers are asked what personal computer application software they would like to have available (e.g., Word Perfect, D base IV, Lotus, Excel, etc.) and if they would like to up load any of their specialized programs and data bases into their new MSC 4230 PC systems memory. This would allow them to have access to their existing PC data and programs plus software they do not have loaded on their own computer. If the service computer (b) option is selected the menu which appears, asks for the customer pin. Upon providing the PIN a connection by the CSCU 4220 unit is made to the MSC 4230 via line 4235. A disconnection is made, if a valid pin number can not be established between the CIU 4210 and CSCU 4220, after a certain number of attempts.

In connection with FIG. 44, the CSCU 4220 is further described to have a modem interface unit (MIU) 5230 which controls all of the modems of the CSCU 4220 (this might be 10 to 200 thousand) which, connects to line 4231 connected to the CIU 4210. The MIU 5230 is connected to the service center control unit (SCCU) 5205 via line 5210, which has all of the controls and software required to maintain the customer data base with PIN numbers and is responsible for monitoring the payments of each customer to keep their PIN valid or make invalid if payments are not received. This would also be the unit that maintained administrative and the account close out software and would be the way customers were notified that payments were not received, or when new software was available, and other such information and promotional messages could be provided by the service provider. Such messages would be given each time the customer was connected with a valid PIN or the customer could choose to not have any promotional materials provided such as done automatically by most ISP's today. The SCCU 5205, also activates the customers service center PC by giving the MSC 4230 via line 4235 the customers pin. At this point, the MSC 30 takes over and the MIU 230 connection is transferred to a customer computer connection (CCC) 5220 if required by the SCCU 5205 via line 5218. This transfer between the MIU 5230 to the CCC 5220 is done in the software in order to hand off administration tasks to the MSC 5230 controller unit 370 and unload the SCCU 5205 unit. The time of connection is noted by a MSCCU 5305 shown in FIG. 45 which is an element of the MSC 4230 unit and which is comprised of a shared CPU control unit (SCPUCU) 5320 which controls the sharing of the available SCPUS 5330 connected via 5328.

The SCPU 5330 are in turn connected to the mass storage sharing control computer (MSSCC) 5315 via line 5316 and to the random storage sharing control computer"(RSSCC) 5310 via line 318. The MSCCU 5305 is also connected to the shared high speed modem connection unit 5370 via line 5368, which in turn is connected back to the CIU 4210 via line 4236 to unit 5220 and line 4232. Note that in the cases where line 4231 has all of the required band width, there is no requirement for lines 4232 and 4236 or units 5370 and 5220. However, they are included in the preferred embodiment because at the present time PC modems are running between 28 KBS and 10 MBS. As a practical matter, the modem speed needs to be greater than 128 KBS for good performance. By the time service centers are in operation the average modem speed probably will be greater than the 128 KBS. Also, when cable modems are used in downloading (Web/TV systems) line 4232 can represent the high-speed cable modem and the line 4231 can represent the slower speed up link or phone modem connection. Consequently, for clarity purposes, the up link will refer to line 4231 and the down-link to lines 4236 and 4232 to denote that plenty of band width is available to communicate between the customers CIU 4210 and service centers MSCCU 5305. Communication switches such as the Cisco series IGX 8400 or more advanced BPX 8600 series switches will handle the required speeds for both the IP connected service providers and the company intranets plus the legacy phone connections.

The MSSCC 5315 is connected to an on line shared hard drive unit (SHDU) 5350 such as a raid 1 system from Adaptec to insure reliable backed up on line operation via line 5348 and an off line shared Tape/CD ROM unit (STU) 5340 via line 5338 such as an Alpha Systems model 2000 or Brothers International unit with back up for each customer set of files. The backed up offline customer data system is maintained as if the system was storing a hard drive for each customer and the data is secured using a Public Key Infrastructure (PKI) type system such as those available from IBM, Cybertrust or GTE. It is assumed through out this description that the data integrity is maintained from input to the CSCU 4220 unit to the output back to the CIU 4210 unit via PKI system that is incorporated into and made a part of the customers PIN, or other suitable encryption system. When a customer first logs on to the CSCU 4220 the MCS 4230 transfers the customers data base from the STU 340 to the SHDU 350 via lines 338 and 348, controlled by the MSSCC 5315. Also the MSCCU 5305 via the SCPUCU 5320 selects one of the SCPUs 5330 to serve this request (note that depending on the speed of the SCPU'S 5330 up to 10 customers might be serviced (time shared) by the same SCPU 5330). Also, the SCPU 5330 selected for the customer asks an RSSCC 5310 memory computer for the customer requested computing tasks in the high speed random access memory unit (RAMU) 5360, via line 5358. After selection of the SCPU 5330 and transferring the customers data base and programs menu from the off line shared tape/CD ROM unit 5340 to the on line shared hard drive unit 5350 and after allocating enough Ram in the high speed random access memory unit 5360 the required elements of the customers PC is in essence, assembled.

This assembled group of elements will then operate the customers dedicated PC, and be connected directly to the customer's CIU 4210 via lines 4231 and 4232 until all of the customers screen requests are completed. This completion indication can be caused by a) inactivity for a pre-selected number of minutes, b) the CIU 4210 unit is turned off or c) the customer indicates completion by shutting down the computer, for example, with a click of the "finished" icon. Once the customers CIU 4210 is disconnected the SCPU 5330 selected, causes the last know configuration information regarding all of the PC files to be stored in the off line storage system 5340 in a manner for example similar to that commonly done by two major PC operating systems (Microsoft windows and the Apple computer operating systems) modified to treat the customer data in and encrypted manner. Thus, the customer's last known PC configuration is ready to be reloaded the next time the CSCU 4220 is contacted.

Referring to FIG. 46, the functional steps that are required by the invention's software is depicted. Except for the MSCCU 5305 each of the software functions described in FIG. 46, can be accomplished by using visual basic 5 development software by persons skilled in the art or any of the other server software consistent with the controllers being used in 5310, 5320, and 5315. These functions would preferably be done in such a manner that a menu 5600 presented to the customer when first making a connection would look something like that shown in FIG. 47. For example, the menu 5600 may be provided with a heading 5605, and choices for the customer to select, such as an existing customer choice 5610, a new customer choice 5620, a connect to other location choice 5630, a cancel choice 5640 or an exit choice 5650. Once the customer makes a selection then the software provided to perform the remaining functions controls the CIU 4210 screen.

The most sophisticated piece of software is that associated with managing the MCS 4230 units, and MSCCU unit 5305. The software associated with this part of the system is available from Client/server developers, such as Sun Micro systems, Microsoft, Cisco and IBM. These software systems manage large number of enterprise computer networks to connect computers (up to 20,000) located through out the world for large corporations to inter company resources referred to as INTRANETS. With small modifications, known to those skilled in the art, this multi services management software can be used for managing up to several million PC customer hard drives PC configurations and several thousand sets of PC hardware subsystem elements along with PC customer private databases from one location. In fact, the problem becomes easier at one location because communication delays associated with large INTRANETS which span the globe connecting PC's have the individual communication delays which must be considered. These delays are virtually eliminated with the service provider approach because the PC's (i.e. the SCPUS 5330) are all at one location. Only the "finished" information needs to be sent to the Customer after the computational or data lookup process is completed by the PC (SCPU 5330) at the service center (i.e. MCS 4230). The system message server and modem server software can easily handle this part of the overall service task. The process is similar in concept to the old (and current) mainframe computers that could be accessed from Dumb Terminals and their processor and memory shared with several individuals simultaneously. However those systems never even attempted to maintain specialized, terminal, database, and application configurations for separate customers in order to be able to reproduce an individuals computer in the configuration it was last used. Client/Server systems such as Microsoft's NT5 latest version try to provide all of the services that they envision (i.e. remote access servers, databases servers, E-mail servers, modem servers, printer servers, application servers, Internet servers, etc) the individual might need except for the individuals PC itself. The current invention does not preclude the individual from using these other type client/server systems. In fact, it makes it much easier to access shared database and E-mail services located at the same location as the PC rather than a company trying to build their own global network for such services. That is, homes and companies would only need a single Multi-Mode Multifunction Information Management System(MIMS) machine (i.e. CIU 4210 units that have phone, E-mail, paging, fax, copy, printing, typing, scanning; display, keyboard, mouse, disk storage, USB ports for other digital machines such as cameras, in a single housing unit), having essentially the same footprint as workstation computers have today. Such a MIMS CIU 4210 is described in a co-pending application submitted by the author of this invention.

Also, worry about data security, would be much less of a problem in the current invention for the following reasons. (a) The number of individuals with physical access to the individuals databases would be greatly reduced. (b) The encryption power would be significantly greater than today because the speed of the PC CPU would be 2 to 3 times faster and password codes could be much longer such as data, finger and voice prints all being required to generate an access password.

In summary the PC hardware/software server system described to build a service provider PC rental system or to replace an existing client/server and/or mainframe server networks is much more efficient. By way of example, a one gigabyte 64 bit bus system could allow one PC CPU to service 1000 PC customers on line simultaneously if PC/Server resource management software were adapted to manage the PC subsystem elements from the existing client/server software as suggested above. Thus 1000 PC CPU's, RAM's, and HARD DISKS configured in the hardware server manner described in this invention could service 100,000 to 1,000,000 customers simultaneously. Also, the real estate for each of the 1000 PC hardware subsystem elements ( CPU's, RAM, etc) would be about $\frac{1}{1000}$ of a normal PC unit housing all the required subsystem elements. For example the PC CPU server would probably contain 100 1 Ghz advanced Pentium class CPU's per 8" by 19" by 24" housing. Similar economies of scale would readily be achieved with RAM/Servers and Hard Drive/Server designs.

Considering the achievable worldwide savings in storage requirements alone is astounding. Consider that current PC storage usage is typically 1000 parts for operating system/application programs for every 1 part of useful customer data storage (a conservative estimate), and that a Shannon Law gain of one thousand is achieved with the Hard Disk PC/Server system described in this invention. Then only one millionth of the number of Hard Drives in existence would be needed to service the current number of PC customers. Such changes in the PC industry future are of great benefit to the individual when both PC cost and personal time are considered.

Changes may be made in the construction and the operation of the various components, elements and assemblies described herein and changes may be made in the steps or the sequence of steps of the methods described herein without departing from the spirit and scope of the present invention. Other objects, features and advantages of the present invention are apparent from the detailed description when read in conjunction with the following claims and attached drawings.

What is claimed is:

1. A split personal computer system for selectively processing video portions, input/output portions, computational portions and storage portions of personal computer tasks, comprising:
   a remote portion adapted to selectively perform the computational portions and the storage portions of the personal computer tasks, the remote portion having a master operating software system stored thereon,
   wherein the master operating software system comrprises:
      a master input/output system running on the remote portion, the
         master input/output system automatically detecting each of
         at least one system application program so that the at least one system application programs configure themselves into a predetermined configuration;
      a master element manager running on the remote portion, the
         master element manager capable of controlling the at least
      one system application programs when the at least one system application programs are in a pre-determined configuration and the master element manager, upon activation, providing predetermined user information to one
         of the at least one system application programs to control
         the system application program; and
      a master user interface manager system having a user requirement
         database and communicating with the master element
         manager such that, upon activation, the master user interface manager instructs the master element manager to
         provide pre-determined user information to at least one
         system application programs whereby in response, the at
         least one system application programs outputs identified
         user information to the master user interface manager
      requirement database;
   a local portion adapted to selectively perform the video portions and the input/output portions of the personal computer tasks, the local portion comprising:
      a display unit located remotely from the remote portion of the split personal computer system;
      an accessory unit in communication with the display unit;
      an input unit in communication with the accessory unit to input data signals into the accessory unit;
      communication means for interfacing the accessory unit with the remote portion of the split personal computer system for permitting data signals received by the accessory unit from the input unit to be transmittable from the accessory unit to the remote portion of the split personal computer system, the data signals being processable by the remote portion of the split personal computer system to generate output signals, the output signals including video signals and being transmittable from the remote portion of the split personal computer system to the accessory unit, and transmittable from the accessory unit to the display unit.

2. The split personal computer system of claim 1, wherein at least one of the operating system platforms is an intranet platform.

3. The split personal computer system of claim 1 wherein at least one of the application programs is located on the Intranet.

4. A split personal computer for selectively processing video portions, input/output portions, computational portions and storage portions of personal computer tasks, comprising:
   a remote portion adapted to selectively perform the computational portions
      and the storage portions of the personal computer tasks, the remote portion having a master operating software system stored thereon, wherein the master operating software system comprises:
      a master input/output system running on the remote portion,
         the master input/output system automatically detecting each of at least one system application program installed on the remote portion, and selectively providing user information to the at least one system application program so that the at least one system application programs configure themselves into a predetermined configuration;
      a master element manager running on the remote portion, the
   master element manager capable of controlling the at least one system application programs when the at least one system application programs are in a pre-determined configuration and the master element manager, upon activation, providing predetermined user information to one of the at least one system application programs to control the system application program; and a master user interface manager system having a user requirement database and communicating with the master element manager such that, upon activation, the master user interface manager instructs the master element manager to provide pre-determined user information to at least a pre-determined portion of at least one of the at least one system application programs whereby in response, the at least one system applicaztgion programs outputs identified user information to the master user interface manager requirement database;

a local portion adapted to selectively perform the video portions and the input/output portions of the personal computer tasks, the local portion comprising:

a display unit located remotely from the remote portion of the split personal computer system; an accessory unit in communication with the display unit; an input unit it communication with the accessory unit to input data signals into the accessory unit; communication means for interfacing the accesory unit with the remote portion of the split personal computer system for permitting data signals received by the accessory unit from the input unit to be transmittable from the accessory unit to the remote portion of the split personal computer system, the data signals being processable by the remote portion of the split personal computer system to generate output signals, the output signals including video signals and being transmittable from the remote portion of the split personal computer system to the accessory unit, and transmittable from the accessory unit to the display unit, wherein the master operating software system is designed by the steps of:

providing, first, a design matrix having at least two axes with at least one predetermined technology element being represented on one of the one of the axes, and user requirement elements being represented on the other one of the axes, the predetermined technology elements each defining a particular technology, and each of the user requirement elements defining a particular user requirement;

locating one unique intersection point between each of the user requirement elements represented on one of the axes and the available technology elements represented by another one of the axes in the design matrix; and developing a technology converter requirement for each intersection point, and each technology converter requirement using the predetermined technology element at each intersection point to develop an output satifying the user requirement element at the corresponding intersection point.

* * * * *

UNITED STATES PATENT AND TRADEMARK OFFICE
CERTIFICATE OF CORRECTION

| | |
|---|---|
| PATENT NO. | : 7,107,322 B1 |
| APPLICATION NO. | : 09/920669 |
| DATED | : September 12, 2006 |
| INVENTOR(S) | : Charles C. Freeny, Jr. |

It is certified that error appears in the above-identified patent and that said Letters Patent is hereby corrected as shown below:

On Title Page Item [56] Under "Other Publications" - Insert the reference titled --Mobile GUI On The Web, Fall 1994, Web Conference in Boston, Daniel Dardailler, pages 1-11--.

In the Specifications:
Col. 1, line 8: Insert --September 23, 2002, which is a continuation of U.S. Serial No. 10/050,624, filed on-- between the words, "on", and, "Jan. 16".

Col. 17, line 15: After the letters "PSPS", delete "web-ite" and replace with –web-site--.

Col. 29, line 59: After the word, "discussed", delete "In" and replace with --in--.

Col. 32, line 59: After the word, "control", delete "Is" and replace with --is--.

Col. 35, line 50: Delete "110" and replace with --I/O--.

Col. 41, line 18: After the word, "skilled", delete "In" and replace with --in--.

Col. 43, line 41: After the word, "right", delete "comer" and replace with --corner--.

Col. 51, line 61: Delete "Interface" and replace with --interface--.

Col. 54, line 11: Before the word, "television", delete ".".

Col. 58, line 19: Delete "customers" and replace with --customer's--.

Col. 59, line 13: Delete "customers" and replace with --customer's--.

Col. 59, line 25: After the word, "without", delete, ",".

Col. 59, line 49: Delete "customers" and replace with --customer's--.

Col. 60, line 45: After the word, "computer", delete the quotations " " ".

Col. 61, line 34: Delete "customers" and replace with --customer's--.

Col. 61, line 44: Delete "customers" and replace with --customer's--.

Col. 62, line 51: After the word, "scanning", delete ";" and replace it with --,--.

UNITED STATES PATENT AND TRADEMARK OFFICE
CERTIFICATE OF CORRECTION

| | | |
|---|---|---|
| PATENT NO. | : 7,107,322 B1 | Page 2 of 2 |
| APPLICATION NO. | : 09/920669 | |
| DATED | : September 12, 2006 | |
| INVENTOR(S) | : Charles C. Freeny, Jr. | |

It is certified that error appears in the above-identified patent and that said Letters Patent is hereby corrected as shown below:

In the claims:

Col. 63, line 53: After the word, "program", and before the word, "so", insert --installed on the remote portion, and selectively providing user information to at least one system application program--.

Col. 64, line 8: After the word, "least", insert --a pre-determined portion of at least one of the at least--.

Col. 65, line 13 claim 4: Delete "applicaztgion" and replace with --application--.

Col. 65, line 21 claim 4: After the words, "input unit", delete "it" and replace with --in--.

Col. 66, line 26 claim 4: Delete the word, "satifying" and replace with --satisfying--.

Signed and Sealed this

Eleventh Day of December, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,107,322 B1 | |
| APPLICATION NO. | : 09/920669 | |
| DATED | : September 12, 2006 | |
| INVENTOR(S) | : Charles C. Freeny, Jr. | |

It is certified that error appears in the above-identified patent and that said Letters Patent is hereby corrected as shown below:

Title Page Under "Other Publications" Item [56] - Insert the reference titled --Mobile GUI On The Web, Fall 1994, Web Conference in Boston, Daniel Dardailler, Pages 1-11--.

In the Specifications:
Col. 1, line 8: Insert --September 23, 2002, which is a continuation of U.S. Serial No. 10/050,624, filed on-- between the words, on, and, Jan. 16.

Col. 17, line 15: After the letters "PSPS", delete "web-ite" and replace with --web-site--.

Col. 29, line 59: After the word, discussed, delete "In" and replace with --in--.

Col. 32, line 59: After the word, control, delete "Is" and replace with --is--.

Col. 35, line 50: Delete "110" and replace with --I/O--.

Col. 41, line 18: After the word, skilled, delete "In" and replace with --in--.

Col. 43, line 41: After the word, right, delete "comer" and replace with --corner--.

Col. 51, line 61: Delete "Interface" and replace with --interface--.

Col. 54, line 11: Before the word, television, delete ".".

Col. 58, line 19: Delete "customers" and replace with --customer's--.

Col. 59, line 13: Delete "customers" and replace with --customer's--.

Col. 59, line 25: After the word, without, delete, ",".

Col. 59, line 49: Delete "customers" and replace with --customer's--.

Col. 60, line 45: After the word, computer, delete the quotations ".

Col. 61, line 34: Delete "customers" and replace with --customer's--.

Col. 61, line 44: Delete "customers" and replace with --customer's--.

Col. 62, line 51: After the word, scanning, delete ";" and replace it with --,--.

UNITED STATES PATENT AND TRADEMARK OFFICE
CERTIFICATE OF CORRECTION

| | | |
|---|---|---|
| PATENT NO. | : 7,107,322 B1 | |
| APPLICATION NO. | : 09/920669 | |
| DATED | : September 12, 2006 | |
| INVENTOR(S) | : Charles C. Freeny, Jr. | |

It is certified that error appears in the above-identified patent and that said Letters Patent is hereby corrected as shown below:

In the claims:

Col. 63, line 53: After the word, program, and before the word, so, insert --installed on the remote portion, and selectively providing user information to at least one system application program--.

Col. 64, line 8: After the word, least, insert --a pre-determined portion of at least one of the at least--.

Col. 65, line 13: Delete "applicaztgion" and replace with --application--.

Col. 65, line 21: After the words, input unit, delete "it" and replace with --in--.

Col. 66, line 26: Delete the word, "satifying" and replace with --satisfying--.

Signed and Sealed this

Fifteenth Day of January, 2008

JON W. DUDAS
*Director of the United States Patent and Trademark Office*